US005744566A

United States Patent [19]

Tsutsui et al.

[11] Patent Number: 5,744,566
[45] Date of Patent: Apr. 28, 1998

[54] UNSATURATED COPOLYMER BASED ON OLEFIN AND PRODUCITON AND USE THEREOF

[75] Inventors: Toshiyuki Tsutsui, Ootake; Masaaki Kawasaki, Ichihara, both of Japan

[73] Assignee: Mitsui Chemicals, Inc., Tokyo, Japan

[21] Appl. No.: 773,592

[22] Filed: Dec. 27, 1996

[30] Foreign Application Priority Data

Dec. 29, 1995 [JP] Japan ................................. 7-353315

[51] Int. Cl.$^6$ ........................... C08F 236/20; C08F 4/642
[52] U.S. Cl. ...................... 526/336; 526/90; 526/124.2; 526/124.9; 526/159; 526/160; 526/170; 526/339; 526/340; 525/332.1; 524/578
[58] Field of Search ....................... 526/336, 160, 526/90, 159, 170, 124.2, 339, 340; 525/332.1; 524/578

[56] References Cited

U.S. PATENT DOCUMENTS

| | | | |
|---|---|---|---|
| 2,418,912 | 4/1947 | Sparks et al. | 526/336 X |
| 2,609,359 | 6/1952 | Sparks et al. | 526/336 X |
| 3,285,889 | 11/1966 | Arnold | 526/336 X |
| 3,846,387 | 11/1974 | Su | 526/336 X |
| 3,887,531 | 6/1975 | Schneider et al. | 526/336 |
| 3,933,769 | 1/1976 | Lal et al. | 526/536 |
| 4,064,335 | 12/1977 | Lal et al. | 526/336 |
| 4,340,705 | 7/1982 | Lal et al. | 526/336 |
| 5,418,308 | 5/1995 | Harvie | 526/336 |
| 5,430,117 | 7/1995 | Kawasaki et al. | 526/336 |
| 5,610,254 | 3/1997 | Sagane et al. | 526/336 X |

*Primary Examiner*—Fred Teskin
*Attorney, Agent, or Firm*—Birch, Stewart, Kolasch & Birch, LLP

[57] ABSTRACT

An unsaturated copolymer based on olefin which is superior in dynamic fatigue resistance (flexural fatigue resistance), weatherability, fastness to ozone, stability in thermal aging and exhibits also superior performances in chemical reactivity, in processibility and in compatibility as well as co-vulcanizability with aromatic ring-containing resins, such as styrene-butadiene rubber (SBR) etc., and is useful for materials of various rubber products and as modifier for resin products is proposed, said copolymer comprising a structural unit derived from an α-olefin having 2–20 carbon atoms in a proportion of 30–99.8 mole %, a structural unit derived from an aromatic ring-containing vinyl monomer in a proportion of 0.1–60 mole % and a structural unit derived from a chain-formed non-conjugated triene or tetraene having in the molecule one vinyl group in a proportion of 0.1–10 mole % and said copolymer having an intrinsic viscosity determined in Decalin® at 135° C. of 0.05–10 dl/g.

15 Claims, No Drawings

UNSATURATED COPOLYMER BASED ON OLEFIN AND PRODUCITON AND USE THEREOF

FIELD OF THE INVENTION

The present invention relates to a novel unsaturated copolymer based on olefin and a method for producing such copolymer as well as applications of such copolymer. More specifically, the invention relates to a copolymer having unsaturation bonds in side chain(s) branched from the main polymer chain, which can be used for such applications as materials for various rubber products and modifiers of resins, and to a method for producing such copolymer as well as to applications of such copolymer.

BACKGROUND OF THE INVENTION

Copolymers of an α-olefin with a non-conjugated diene have a reactivity in itself and, thus, are used in various applications, such as for vulcanized rubbers, rubber modifications and modification of resin products. In particular, copolymers based on ethylene/α-olefin/diene have found their wide uses for materials of, for example, automobile parts, industrial rubber products, electric insulators, products for architectural and constructional uses and rubber coated cloths, and for plastic blend materials for compounding with, such as polypropylene and polystyrene, due to their superior heat resistance and fastness to ozone. Since however, the ethylene/α-olefin/diene copolymer exhibits poor resistance to dynamic fatigue, they have not found uses for specific applications, for example, vibration damping rubber, rubber roller, belt, tire, coverage over oscillating portion and the like.

On the other hand, natural rubber excels in the dynamic fatigue resistance, but is poor in the heat resistance and fastness to ozone, restricting thus, its practical applications.

As for copolymers of a higher α-olefin with a non-conjugated diene, U.S. Pat. Nos. 3,933,769, 4,064,335 and 4,340,705 disclose copolymers of a higher α-olefin with methyl-1,4-hexadiene or with an α, ω-diene. Here, however, the methyl-1,4-hexadiene employed was a mixture of 4-methyl-1,4-hexadiene and 5-methyl-1,4-hexadiene and the reaction rate or conversion of these components is different, so that a continued copolymerization with them may bring about a difficulty for recovering each of the comonomers. Also, the reactivities of 4-methyl-1,4-hexadiene and 5-methyl-1,4-hexadiene with a higher α-olefin in the copolymerization are different, so that a problem arise in that a poor conversion of the comonomers may result with a lower reaction efficiency. In addition, use of an α, ω-diene may eventually cause gelation within the copolymerization product which may badly affect the material properties of the final product.

Moreover, the processes for producing copolymers of higher α-olefin disclosed in the above-mentioned US Patents employ a catalyst based on titanium trichloride or a catalyst composed of titan tetrachloride and an organoaluminum compound. The catalytic activities of these catalysts are not high enough, so that a disadvantage of higher production costs may have to be endured. Further, the copolymers of α-olefin/non-conjugated diene obtained as above does not reveal sufficient compatibility and co-vulcanizability with rubbers based on diene, such as SBR etc., so that their application may be restricted.

The inventors have been working in sound researches for obtaining a polymer product which is superior in dynamic fatigue resistance (resistance to flexural fatigue), weatherability, fastness to ozone, stability in thermal aging and low temperature characteristic and exhibits at the same time superior performances in the chemical reactivity, in the processibility and in the compatibility and co-vulcanizability with aromatic ring-containing polymers, such as SBR and the like. Based on these researches, the inventors have reached the present invention by the discovery that an unsaturated copolymer based on olefin, which has structural units derived from an α-olefin, a specific aromatic ring-containing vinyl monomer and a specific chain-formed polyolefin and which has unsaturation bonds in the side chain, is superior in dynamic fatigue resistance (resistance to flexural fatigue), weatherability, fastness to ozone, stability in thermal aging and low temperature characteristic and exhibits also superior performances in the chemical reactivity, in the processibility and in the compatibility and co-vulcanizability with aromatic ring-containing polymers, such as styrene-butadiene rubber (SBR) and the like, whereby it can find various uses for, such as, material for rubber products, modifier for resin products and so on.

DESCRIPTION OF THE INVENTION

An object of the present invention is to obviate the problems in the prior art mentioned above and to provide a novel unsaturated copolymer based on olefin, which is superior in dynamic fatigue resistance (resistance to flexural fatigue), weatherability, fastness to ozone, stability in thermal aging and low temperature characteristic and which exhibits also superior performances in the chemical reactivity, in the processibility, in the compatibility and co-vulcanizability with aromatic ring-containing polymers, such as styrene-butadiene rubber (SBR) and the like, and thus, capable of being utilized as a material for various rubber products and as a modifier for resin products.

Another object of the present invention is to provide a method for producing the above-mentioned unsaturated copolymer efficiently.

A further object of the present invention is to provide a rubber composition which contains the unsaturated copolymer based on olefin mentioned above and which is superior in dynamic fatigue resistance (resistance to flexural fatigue), weatherability, fastness to ozone, stability in thermal aging and low temperature characteristic and which exhibits also superior performances in the chemical reactivity, processibility and in the compatibility and co-vulcanizability with aromatic ring-containing polymers, such as styrene-butadiene rubber (SBR) and the like.

An unsaturated copolymer based on olefin according to the present invention comprises a random copolymer of constituent comonomers of (a-1) an α-olefin having 2–20 carbon atoms,
(a-2) a vinyl monomer having an aromatic ring, as represented by the general formula (1) given below and
(a-3) a chain-formed non-cojugated triene or tetraene having one vinyl group in the molecule, said copolymer comprising constituent structural units of
(b-1) 30–99.8 mole % of a structural unit derived from said α-olefin (a-1),
(b-2) 0.1–60 mole % of a structural unit derived from said vinyl monomer (a-2) and
(b-3) 0.1–10 mole % of a structural unit derived from said non-conjugated triene or tetraene (a-3)

and having an intrinsic viscosity [η] determined in decalin® (Decahydronaphthalene) at 135° C. in the range from 0.05 to 10 dl/g:

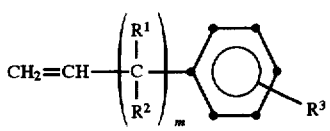

(1)

wherein m is an integer of 0-5 and $R^1$, $R^2$ and R3 may be identical with or different from each other and denote each hydrogen atom or an alkyl group having 1-8 carbon atoms.

As the constituent comonomer (a-3), a compound represented by the general formula (2-1) given below may be exemplified. The constituent structural unit (b-3) is represented by the general formula (3-1) given below:

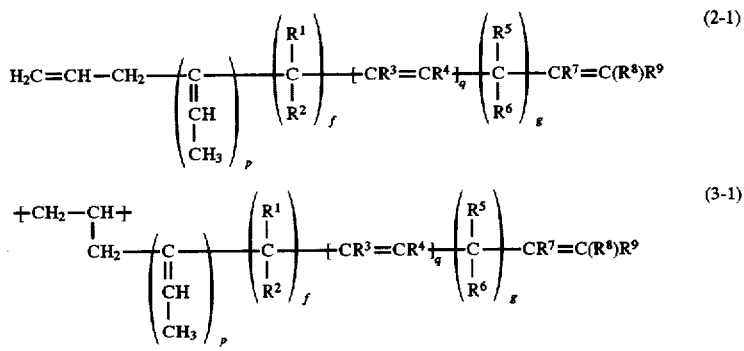

wherein, in the above general formula (2-1), p and q denote each 0 or 1 but not both 0 simultaneously, f denotes an integer of 0-5 with the proviso that f is not 0 when both p and q are 1, g denotes an integer of 1-6, $R^1$, $R^2$, $R^3$, $R^4$, $R^5$, $R^6$ and $R^7$ represent each hydrogen atom or an alkyl group having 1-5 carbon atoms, $R^8$ denotes an alkyl group having 1-5 carbon atoms and $R^9$ denotes hydrogen atom, an alkyl group having 1-5 carbon atoms or a group represented by $-(CH_2)_n-CR^{10}=C(R^{11})R^{12}$ in which n is an integer of 1-5, $R^{10}$ and $R^{11}$ denote each hydrogen atom or an alkyl group having 1-5 carbon atoms and $R^{12}$ denotes an alkyl group having 1-5 carbon atoms, with the proviso that $R^9$ stands for hydrogen atom or an alkyl group having 1-5 carbon atoms when both p and q are 1, and in the above general formula (3-1), p, q, f, g and $R^1$-$R^9$ have the same meanings as above.

A method for producing an unsaturated copolymer based on olefin according to the present invention, comprises subjecting (a-1) an α-olefin having 2-20 carbon atoms, (a-2) a vinyl monomer having an aromatic ring, as represented by the general formula (1) given above and (a-3) a chain-formed non-cojugated triene or tetraene having one vinyl group in the molecule to a copolymerization in the presence of a catalyst formed from a transition metal compound, an organic aluminum compound and/or an ionized ionic compound to form a random copolymer comprising constituent structural units of (b-1) 30-99.8 mole % of a structural unit derived from said α-olefin (a-1), (b-2) 0.1-60 mole % of a structural unit derived from said vinyl monomer (a-2) and (b-3) 0.1-10 mole % of a structural unit derived from said non-conjugated triene or tetraene (a-3)

and having an intrinsic viscosity [η] determined in Decalin® (Decahydronaphthalene) at 135° C. in the range from 0.05 to 10 dl/g.

A rubber composition according to the present invention comprises (A) an unsaturated copolymer based on olefin as defined above and at least one of the additives among (B) a reinforcing filler in an amount of, on the weight basis, at most 300 parts per 100 parts of the unsaturated copolymer based on olefin (A), (C) a softening agent in an amount of, on the weight basis, at most 200 parts per 100 parts of the unsaturated copolymer based on olefin (A) and (D) a vulcanizing agent in an amount of, on the weight basis, 0.05-15 parts per 100 parts of the unsaturated copolymer based on olefin (A).

The Unsaturated Copolymer based on Olefin (A)

The α-olefin (a-1) having 2-20 carbon atoms to be employed according to the invention includes concretely, for example, ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene.

Among them, preference is given for ethylene, propylene, 1-butene, 1-hexene, 4-methyl-1-pentene, 1-octene and 1-decene. It is particularly preferable to use ethylene solely or combination with propylene, 1-butene, 1-hexene, 4-methyl-1-pentene, 1-octene and/or with 1-decene. The proportion of ethylene to the other α-olefin may desirably be in the range of 100/0 to 45/55, preferably 100/0 to 55/45, in the mole ratio of ethylene/α-olefin. Particularly superior low temperature properties of rubber product are obtainable at a mole ratio of 95/5-60/40. When this mole ratio is within the above range, an unsaturated copolymer based on olefin (A) which superior in the vulcanization charactristic and in the low temperature properties is obtained. It is also preferable to use an α-olefin having 6 or more carbon atoms solely or in combination with another α-olefin having 2-5 carbon atoms. Here, the α-olefin having 6 or more carbon atoms may preferably constitute 40-100 mole %, preferably 60-100 mole % of the total moles of such α-olefines. As the α-olefin having 6 or more carbon atoms, those of straight chain structure are preferred.

The α-olefin comonomer (a-1) may be employed either solely or in combination with one or more of other α-olefins.

As the aromatic ring-containing vinyl comonomer (a-2) represented by the general formula (1) to be used according to the present invention, there may be enumerated, for example, styrene, allylbenzene, 4-phenylbutene-1, 3-phenylbutene-1, 4-(4-methylphenyl)-butene-1, 4-(3-methylphenyl)-butene-1, 4-(2-methyl-phenyl)-butene-1, 4-(4-ethylphenyl)-butene-1, 4-(4-butylphenyl)-butene-1, 5-phenylpentene-1, 4-phenyl-pentene-1, 3-phenylpentene-1, 5-(4-methylphenyl)-pentene-1, 4-(2-methylphenyl)-pentene-1, 3-(4-methyl-phenyl)-pentene-1, 6-phenylhexene- 1, 5-phenylhexene-1, 4-phenylhexene-1, 3-phenylhexene-1, 6-(4-methylphenyl)-hexene-1, 5-(2-methylphenyl)-hexene-1, 4-(4-methyl-phenyl)-hexene-1, 3-(2-methylphenyl)-hexene-1, phenylheptene-1, 6-phenylheptene-1, 5-phenylheptene-1, 4-phenylheptene-1, 8-phenyloctene-1, 7-phenyloctene-1, 6-phenyloctene-1, 5-phenyloctene-1, 4-phenyloctene-1, 3-phenyloctene-1 and 10-phenyldecene-1. Among them, preferance is given for styrene, allylbenzene and 4-phenylbutene-1 and in particular for styrene and 4-phenylbutene-1. The aromatic ring-containing vinyl monomers (a-2) may be used solely or in combination of two or more of them.

The chain-formed non-conjugated triene or tetraene (a-3) to be used according to the present invention is a hydrocarbon compound having one vinyl group ($CH_2=CH-$) in the molecule and 3-4 carbon-to-carbon double bonds ($C=C$). The 3-4 carbon-to-carbon double bonds include the carbon-to-carbon double bond in the vinyl group.

The total number of carbon atoms per molecule of the non-conjugated triene or tetraene (a-3) [or an average number of carbon atoms per molecule in the case of concurrent use of two or more of the non-conjugated triene or tetraene (a-3)] is not specifically limited, while it may desirably be in the range of 9 to 30, preferably 10 to 25, especially preferably 10 to 22. A non-conjugated triene or tetraene (a-3) having carbon atoms in the above-mentioned range reveals an advantage of easy processing on purification etc.

While the total number of hydrogen atoms which are bound directly to every carbon atom adjacent each of the carbon-to-carbon double bonds included in the molecule of the non-conjugated triene or tetraene (a-3) to be used according to the present invention is not specifically restricted, it may desirably be in the range of 9 to 33, preferably 12 to 33, especially preferably 14 to 33 per molecule. In the case of concurrent use of two or more of the non-conjugated triene or tetraene (a-3), these desirable values for the number of such hydrogen atoms refer to an average number of such hydrogen atoms per molecule. A non-conjugated triene or tetraene (a-3) having total number of such hydrogen atoms within the above-mentioned range is preferred, since an unsaturated copolymer based on olefin bringing about a higher vulcanization velocity can be obtained.

A concrete way of calculating the total number of the above-mentioned hydrogen atom is now explained. In the compound represented by the formula (4) given below, the total number of the carbon-to-carbon double bonds is four, i.e., one between the 1- and 2-carbon atoms (that in the vinyl group), one between the 4- and 5-atoms, one between the 12- and 14-carbon atoms and one between the 16- and 17-carbon atoms. The carbon atoms are numbered in the formula (4) from 1 to 19. The carbon atoms which adjoins each of these carbon-to-carbon double bonds are those numbered by 3, 6, 7, 11, 13, 15 and 18 (those numbered by 8, 9, 10 and 19 are not included). Thus, the total number of hydrogen atoms directly bound to the carbon atoms adjacent every carbon-to-carbon double bond are calculated to be 16, namely, two for the No. 3 carbon atom, three for the No. 6 carbon atom, two for the No. 7 carbon atom, two for the No. 11 carbon atom, three for the No. 13 carbon atom, two for the No. 15 carbon atom and two for the No. 18 carbon atom.

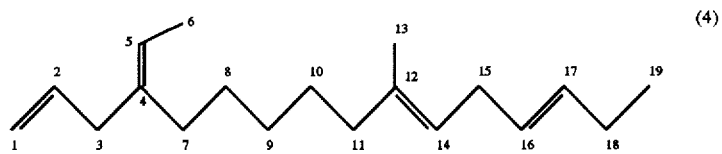

(4)

In the case of the compound of formula (5) given below (5-ethylidene-2-norbornene) to be used in a comparative example given afterwards to be contrasted to the present invention, the total number of carbon-to-carbon double bonds is 2, i.e. one between the 2- and 3-carbon atoms and one between the 5- and 8-carbon atoms. The carbon atoms adjucent these double bonds are those of Nos. 1, 4, 6 and 9 (the No. 7 carbon atom is not included). Thus, the total number of the hydrogen atoms directly bound to these carbon atoms adjacent the double bonds is calculated to be 7, namely, one for No. 1 carbon atom, one for No. 4 carbon atom, two for No. 6 carbon atom and three for No. 9 carbon atom.

(5)

According to the present invention, at least one kind of the chain-formed non-conjugated triene or tetraene (a-3) is used.

According to the present invention, it is preferable to use for the component (a-3) a non-conjugated triene or tetraene in which one chain-formed hydrocarbon group and two hydrogen atoms are bound to the carbon atom adjacent the vinyl group. Thus, a non-conjugated triene or tetraene in which a methylene group ($-CH_2-$) adjoins the vinyl group of the comonomer (a-3) is preferred.

For the comonomer (a-3) of such non-conjugated triene or tetraene, compounds represented by the following General formula (2-1) are enumerated:

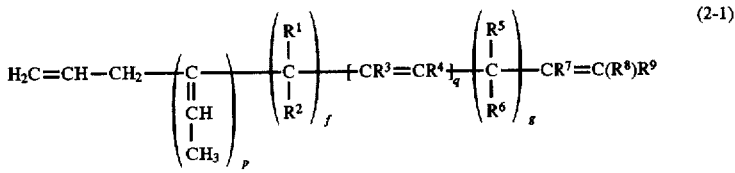

(2-1)

In the above general formula (2-1, p and q denote each 0 or 1 but not both are 0 simultaneously, f denotes an integer of 0–5 with the proviso that f is not 0 when both p and q are 1, g denotes an integer of 1–6, $R^1$, $R^2$, $R^3$, $R^4$, $R^5$, $R^6$ and $R^7$ represent each hydrogen atom or an alkyl group having 1–5 carbon atoms, $R^8$ denotes an alkyl group having 1–5 carbon atoms and $R^9$ denotes hydrogen atom, an alkyl group having 1–5 carbon atoms or a group represented by —$(CH_2)_n$—$CR^{10}$=$C(R^{11})R^{12}$ in which n is an integer of 1–5, $R^{10}$ and $R^{11}$ denote each hydrogen atom or an alkyl group having 1–5 carbon atoms and $R^{12}$ denotes an alkyl group having 1–5 carbon atoms, with the proviso that $R^9$ stands for hydrogen atom or an alkyl group having 1–5 carbon atoms when both p and q are 1.

For the alkyl groups $R^1$ to $R^{12}$ each having 1–5 carbon atoms in the compounds represented by the general formula (2-1), there may be enumerated, for example, methyl, ethyl, n-propyl, i-propyl, n-butyl, i-butyl, sec-butyl, t-butyl and pentyl.

Among the non-conjugated trienes and tetraenes (a-3) represented by the general formula (2-1), those non-conjugated trienes and tetraenes which are represented by the general formulae (2—2) and (2-3) given below are preferred. The non-conjugated trienes and tetraenes (a-3) represented by the general formula (2-3) encompass those non-conjugated tetraenes which are represented by the general formula (2-4) given below and those non-conjugated trienes which are represented by the general formula (2-5) given below.

Below, these non-conjugated trienes and tetraenes (a-3) are detailed.

Non-conjugated Triene or Tetraene (a-3)

Among the non-conjugated trienes and tetraenes (a-3) represented by the general formula (2-1), those chain-formed non-conjugated trienes and tetraenes which are represented by the following general formula (2—2) are preferred:

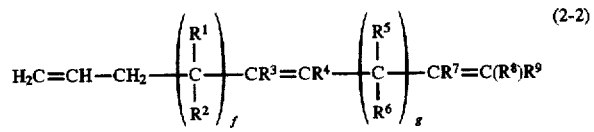

(2-2)

In the above general formula (2—2), f denotes an integer of 0–5, g denotes an integer of 1–6, $R^1$, $R^2$, $R^3$, $R^4$, $R^5$, $R^6$ and $R^7$ represent each hydrogen atom or an alkyl group having 1–5 carbon atoms, $R^8$ denotes an alkyl group having 1–5 carbon atoms and $R^9$ denotes hydrogen atom, an alkyl group having 1–5 carbon atoms or a group represented by —$(CH_2)_n$—$CR^{10}$=$C(R^{11})R^{12}$ in which n is an integer of 1–5, $R^{10}$ and $R^{11}$ denote each hydrogen atom or an alkyl group having 1–5 carbon atoms and $R^{12}$ denotes an alkyl group having 1–5 carbon atoms.

The non-conjugated triene or tetraene (a-3) represented by the general formula (2—2) corresponds to the compound represented by the general formula (2-1) in which p is zero and q is 1.

$R^1$, $R^2$, $R^3$, $R^4$, $R^5$ and $R^6$ in the general formula (2—2) denote each hydrogen atom or an alkyl group having 1–5 carbon atoms, preferably hydrogen atom or an alkyl group having 1–3 carbon atoms and, especially preferably, $R^1$, $R^2$, $R^5$ and $R^6$ are each hydrogen atom. In case $R^1$, $R^2$, $R^5$ and $R^6$ are each hydrogen atom, an unsaturated copolymer based on olefin exhibiting superior polymerizability with higher vulcanization velocity and superior thermal stability can be obtained.

$R^7$ in the general formula (2-2) is hydrogen atom or an alkyl group having 1–5 carbon atoms and is preferably hydrogen atom or an alkyl group having 1–3 carbon atoms.

$R^8$ in the general formula (2-2) is an alkyl group having 1–5 carbon atoms, preferably 1–3 carbon atoms.

In the general formula (2-2), $R^9$ is hydrogen atom, an alkyl group having 1–5 carbon atoms, preferably 1–3 carbon atoms, or a group represented by —$(CH_2)_n$—$CR^{10}$=$C(R^{11})R^{12}$, in which n is an integer of 1–5, preferably 1–3, $R^{10}$ and $R^{11}$ denote each hydrogen atom or an alkyl group having 1–5 carbon atoms and preferably denote each hydrogen atom or an alkyl group having 1–3 carbon atoms and $R^{12}$ is an alkyl group having 1–5 carbon atoms, preferably 1–3 carbon atoms.

For the alkyl groups in the comonomer of the general formula (2-2), there may be enumerated, for example, methyl, ethyl, n-propyl, i-propyl, n-butyl, i-butyl, sec-butyl, t-butyl and pentyl.

Concrete examples of the non-conjugated trienes and tetraenes (a-3) represented by the general formula (2-2) include the compounds given below, among which preference is given to 6,10-dimethyl-1,5,9-undecatriene (DMUT) of formula (6-1), 5,9-dimethyl-1,4,8-decatriene (DMDT) of formula (6-2) and compounds of formulae (6-11), (6-15), (6-32) and (6-52).

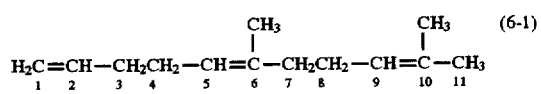

(6-1)

(6-2)

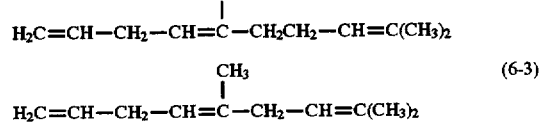

(6-3)

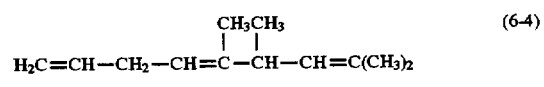

(6-4)

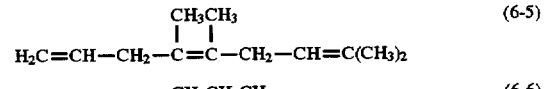

(6-5)

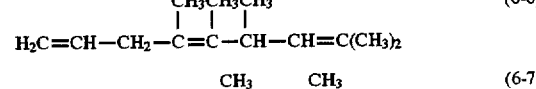

(6-6)

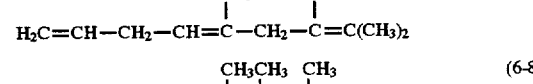

(6-7)

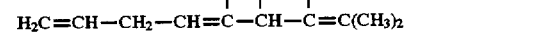

(6-8)

-continued (6-9) $H_2C=CH-CH_2-\underset{\underset{CH_3}{|}}{C}=\underset{\underset{CH_3}{|}}{C}-CH_2-\underset{\underset{CH_3}{|}}{C}=C(CH_3)_2$ (6-10) $H_2C=CH-CH_2-\underset{\underset{CH_3}{|}}{C}=\underset{\underset{CH_3}{|}}{C}-\underset{\underset{CH_3}{|}}{CH}-\underset{\underset{CH_3}{|}}{C}=C(CH_3)_2$ (6-11) $H_2C=CH-(CH_2)_2-CH=\underset{\underset{CH_3}{|}}{C}-CH_2-CH=C(CH_3)_2$ (6-12) $H_2C=CH-(CH_2)_2-CH=\underset{\underset{CH_3}{|}}{C}-\underset{\underset{CH_3}{|}}{CH}-CH=C(CH_3)_2$ (6-13) $H_2C=CH-(CH_2)_2-\underset{\underset{CH_3}{|}}{C}=\underset{\underset{CH_3}{|}}{C}-CH_2-CH=C(CH_3)_2$ (6-14) $H_2C=CH-(CH_2)_2-\underset{\underset{CH_3}{|}}{C}=\underset{\underset{CH_3}{|}}{C}-\underset{\underset{CH_3}{|}}{CH}-CH=C(CH_3)_2$ (6-15) $H_2C=CH-(CH_2)_2-CH=\underset{\underset{CH_3}{|}}{C}-CH_2-\underset{\underset{CH_3}{|}}{C}=C(CH_3)_2$ (6-16) $H_2C=CH-(CH_2)_2-CH=\underset{\underset{CH_3}{|}}{C}-\underset{\underset{CH_3}{|}}{CH}-\underset{\underset{CH_3}{|}}{C}=C(CH_3)_2$ (6-17) $H_2C=CH-(CH_2)_2-\underset{\underset{CH_3}{|}}{C}=\underset{\underset{CH_3}{|}}{C}-CH_2-\underset{\underset{CH_3}{|}}{C}=C(CH_3)_2$ (6-18) $H_2C=CH-(CH_2)_2-\underset{\underset{CH_3}{|}}{C}=\underset{\underset{CH_3}{|}}{C}-\underset{\underset{CH_3}{|}}{CH}-\underset{\underset{CH_3}{|}}{C}=C(CH_3)_2$ (6-19) $H_2C=CH-(CH_2)_2-CH=\underset{\underset{CH_3}{|}}{\overset{\overset{CH_3}{|}}{C}}-\underset{\underset{CH_3}{|}}{C}-CH=C(CH_3)_2$ (6-20) $H_2C=CH-(CH_2)_2-\underset{\underset{CH_3}{|}}{C}=\underset{\underset{CH_3}{|}}{C}-\underset{\underset{CH_3}{|}}{\overset{\overset{CH_3}{|}}{C}}-CH=C(CH_3)_2$ (6-21) $H_2C=CH-(CH_2)_2-CH=\underset{\underset{CH_3}{|}}{C}-\underset{\underset{CH_3}{|}}{\overset{\overset{CH_3}{|}}{C}}-C=C(CH_3)_2$ (6-22) $H_2C=CH-(CH_2)_2-\underset{\underset{CH_3}{|}}{C}=\underset{\underset{CH_3}{|}}{C}-\underset{\underset{CH_3}{|}}{\overset{\overset{CH_3}{|}}{C}}-C=C(CH_3)_2$ (6-23) $H_2C=CH-CH_2CH-CH=\underset{\underset{CH_3}{|}}{C}-CH_2-CH=C(CH_3)_2$ (with CH_3 on CH)

(6-24) $H_2C=CH-CH_2CH-\underset{\underset{CH_3}{|}}{C}=\underset{\underset{CH_3}{|}}{C}-CH_2-CH=C(CH_3)_2$ (with CH_3 on CH)

(6-25) $H_2C=CH-CH_2\underset{\underset{CH_3}{|}}{CH}-CH=\underset{\underset{CH_3}{|}}{C}-CH_2-\underset{\underset{CH_3}{|}}{C}=C(CH_3)_2$ (6-26) $H_2C=CH-CH_2CH-\underset{\underset{CH_3}{|}}{C}=\underset{\underset{CH_3}{|}}{C}-CH_2-\underset{\underset{CH_3}{|}}{C}=C(CH_3)_2$ (6-27) $H_2C=CH-CH_2CH-CH=\underset{\underset{CH_3}{|}}{C}-\underset{\underset{CH_3}{|}}{CH}-CH=C(CH_3)_2$ (6-28) $H_2C=CH-CH_2CH-\underset{\underset{CH_3}{|}}{C}=\underset{\underset{CH_3}{|}}{C}-\underset{\underset{CH_3}{|}}{CH}-CH=C(CH_3)_2$ (6-29) $H_2C=CH-CH_2CH-CH=\underset{\underset{CH_3}{|}}{C}-\underset{\underset{CH_3}{|}}{CH}-\underset{\underset{CH_3}{|}}{C}=C(CH_3)_2$ (6-30) $H_2C=CH-CH_2CH-\underset{\underset{CH_3}{|}}{C}=\underset{\underset{CH_3}{|}}{C}-\underset{\underset{CH_3}{|}}{CH}-\underset{\underset{CH_3}{|}}{C}=C(CH_3)_2$ (6-31) $H_2C=CH-CH_2CH-\underset{\underset{CH_3}{|}}{C}=\underset{\underset{CH_3}{|}}{C}-(CH_2)_2-\underset{\underset{CH_3}{|}}{C}=C(CH_3)_2$ (6-32) $H_2C=CH-(CH_2)_2CH=\underset{\underset{CH_3}{|}}{C}-(CH_2)_2CH=\underset{\underset{CH_3}{|}}{C}-(CH_2)_2CH=C(CH_3)_2$ (6-33) $H_2C=CH-CH_2-CH=\underset{\underset{CH_3}{|}}{C}-(CH_2)_2CH=\underset{\underset{CH_3}{|}}{C}-(CH_2)_2CH=C(CH_3)_2$ (6-34) $H_2C=CH-(CH_2)_2CH=\underset{\underset{CH_3}{|}}{C}-CH_2-CH=\underset{\underset{CH_3}{|}}{C}-(CH_2)_2CH=C(CH_3)_2$ (6-35) $H_2C=CH-CH_2-CH=\underset{\underset{CH_3}{|}}{C}-CH_2-CH=\underset{\underset{CH_3}{|}}{C}-(CH_2)_2-CH=C(CH_3)_2$ (6-36) $H_2C=CH-(CH_2)_2-CH=\underset{\underset{CH_3}{|}}{C}-CH_2-CH=\underset{\underset{CH_3}{|}}{C}-CH_2-CH=C(CH_3)_2$ (6-37) $H_2C=CH-CH_2-CH=\underset{\underset{CH_3}{|}}{C}-CH_2-CH=\underset{\underset{CH_3}{|}}{C}-CH_2-CH=C(CH_3)_2$ (6-38) $H_2C=CH-(CH_2)_2-\underset{\underset{CH_3}{|}}{C}=\underset{\underset{CH_3}{|}}{C}-CH_2-CH=\underset{\underset{CH_3}{|}}{C}-CH_2-CH=C(CH_3)_2$ (6-39) $H_2C=CH-CH_2-\underset{\underset{CH_3}{|}}{C}=\underset{\underset{CH_3}{|}}{C}-CH_2-CH=\underset{\underset{CH_3}{|}}{C}-CH_2-CH=C(CH_3)_2$ (6-40) $H_2C=CH-(CH_2)_2-\underset{\underset{CH_3}{|}}{C}=\underset{\underset{CH_3}{|}}{C}-CH_2-\underset{\underset{CH_3}{|}}{C}=\underset{\underset{CH_3}{|}}{C}-CH_2-CH=C(CH_3)_2$ (6-41) $H_2C=CH-CH_2-\underset{\underset{CH_3}{|}}{C}=\underset{\underset{CH_3}{|}}{C}-CH_2-\underset{\underset{CH_3}{|}}{C}=\underset{\underset{CH_3}{|}}{C}-CH_2-CH=C(CH_3)_2$ (6-42) $H_2C=CH-(CH_2)_2-CH=\underset{\underset{CH_3}{|}}{C}-CH_2-CH=\underset{\underset{CH_3}{|}}{C}-CH_2-\underset{\underset{CH_3}{|}}{C}=C(CH_3)_2$ (6-43) $H_2C=CH-CH_2-\underset{\underset{CH_3}{|}}{C}=\underset{\underset{CH_3}{|}}{C}-CH_2-\underset{\underset{CH_3}{|}}{C}=\underset{\underset{CH_3}{|}}{C}-CH_2-\underset{\underset{CH_3}{|}}{C}=C(CH_3)_2$ (6-44) $H_2C=CH-(CH_2)_2CH=\underset{\underset{CH_3}{|}}{C}-\underset{\underset{CH_3}{|}}{CH}-CH=\underset{\underset{CH_3}{|}}{C}-(CH_2)_2CH=C(CH_3)_2$ (6-45) $H_2C=CH-CH_2-CH=\underset{\underset{CH_3}{|}}{C}-\underset{\underset{CH_3}{|}}{CH}-CH=\underset{\underset{CH_3}{|}}{C}-(CH_2)_2-CH=C(CH_3)_2$ (6-46) $H_2C=CH-(CH_2)_2-CH=\underset{\underset{CH_3}{|}}{C}-\underset{\underset{CH_3}{|}}{CH}-CH=\underset{\underset{CH_3}{|}}{C}-CH=C(CH_3)_2$ (6-47) $H_2C=CH-CH_2-CH=\underset{\underset{CH_3}{|}}{C}-\underset{\underset{CH_3}{|}}{CH}-CH=\underset{\underset{CH_3}{|}}{C}-CH=C(CH_3)_2$ (6-48) $H_2C=CH-(CH_2)_2-CH=\underset{\underset{CH_3}{|}}{C}-(CH_2)_2-CH=C(CH_3)C_2H_5$ (6-49) $H_2C=CH-CH_2-CH=\underset{\underset{CH_3}{|}}{C}-(CH_2)_2-CH=C(CH_3)C_2H_5$ -continued $$H_2C=CH-(CH_2)_2-CH=\underset{\underset{CH_3}{|}}{C}-(CH_2)_2-CH=C(C_2H_5)_2 \quad (6\text{-}50)$$

$$H_2C=CH-CH_2-CH=\underset{\underset{CH_3}{|}}{C}-(CH_2)_2-CH=C(C_2H_5)_2 \quad (6\text{-}51)$$

$$H_2C=CH-(CH_2)_2-CH=\underset{\underset{C_2H_5}{|}}{C}-(CH_2)_2-CH=C(CH_3)_2 \quad (6\text{-}52)$$

$$H_2C=CH-CH_2-CH=\underset{\underset{C_2H_5}{|}}{C}-(CH_2)_2-CH=C(CH_3)_2 \quad (6\text{-}53)$$

$$H_2C=CH-(CH_2)_2-CH=\underset{\underset{C_2H_5}{|}}{C}-(CH_2)_2-CH=C(CH_3)C_2H_5 \quad (6\text{-}54)$$

$$H_2C=CH-CH_2-CH=\underset{\underset{C_2H_5}{|}}{C}-(CH_2)_2-CH=C(CH_3)C_2H_5 \quad (6\text{-}55)$$

$$H_2C=CH-(CH_2)_2-CH=\underset{\underset{C_2H_5}{|}}{C}-(CH_2)_2-CH=C(C_2H_5)_2 \quad (6\text{-}56)$$

$$H_2C=CH-CH_2-CH=\underset{\underset{C_2H_5}{|}}{C}-(CH_2)_2-CH=C(C_2H_5)_2 \quad (6\text{-}57)$$

$$H_2C=CH-(CH_2)_2-CH=\underset{\underset{CH_2CH_2CH_3}{|}}{C}-CH_2-CH=C(CH_3)_2 \quad (6\text{-}58)$$

$$H_2C=CH-CH_2-CH=\underset{\underset{CH_2CH_2CH_3}{|}}{C}-CH_2-CH=C(CH_3)_2 \quad (6\text{-}59)$$

$$H_2C=CH-(CH_2)_2-CH=\underset{\underset{HC(CH_3)_2}{|}}{C}-CH_2-CH=C(CH_3)_2 \quad (6\text{-}60)$$

$$H_2C=CH-CH_2-CH=\underset{\underset{HC(CH_3)_2}{|}}{C}-CH_2-CH=C(CH_3)_2 \quad (6\text{-}61)$$

$$H_2C=CH-(CH_2)_2-CH=\underset{\underset{CH_2CH_2CH_3}{|}}{C}-(CH_2)_2-CH=C(CH_3)_2 \quad (6\text{-}62)$$

$$H_2C=CH-CH_2-CH=\underset{\underset{CH_2CH_2CH_3}{|}}{C}-(CH_2)_2-CH=C(CH_3)_2 \quad (6\text{-}63)$$

These compounds may be used alone or in combination of two or more of them.

The non-conjugated triene or tetraene (a-3) represented by the general formula (2-2) can be produced by known methods. For example, a Grignard reagent is prepared first by reacting a vinyl group-containing halogenide, such as allyl halide or vinyl halide, with matallic magnesium. Then, by reacting this Grignard reagent with a halide of a non-conjugated double bond-containing chain-formed hydrocarbon, such as geranyl halide, a non-conjugated triene or tetraene of the general formula (2-2) can be obtained by a free radical reaction.

Non-conjugated Triene or Tetraene of General Formula (2-3)

Among the non-conjugated trienes and tetraenes represented by the general formula (2-1), those which are represented by the following general formula (2-3) are also preferable:

$$H_2C=CH-CH_2-\underset{\underset{CH_3}{\underset{|}{CH}}}{\overset{\|}{C}}-\left(\underset{\underset{R^2}{|}}{\overset{R^1}{\underset{|}{C}}}\right)_f-\left(\underset{\underset{R^6}{|}}{\overset{R^5}{\underset{|}{C}}}\right)_g-CR^7=C(R^8)R^9 \quad (2\text{-}3)$$

In the above general formula (2-3), f denotes an integer of 0–5, g denotes an integer of 1–6, $R^1$, $R^2$, $R^5$, $R^6$ and $R^7$ represent each hydrogen atom or an alkyl group having 1–5 carbon atoms, $R^8$ denotes an alkyl group having 1–5 carbon atoms and $R^9$ denotes hydrogen atom, an alkyl group having 1–5 carbon atoms or a group represented by $-(CH_2)_n-CR^{10}=C(R^{11})R^{12}$ in which n is an integer of 1–5, $R^{10}$ and $R^{11}$ denote each hydrogen atom or an alkyl group having 1–5 carbon atoms and $R^{12}$ denotes an alkyl group having 1–5 carbon atoms.

The non-conjugated triene or tetraene (a-3) represented by the general formula (2-3) corresponds to the compound represented by the general formula (2-1) in which p is 1 and q is zero.

$R^1$, $R^2$, $R^5$, $R^6$ and $R^7$ in the general formula (2-3) denote each hydrogen atom or an alkyl group having 1–5 carbon atoms, preferably hydrogen atom or an alkyl group having 1–3 carbon atoms and, especially preferably, $R^1$, $R^2$, $R^5$ and $R^6$ are each hydrogen atom. In case $R^1$, $R^2$, $R^5$ and $R^6$ are each hydrogen atom, an unsaturated copolymer based on olefin (A) exhibiting superior polymerizability with higher vulcanization velocity and superior thermal stability can be obtained.

$R^8$ in the general formula (2-3) is an alkyl group having 1–5 carbon atoms, preferably 1–3 carbon atoms.

$R^9$ in the general formula (2-3) is hydrogen atom, an alkyl group having 1–5 carbon atoms, preferably 1–3 carbon atoms, or a group represented by $-(CH_2)_n-CR^{10}=C(R^{11})R^{12}$, in which n is an integer of 1–5, preferably 1–3, $R^{10}$ and $R^{11}$ denote each hydrogen atom or an alkyl group having 1–5 carbon atoms, preferably 1–3 carbon atoms, and $R^{12}$ is an alkyl group having 1–5 carbon atoms, preferably 1–3 carbon atoms. Most preferably, $R^9$ is an alkyl group having carbon atoms in numbers in the range given above.

Concrete examples of the non-conjugated trienes and tetraenes (a-3) represented by the general formula (2-3) include non-conjugated tetraenes represented by the general formula (2-4) given below and non-conjugated trienes represented by the general formula (2-5) given below. Among them, those non-conjugated trienes and tetraenes in which all of $R^1$, $R^2$, $R^5$ and $R^6$ are hydrogen atom are preferred. In case all of $R^1$, $R^2$, $R^5$ and $R^6$ are hydrogen atom, an unsaturated copolymer based on olefin exhibiting superior polymerizability with higher vulcanization velocity and superior thermal stability can be obtained.

An example of the non-conjugated triene in which all of $R^1$, $R^2$, $R^5$ and $R^6$ are hydrogen atom is shown in the following general formula (2-6):

$$H_2C=CH-CH_2-\underset{\underset{CH_3}{\overset{\overset{}{CH}}{\|}}}{C}-\left(\underset{R^2}{\overset{R^1}{\underset{|}{\overset{|}{C}}}}\right)_f-\left(\underset{R^6}{\overset{R^5}{\underset{|}{\overset{|}{C}}}}\right)_g-CR^7=CR^8+CH_2\underset{n}{\rightarrow}CR^{10}=C(CR^{11})R^{12} \quad (2\text{-}4)$$

$$H_2C=CH-CH_2-\underset{\underset{CH_3}{\overset{\overset{}{CH}}{\|}}}{C}-\left(\underset{R^2}{\overset{R^1}{\underset{|}{\overset{|}{C}}}}\right)_f-\left(\underset{R^6}{\overset{R^5}{\underset{|}{\overset{|}{C}}}}\right)_g-CR^7=C(R^8)R^9 \quad (2\text{-}5)$$

$$H_2C=CH-CH_2-\underset{\underset{CH_3}{\overset{\overset{}{CH}}{\|}}}{C}+CH_2\underset{f}{\rightarrow}+CH_2\underset{g}{\rightarrow}CR^7=C(R^8)R^9 \quad (2\text{-}6)$$

In the general formula (2-4), f denotes an integer of 0–5, g denotes an integer of 1–6. $R^1$, $R^2$, $R^5$, $R^6$ and $R^7$ represent each hydrogen atom or an alkyl group having 1–5 carbon atoms, $R^6$ denotes an alkyl group having 1–5 carbon atoms, n is an integer of 1–5, $R^{10}$ and $R^{11}$ denote each hydrogen atom or an alkyl group having 1–5 carbon atoms and $R^{12}$ denotes an alkyl group having 1–5 carbon atoms.

In the general formula (2-5), f denotes an integer of 0–5, g denotes an integer of 1–6. $R^1$, $R^2$, $R^5$, $R^6$ and $R^7$ represent each hydrogen atom or an alkyl group having 1–5 carbon atoms, $R^8$ denotes an alkyl group having 1–5 carbon atoms and $R^9$ denotes hydrogen atom or an alkyl group having 1–5 carbon atoms.

In the general formula (2-6), f, g, $R^7$ and $R^8$ are the same as those in the general formula (2-5). Preferable ones for $R^7$ and $R^8$ are the same as those for the general formula (2-3). $R^9$ is hydrogen atom or an alkyl having 1–5 carbon atoms, preferably 1–3 carbon atoms.

Concrete examples of the non-conjugated tetraenes (a-3) represented by the general formula (2-4) include the compounds of the formulae (7-1) to (7-73). Among them, 4-ethylidene-8,12-dimethyl-1,7,11-tridecatriene (EDT) of formula (7-30) is preferred.

$$H_2C=CH-CH_2-\underset{\overset{\|}{CHCH_3}}{C}-CH_2-CH=CH-CH_2-CH=CHCH_3 \quad (7\text{-}1)$$

$$H_2C=CH-CH_2-\underset{\overset{\|}{CHCH_3}}{C}-CH_2-CH=CH-CH_2-CH=C(CH_3)_2 \quad (7\text{-}2)$$

$$H_2C=CH-CH_2-\underset{\overset{\|}{CHCH_3}}{C}-CH_2-CH=CH-CH_2-\underset{\overset{|}{CH_3}}{C}=CHCH_3 \quad (7\text{-}3)$$

$$H_2C=CH-CH_2-\underset{\overset{\|}{CHCH_3}}{C}-CH_2-CH=CH-CH_2-\underset{\overset{|}{CH_3}}{C}=C(CH_3)_2 \quad (7\text{-}4)$$

$$H_2C=CH-CH_2-\underset{\overset{\|}{CHCH_3}}{C}-CH_2-CH=\underset{\overset{|}{CH_3}}{C}-CH_2-CH=CHCH_3 \quad (7\text{-}5)$$

$$H_2C=CH-CH_2-\underset{\overset{\|}{CHCH_3}}{C}-CH_2-\underset{\overset{|}{CH_3}}{C}=CH-CH_2-CH=CHCH_3 \quad (7\text{-}6)$$

$$H_2C=CH-CH_2-\underset{\overset{\|}{CHCH_3}}{C}-CH_2-\underset{\overset{|}{CH_3}}{C}=\underset{\overset{|}{CH_3}}{C}-CH_2-CH=CHCH_3 \quad (7\text{-}7)$$

-continued $$H_2C=CH-CH_2-\underset{\overset{\|}{CHCH_3}}{C}-CH_2-CH=\underset{\overset{|}{CH_3}}{C}-CH_2-CH=C(CH_3)_2 \quad (7\text{-}8)$$

$$H_2C=CH-CH_2-\underset{\overset{\|}{CHCH_3}}{C}-CH_2-\underset{\overset{|}{CH_3}}{C}=CH-CH_2-CH=C(CH_3)_2 \quad (7\text{-}9)$$

$$H_2C=CH-CH_2-\underset{\overset{\|}{CHCH_3}}{C}-CH_2-\underset{\overset{|}{CH_3}}{C}=\underset{\overset{|}{CH_3}}{C}-CH_2-CH=C(CH_3)_2 \quad (7\text{-}10)$$

$$H_2C=CH-CH_2-\underset{\overset{\|}{CHCH_3}}{C}-CH_2-CH=\underset{\overset{|}{CH_3}}{C}-CH_2-\underset{\overset{|}{CH_3}}{C}=C(CH_3)_2 \quad (7\text{-}11)$$

$$H_2C=CH-CH_2-\underset{\overset{\|}{CHCH_3}}{C}-CH_2-\underset{\overset{|}{CH_3}}{C}=CH-CH_2-\underset{\overset{|}{CH_3}}{C}=C(CH_3)_2 \quad (7\text{-}12)$$

$$H_2C=CH-CH_2-\underset{\overset{\|}{CHCH_3}}{C}-CH_2-\underset{\overset{|}{CH_3}}{C}=\underset{\overset{|}{CH_3}}{C}-CH_2-\underset{\overset{|}{CH_3}}{C}=C(CH_3)_2 \quad (7\text{-}13)$$

$$H_2C=CH-CH_2-\underset{\overset{\|}{CHCH_3}}{C}-(CH_2)_2-CH=CH-CH_2-\underset{\overset{|}{CH_3}}{C}=C(CH_3)_2 \quad (7\text{-}14)$$

$$H_2C=CH-CH_2-\underset{\overset{\|}{CHCH_3}}{C}-(CH_2)_2-CH=\underset{\overset{|}{CH_3}}{C}-CH_2-CH=CHCH_3 \quad (7\text{-}15)$$

$$H_2C=CH-CH_2-\underset{\overset{\|}{CHCH_3}}{C}-(CH_2)_2-\underset{\overset{|}{CH_3}}{C}=CH-CH_2-CH=CHCH_3 \quad (7\text{-}16)$$

$$H_2C=CH-CH_2-\underset{\overset{\|}{CHCH_3}}{C}-(CH_2)_2-\underset{\overset{|}{CH_3}}{C}=\underset{\overset{|}{CH_3}}{C}-CH_2-CH=CHCH_3 \quad (7\text{-}17)$$

$$H_2C=CH-CH_2-\underset{\overset{\|}{CHCH_3}}{C}-(CH_2)_2-CH=\underset{\overset{|}{CH_3}}{C}-CH_2-CH=C(CH_3)_2 \quad (7\text{-}18)$$

$$H_2C=CH-CH_2-\underset{\overset{\|}{CHCH_3}}{C}-(CH_2)_2-\underset{\overset{|}{CH_3}}{C}=CH-CH_2-CH=C(CH_3)_2 \quad (7\text{-}19)$$

$$H_2C=CH-CH_2-\underset{\overset{\|}{CHCH_3}}{C}-(CH_2)_2-\underset{\overset{|}{CH_3}}{C}=\underset{\overset{|}{CH_3}}{C}-CH_2-CH=C(CH_3)_2 \quad (7\text{-}20)$$

$$H_2C=CH-CH_2-\underset{\overset{\|}{CHCH_3}}{C}-(CH_2)_2-CH=\underset{\overset{|}{CH_3}}{C}-CH_2-\underset{\overset{|}{CH_3}}{C}=C(CH_3)_2 \quad (7\text{-}21)$$

$$H_2C=CH-CH_2-\underset{\overset{\|}{CHCH_3}}{C}-(CH_2)_2-\underset{\overset{|}{CH_3}}{C}=CH-CH_2-\underset{\overset{|}{CH_3}}{C}=C(CH_3)_2 \quad (7\text{-}22)$$

-continued $$H_2C=CH-CH_2-\underset{\underset{CHCH_3}{\|}}{C}-(CH_2)_3-\underset{\underset{CH_3}{|}}{C}=\underset{\underset{CH_3}{|}}{C}-CH_2-\underset{\underset{CH_3}{|}}{C}=C(CH_3)_2 \quad (7\text{-}23)$$

$$H_2C=CH-CH_2-\underset{\underset{CHCH_3}{\|}}{C}-CH_2-CH=\underset{\underset{CH_3}{|}}{C}-(CH_2)_2-CH=C(CH_3)_2 \quad (7\text{-}24)$$

$$H_2C=CH-CH_2-\underset{\underset{CHCH_3}{\|}}{C}-CH_2-\underset{\underset{CH_3}{|}}{C}=CH-(CH_2)_2-CH=C(CH_3)_2 \quad (7\text{-}25)$$

$$H_2C=CH-CH_2-\underset{\underset{CHCH_3}{\|}}{C}-CH_2-\underset{\underset{CH_3}{|}}{C}=\underset{\underset{CH_3}{|}}{C}-(CH_2)_2-CH=C(CH_3)_2 \quad (7\text{-}26)$$

$$H_2C=CH-CH_2-\underset{\underset{CHCH_3}{\|}}{C}-CH_2-CH=\underset{\underset{CH_3}{|}}{C}-(CH_2)_2-\underset{\underset{CH_3}{|}}{C}=C(CH_3)_2 \quad (7\text{-}27)$$

$$H_2C=CH-CH_2-\underset{\underset{CHCH_3}{\|}}{C}-CH_2-\underset{\underset{CH_3}{|}}{C}=CH-(CH_2)_2-\underset{\underset{CH_3}{|}}{C}=C(CH_3)_2 \quad (7\text{-}28)$$

$$H_2C=CH-CH_2-\underset{\underset{CHCH_3}{\|}}{C}-CH_2-\underset{\underset{CH_3}{|}}{C}=\underset{\underset{CH_3}{|}}{C}-(CH_2)_2-\underset{\underset{CH_3}{|}}{C}=C(CH_3)_2 \quad (7\text{-}29)$$

$$H_2C=CH-CH_2-\underset{\underset{CHCH_3}{\|}}{C}-(CH_2)_2-CH=\underset{\underset{CH_3}{|}}{C}-(CH_2)_2-CH=C(CH_3)_2 \quad (7\text{-}30)$$

$$H_2C=CH-CH_2-\underset{\underset{CHCH_3}{\|}}{C}-(CH_2)_2-\underset{\underset{CH_3}{|}}{C}=CH-(CH_2)_2-CH=C(CH_3)_2 \quad (7\text{-}31)$$

$$H_2C=CH-CH_2-\underset{\underset{CHCH_3}{\|}}{C}-(CH_2)_2-\underset{\underset{CH_3}{|}}{C}=\underset{\underset{CH_3}{|}}{C}-(CH_2)_2-CH=C(CH_3)_2 \quad (7\text{-}32)$$

$$H_2C=CH-CH_2-\underset{\underset{CHCH_3}{\|}}{C}-CH_2-\underset{\underset{CH_3}{|}}{C}=\underset{\underset{CH_3}{|}}{C}-(CH_2)_2-CH=CHCH_3 \quad (7\text{-}33)$$

$$H_2C=CH-CH_2-\underset{\underset{CHCH_3}{\|}}{C}-CH_2-CH=\underset{\underset{CH_3}{|}}{C}-(CH_2)_3-CH=C(CH_3)_2 \quad (7\text{-}34)$$

$$H_2C=CH-CH_2-\underset{\underset{CHCH_3}{\|}}{C}-CH_2-\underset{\underset{CH_3}{|}}{C}=CH-(CH_2)_3-CH=C(CH_3)_2 \quad (7\text{-}35)$$

$$H_2C=CH-CH_2-\underset{\underset{CHCH_3}{\|}}{C}-CH_2-\underset{\underset{CH_3}{|}}{C}=\underset{\underset{CH_3}{|}}{C}-(CH_2)_3-CH=C(CH_3)_2 \quad (7\text{-}36)$$

$$H_2C=CH-CH_2-\underset{\underset{CHCH_3}{\|}}{C}-CH_2-CH=\underset{\underset{CH_3}{|}}{C}-(CH_2)_3-\underset{\underset{CH_3}{|}}{C}=C(CH_3)_2 \quad (7\text{-}37)$$

$$H_2C=CH-CH_2-\underset{\underset{CHCH_3}{\|}}{C}-CH_2-\underset{\underset{CH_3}{|}}{C}=CH-(CH_2)_3-\underset{\underset{CH_3}{|}}{C}=C(CH_3)_2 \quad (7\text{-}38)$$

$$H_2C=CH-CH_2-\underset{\underset{CHCH_3}{\|}}{C}-CH_2-\underset{\underset{CH_3}{|}}{C}=\underset{\underset{CH_3}{|}}{C}-(CH_2)_3-\underset{\underset{CH_3}{|}}{C}=C(CH_3)_2 \quad (7\text{-}39)$$

$$H_2C=CH-CH_2-\underset{\underset{CHCH_3}{\|}}{C}-(CH_2)_3-CH=\underset{\underset{CH_3}{|}}{C}-CH_2-CH=C(CH_3)_2 \quad (7\text{-}40)$$

$$H_2C=CH-CH_2-\underset{\underset{CHCH_3}{\|}}{C}-(CH_2)_3-\underset{\underset{CH_3}{|}}{C}=CH-CH_2-CH=C(CH_3)_2 \quad (7\text{-}41)$$

$$H_2C=CH-CH_2-\underset{\underset{CHCH_3}{\|}}{C}-(CH_2)_3-\underset{\underset{CH_3}{|}}{C}=\underset{\underset{CH_3}{|}}{C}-CH_2-CH=C(CH_3)_2 \quad (7\text{-}42)$$

$$H_2C=CH-CH_2-\underset{\underset{CHCH_3}{\|}}{C}-(CH_2)_3-CH=\underset{\underset{CH_3}{|}}{C}-CH_2-\underset{\underset{CH_3}{|}}{C}=C(CH_3)_2 \quad (7\text{-}43)$$

$$H_2C=CH-CH_2-\underset{\underset{CHCH_3}{\|}}{C}-(CH_2)_3-\underset{\underset{CH_3}{|}}{C}=CH-CH_2-\underset{\underset{CH_3}{|}}{C}=C(CH_3)_2 \quad (7\text{-}44)$$

$$H_2C=CH-CH_2-\underset{\underset{CHCH_3}{\|}}{C}-(CH_2)_3-\underset{\underset{CH_3}{|}}{C}=\underset{\underset{CH_3}{|}}{C}-CH_2-\underset{\underset{CH_3}{|}}{C}=C(CH_3)_2 \quad (7\text{-}45)$$

$$H_2C=CH-CH_2-\underset{\underset{CHCH_3}{\|}}{C}-(CH_2)_2-CH=\underset{\underset{CH_3}{|}}{C}-(CH_2)_3-CH=C(CH_3)_2 \quad (7\text{-}46)$$

$$H_2C=CH-CH_2-\underset{\underset{CHCH_3}{\|}}{C}-(CH_2)_2-\underset{\underset{CH_3}{|}}{C}=CH-(CH_2)_3-CH=C(CH_3)_2 \quad (7\text{-}47)$$

$$H_2C=CH-CH_2-\underset{\underset{CHCH_3}{\|}}{C}-(CH_2)_2-\underset{\underset{CH_3}{|}}{C}=\underset{\underset{CH_3}{|}}{C}-(CH_2)_3-CH=C(CH_3)_2 \quad (7\text{-}48)$$

$$H_2C=CH-CH_2-\underset{\underset{CHCH_3}{\|}}{C}-(CH_2)_2-CH=\underset{\underset{CH_3}{|}}{C}-(CH_2)_2-\underset{\underset{CH_3}{|}}{C}=C(CH_3)_2 \quad (7\text{-}49)$$

$$H_2C=CH-CH_2-\underset{\underset{CHCH_3}{\|}}{C}-(CH_2)_2-\underset{\underset{CH_3}{|}}{C}=CH-(CH_2)_2-\underset{\underset{CH_3}{|}}{C}=C(CH_3)_2 \quad (7\text{-}50)$$

$$H_2C=CH-CH_2-\underset{\underset{CHCH_3}{\|}}{C}-(CH_2)_2-\underset{\underset{CH_3}{|}}{C}=\underset{\underset{CH_3}{|}}{C}-(CH_2)_2-\underset{\underset{CH_3}{|}}{C}=C(CH_3)_2 \quad (7\text{-}51)$$

$$H_2C=CH-CH_2-\underset{\underset{CHCH_3}{\|}}{C}-(CH_2)_2-CH=\underset{\underset{CH_3}{|}}{C}-(CH_2)_2-CH=C(CH_3)_2 \quad (7\text{-}52)$$

$$H_2C=CH-CH_2-\underset{\underset{CHCH_3}{\|}}{C}-(CH_2)_2-\underset{\underset{CH_3}{|}}{C}=CH-(CH_2)_2-CH=C(CH_3)_2 \quad (7\text{-}53)$$

$$H_2C=CH-CH_2-\underset{\underset{CHCH_3}{\|}}{C}-(CH_2)_2-\underset{\underset{CH_3}{|}}{C}=\underset{\underset{CH_3}{|}}{C}-(CH_2)_2-CH=C(CH_3)_2 \quad (7\text{-}54)$$

$$H_2C=CH-CH_2-\underset{\underset{CHCH_3}{\|}}{C}-(CH_2)_2-CH=\underset{\underset{CH_3}{|}}{C}-(CH_2)_2-\underset{\underset{CH_3}{|}}{C}=C(CH_3)_2 \quad (7\text{-}55)$$

$$H_2C=CH-CH_2-\underset{\underset{CHCH_3}{\|}}{C}-(CH_2)_2-\underset{\underset{CH_3}{|}}{C}=CH-(CH_2)_2-\underset{\underset{CH_3}{|}}{C}=C(CH_3)_2 \quad (7\text{-}56)$$

$$H_2C=CH-CH_2-\underset{\underset{CHCH_3}{\|}}{C}-CH_2-CH=\underset{\underset{CH_3}{|}}{C}-(CH_2)_2-CH=CH(C_2H_5) \quad (7\text{-}57)$$

$$H_2C=CH-CH_2-\underset{\underset{CHCH_3}{\|}}{C}-CH_2-CH=\underset{\underset{CH_3}{|}}{C}-(CH_2)_2-CH=CH(n\text{-}C_3H_7) \quad (7\text{-}58)$$

$$H_2C=CH-CH_2-\underset{\underset{CHCH_3}{\|}}{C}-CH_2-CH=\underset{\underset{CH_3}{|}}{C}-(CH_2)_2-CH=CH(i\text{-}C_3H_7) \quad (7\text{-}59)$$

$$H_2C=CH-CH_2-\underset{\underset{CHCH_3}{\|}}{C}-CH_2-CH=\underset{\underset{CH_3}{|}}{C}-(CH_2)_2-CH=C(CH_3)(C_2H_5) \quad (7\text{-}60)$$

$$H_2C=CH-CH_2-\underset{\underset{CHCH_3}{\|}}{C}-CH_2-CH=\underset{\underset{CH_3}{|}}{C}-(CH_2)_2-CH=C(CH_3)(n\text{-}C_3H_7) \quad (7\text{-}61)$$

$$H_2C=CH-CH_2-\underset{\underset{CHCH_3}{\|}}{C}-CH_2-CH=\underset{\underset{CH_3}{|}}{C}-(CH_2)_2-CH=C(CH_3)(i\text{-}C_3H_7) \quad (7\text{-}62)$$

$$H_2C=CH-CH_2-\underset{\underset{CHCH_3}{\|}}{C}-CH_2-CH=\underset{\underset{CH_3}{|}}{C}-(CH_2)_2-CH=C(C_2H_5)_2 \quad (7\text{-}63)$$

$$H_2C=CH-CH_2-\underset{\underset{CHCH_3}{\|}}{C}-CH_2-CH=\underset{\underset{CH_3}{|}}{C}-(CH_2)_2-CH=C(n\text{-}C_3H_7)_2 \quad (7\text{-}64)$$

-continued $$H_2C=CH-CH_2-\underset{\underset{CHCH_3}{\|}}{C}-CH_2-CH=\underset{\underset{CH_3}{|}}{C}-(CH_2)_2-CH=C(i\text{-}C_3H_7)_2 \quad (7\text{-}65)$$

$$H_2C=CH-CH_2-\underset{\underset{CHCH_3}{\|}}{C}-(CH_2)_2-\underset{\underset{C_2H_5}{|}}{C}=CH-CH_2-CH=C(CH_3)_2 \quad (7\text{-}66)$$

$$H_2C=CH-CH_2-\underset{\underset{CHCH_3}{\|}}{C}-(CH_2)_2-\underset{\underset{C_2H_5}{|}}{C}=CH-(CH_2)_2-CH=C(CH_3)_2 \quad (7\text{-}67)$$

$$H_2C=CH-CH_2-\underset{\underset{CHCH_3}{\|}}{C}-(CH_2)_2-CH=\underset{\underset{C_2H_5}{|}}{C}-CH_2-CH=C(C_2H_5)_2 \quad (7\text{-}68)$$

$$H_2C=CH-CH_2-\underset{\underset{CHCH_3}{\|}}{C}-(CH_2)_2-CH=\underset{\underset{C_2H_5}{|}}{C}-(CH_2)_2-CH=C(C_2H_5)_2 \quad (7\text{-}69)$$

$$H_2C=CH-CH_2-\underset{\underset{CHCH_3}{\|}}{C}-(CH_2)_2-CH=\underset{\underset{n\text{-}C_3H_7}{|}}{C}-(CH_2)_2-CH=C(CH_3)_2 \quad (7\text{-}70)$$

$$H_2C=CH-CH_2-\underset{\underset{CHCH_3}{\|}}{C}-(CH_2)_2-CH=\underset{\underset{i\text{-}C_3H_7}{|}}{C}-(CH_2)_2-CH=C(CH_3)_2 \quad (7\text{-}71)$$

$$H_2C=CH-CH_2-\underset{\underset{CHCH_3}{\|}}{C}-(CH_2)_2-\underset{\underset{n\text{-}C_3H_7}{|}}{C}=CH-(CH_2)_2-CH=C(CH_3)_2 \quad (7\text{-}72)$$

$$H_2C=CH-CH_2-\underset{\underset{CHCH_3}{\|}}{C}-(CH_2)_2-\underset{\underset{i\text{-}C_3H_7}{|}}{C}=CH-(CH_2)_2-CH=C(CH_3)_2 \quad (7\text{-}73)$$

As the non-conjugated trienes (a-3) represented by the general formula (2-6), there may be enumerated concretely, for example, the compounds (8-1) to (8-24) given below. Among them, compounds (8-5), (8-6), (8-9), (8-11), (8-14), (8-19) and (8-20) are preferred.

(8-1) 4-ethylidene-1,6-octadiene
(8-2) 7-methyl-4-ethylidene-1,6-octadiene
(8-3) 7-methyl-4-ethylidene-1,6-nonadiene
(8-4) 7-ethyl-4-ethylidene-1,6-nonadiene
(8-5) 6,7-dimethyl-4-ethylidene-1,6-octadiene
(8-6) 6,7-dimethyl-4-ethylidene-1,6-nonadiene
(8-7) 4-ethylidene-1,6-decadiene
(8-8) 7-methyl-4-ethylidene-1,6-decadiene
(8-9) 7-methyl-6-propyl-4-ethylidene-1,6-octadiene
(8-10) 4-ethylidene-1,7-nonadiene
(8-11) 8-methyl-4-ethylidene-1,7-nonadiene (EMN)
(8-12) 4-ethylidene-1,7-undecadiene
(8-13) 8-methyl-4-ethylidene-1,7-undecadiene
(8-14) 7,8-dimethyl-4-ethylidene-1,7-nonadiene
(8-15) 7,8-dimethyl-4-ethylidene-1,7-decadiene
(8-16) 7,8-dimethyl-4-ethylidene-1,7-undecadiene
(8-17) 8-methyl-7-ethyl-4-ethylidene-1,7-undecadiene
(8-18) 7,8-diethyl-4-ethylidene-1,7-decadiene
(8-19) 9-methyl-4-ethylidene-1,8-decadiene
(8-20) 8,9-dimethyl-4-ethylidene-1,8-decadiene
(8-21) 10-methyl-4-ethylidene-1,9-undecadiene
(8-22) 9,10-dimethyl-4-ethylidene-1,9-undecadiene
(8-23) 11-methyl-4-ethylidene-1,10-dodecadiene
(8-24) 10,11-dimethyl-4-ethylidene-1,10-dodecadiene In the following, the chemical formulae of these compounds (8-1) to (8-24) are recited:

$$H_2C=CH-CH_2-\underset{\underset{HCCH_3}{\|}}{C}-CH_2-CH=CHCH_3 \quad (8\text{-}1)$$

$$H_2C=CH-CH_2-\underset{\underset{HCCH_3}{\|}}{C}-CH_2-CH=C(CH_3)_2 \quad (8\text{-}2)$$

-continued $$H_2C=CH-CH_2-\underset{\underset{HCCH_3}{\|}}{C}-CH_2-CH=C(CH_3)C_2H_5 \quad (8\text{-}3)$$

$$H_2C=CH-CH_2-\underset{\underset{HCCH_3}{\|}}{C}-CH_2-CH=C(C_2H_5)_2 \quad (8\text{-}4)$$

$$H_2C=CH-CH_2-\underset{\underset{HCCH_3}{\|}}{C}-CH_2-C(CH_3)=C(CH_3)_2 \quad (8\text{-}5)$$

$$H_2C=CH-CH_2-\underset{\underset{HCCH_3}{\|}}{C}-CH_2-C(CH_3)=C(CH_3)C_2H_5 \quad (8\text{-}6)$$

$$H_2C=CH-CH_2-\underset{\underset{HCCH_3}{\|}}{C}-CH_2-CH=CHCH_2CH_3 \quad (8\text{-}7)$$

$$H_2C=CH-CH_2-\underset{\underset{HCCH_3}{\|}}{C}-CH_2-CH=C(CH_3)CH_2CH_3 \quad (8\text{-}8)$$

$$H_2C=CH-CH_2-\underset{\underset{HCCH_3}{\|}}{C}-CH_2-C(CH_2CH_2CH_3)=C(CH_3)_2 \quad (8\text{-}9)$$

$$H_2C=CH-CH_2-\underset{\underset{HCCH_3}{\|}}{C}-CH_2CH_2-CH=CHCH_3 \quad (8\text{-}10)$$

$$H_2C=CH-CH_2-\underset{\underset{HCCH_3}{\|}}{C}-CH_2CH_2-CH=C(CH_3)_2 \quad (8\text{-}11)$$

$$H_2C=CH-CH_2-\underset{\underset{HCCH_3}{\|}}{C}-CH_2CH_2-CH=CHCH_2CH_3 \quad (8\text{-}12)$$

$$H_2C=CH-CH_2-\underset{\underset{HCCH_3}{\|}}{C}-(CH_2)_2-CH=C(CH_3)CH_2CH_3 \quad (8\text{-}13)$$

$$H_2C=CH-CH_2-\underset{\underset{HCCH_3}{\|}}{C}-(CH_2)_2-C(CH_3)=C(CH_3)_2 \quad (8\text{-}14)$$

$$H_2C=CH-CH_2-\underset{\underset{HCCH_3}{\|}}{C}-(CH_2)_2-C(CH_3)=C(CH_3)C_2H_5 \quad (8\text{-}15)$$

$$H_2C=CH-CH_2-\underset{\underset{HCCH_3}{\|}}{C}-(CH_2)_2-C(CH_3)=C(CH_3)CH_2CH_3 \quad (8\text{-}16)$$

$$H_2C=CH-CH_2-\underset{\underset{HCCH_3}{\|}}{C}-(CH_2)_2-C(C_2H_5)=C(CH_3)CH_2CH_3 \quad (8\text{-}17)$$

$$H_2C=CH-CH_2-\underset{\underset{HCCH_3}{\|}}{C}-(CH_2)_2-C(C_2H_5)=C(C_2H_5)_2 \quad (8\text{-}18)$$

$$H_2C=CH-CH_2-\underset{\underset{HCCH_3}{\|}}{C}-(CH_2)_3-CH=C(CH_3)_2 \quad (8\text{-}19)$$

$$H_2C=CH-CH_2-\underset{\underset{HCCH_3}{\|}}{C}-(CH_2)_3-C(CH_3)=C(CH_3)_2 \quad (8\text{-}20)$$

$$H_2C=CH-CH_2-\underset{\underset{HCCH_3}{\|}}{C}-(CH_2)_4-CH=C(CH_3)_2 \quad (8\text{-}21)$$

$$H_2C=CH-CH_2-\underset{\underset{HCCH_3}{\|}}{C}-(CH_2)_4-C(CH_3)=C(CH_3)_2 \quad (8\text{-}22)$$

$$H_2C=CH-CH_2-\underset{\underset{HCCH_3}{\|}}{C}-(CH_2)_5-CH=C(CH_3)_2 \quad (8\text{-}23)$$

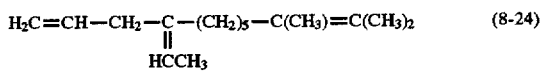

(8-24)

They are used alone or in combination of two or more of them.

According to the present invention, the non-conjugated trienes and tetraenes (a-3) can be employed solely or in combination of two or more of them. For example, it is either permissible to use the non-conjugated trienes or non-conjugated tetraenes represented by the general formula (2-2) solely or in combination of two or more of them or to use one or more non-conjugated trienes or tetraenes represented by the general formula (2-4) in combination with one or more non-conjugated trienes or tetraenes represented by the general formulae (2-5) and (2-6) or, further, to use one or more non-conjugated trienes or tetraenes represented by the general formula (2-2) in combination with one or more non-conjugated trienes or tetraenes represented by the general formula (2-3).

The molecular structure of the non-conjugated triene or tetraene (a-3) can be determined by means of, for example, mass spectrometry, infrared absorption spectrometry and proton-NMR spectrometry.

In the non-conjugated triene or tetraene (a-3) according to the present invention, there are geometrical isomers due to the double bond therein. According to the present invention, both trans- and cis-isomers can be used. It is also possible to use a mixture of trans- and cis-isomers. In the context of this application, every structural formula given in the specification, such as those of (6-1) to (6-63), (7-1) to (7-73) and (8-1) to (8-24), should not be understood to restrict any possible three dimensional structure.

Now, the description is directed to the method for producing the non-conjugated triene or tetraene (a-3) represented by the general formula (2-3).

The non-conjugated triene or tetraene (a-3) represented by the general formula (2-3) can be produced by, for example, the method described in the prior Japanese Patent Kokai Hei-6-154952 according to the applicant of the present application. Namely, it can be synthesized by reacting a conjugated diene compound (E) represented by the following general formula (9-1) or (9-2) with ethylene.

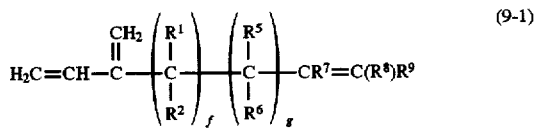

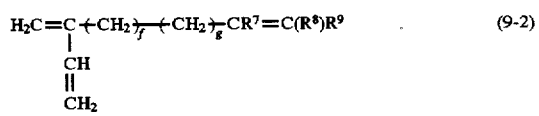

In the general formulae (9-1) and (9-2), the symbols f, g, $R^1$, $R^2$ and $R^5$–$R^9$ are the same as those in the general formula (2-3).

Upon the reaction of the conjugated diene compound (E) represented by the geneal formula (9-1) or (9-2) with ethylene, a by-product such as that represented by the general formula (10-1) or (10-2) may eventually be formed. Such a by-product may be removed by, for example, distillation or so on, though it is permissible to use the reaction product directly in the copolymerization without removing such a by-product.

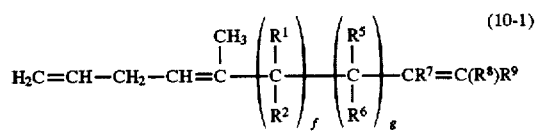

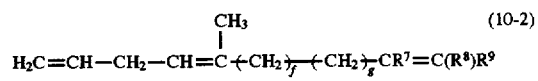

In the general formulae (10-1) and (10-2), the symbols f, g, $R^1$, $R^2$ and $R^6$–$R^9$ are the same as those in the general formula (2-3).

As the conjugated diene compounds represented by the general formula (9-2), there may be enumerated, for example, the following compounds:

3-methylene-1,5-heptadiene, 6-methyl-3-methylene-1,5-heptadiene, 6-methyl-3-methylene-1,5-octadiene, 6-ethyl-3-methylene-1,5-octadiene, 5,6-dimethyl-3-methylene-1,5-heptadiene, 5,6-dimethyl-3-methylene-1,5-octadiene, 3-methylene-1,5-nonadiene, 6-methyl-3-methylene-1,5-nonadiene, 6-methyl-5-propyl-3-methylene-1,5-heptadiene, 3-methylene-1,6-octadiene, 7-methyl-3-methylene-1,6-octadiene, 3-methylene-1,6-decadiene, 7-methyl-3-methylene-1,6-decadiene, 6,7-dimethyl-3-methylene-1,6-octadiene, 6,7-dimethyl-3-methylene-1,6-nonadiene, 6,7-dimethyl-3-methylene-1,6-decadiene, 7-methyl-6-ethyl-3-methylene-1,6-decadiene, 6,7-diethyl-3-methylene-1,6-nonadiene, 8-methyl-3-methylene-1,7-nonadiene, 7,8-dimethyl-3-methylene-1,7-nonadiene, 9-methyl-3-methylene-1,8-decadiene, 8,9-dimethyl-3-methylene-1,8-decadiene, 10-methyl-3-methylene-1,9-undecadiene and 9,10-dimethyl-3-methylene-1,9-undecadiene.

The reaction of the conjugated diene compound (H) with ethylene may be realized usually at a temperature of 50°–200° C., preferably 70°–150° C., under an ethylene pressure of 0.049–9.8 MPa (0.5–100 kgf/cm² gauge), preferably 0.98–9.8 MPa (1–100 kgf/cm² gauge), more preferably 0.49–6.9 MPa (5–70 kgf/cm² gauge), for 0.5–30 hours. Ethylene may be supplied to the reaction vessel either continuously or intermittently.

The rection may be carried out in an atmosphere of inert gas, such as nitrogen or argon. While the reaction can be effected without using any solvent, it is possible to carry out the reaction in an inactive solvent based on hydrocarbon, such as, hexane, heptane, octane, nonane, decane, undecane, dodecane, tridecane, toluene or xylene.

By such reaction, the objective non-conjugated triene or tetraene (a-3) is obtained usually as a mixture of the trans- and cis-isomers, while only one stereoisomer may occasionally be obtained as a single product. A product of such a mixture can be separated by distillation into the trans- and cis-isomers. However, such a mixture product can be supplied as such to the copolymerization without separating the stereoisomers for producing the unsaturated copolymer based on olefin (A).

The reaction of the conjugated diene compound (E) with ethylene is realized usually in the presence of a catalyst. In particular, the contemplated non-conjugated triene or tetraene (a-3) can be obtained in an efficient manner, when the reaction is carried out in the presence of a catalyst composed of a transition metal compound (F) and an organoaluminum compound (G).

As the transition metal compound (F), there may be enumerated, for example, chlorides, bromides, acetylacetonato salts, 1,1,1,5,5,5-hexafluoroacetylacetonato salts and dipivaloylmethane salts of transition matals selected from the elements of VIII group of the periodic table, such as iron, ruthenium, cobalt, rhodium, iridium, nickel and palladium. Among them, compounds (chlorides) of cobalt, iron, nickel, rhodium and palladium are preferred and preference is in particular given to cobalt compound (chloride), wherein cobalt chloride is most preferred.

While these transition metal compounds (F), for example, transition metal chlorides, may be introduced into the reaction for preparing the catalyst without any pretreatment, it is desirable to incorporate the transition metal compound (F) in a form of a complex in which organic ligands are coordinated to the transition metal. Thus, it is preferable to carry out the reaction for the catalyst preparation either in the co-existence of an organic compound (coordinating compound) which can form a ligand for the complex of transition metal or in the presence of a transition metal complex preliminarily prepared from a transition matal compound (F) and an organic coordinating compound.

Examples of such compounds capable of forming a ligand of transition metal complex include bis(diphenylphosphino) methane, 1,2-bis(diphenylphosphino)ethane, 1,3-bis (diphenylphosphino)propane, 1,4-bis(diphenylphosphino) butane, triethylphosphine, tributylphosphine, triphenylphosphine, cyclooctadiene and cyclooctatetraene.

Preferred examples of the complex prepared preliminarily from a transition metal compound (F) by coordinating organic ligand to the transition metal include [1,2-bis (diphenylphosphino)ethane]cobalt(II) chloride, [1,2-bis (diphenylphosphino)ethane]nickel(II) chloride and bis (triphenylphosphine)nickel(II) chloride.

For the organoaluminum compound (G) mentioned above, those which will be described afterwards may be employed, among which triethylaluminum is most preferred. The organoaluminum compound can be added as such or in a form of a solution in toluene or hexane.

In the reaction of the conjugated diene compound (E) with ethylene, the transition metal compound (F) may be used preferably in an amount of 0.001–10 mole %, especially preferably 0.01–1 mole %, based on the molar amount of the conjugated diene compound (E). The coordinating compound may be used preferably in an amount of 0–20 moles, especially preferably 0.1–5 moles, per one mole of the transition metal compound (F).

The organoaluminum compound (G) may be used preferably in an amount of 1–200 moles, especially preferably 3–100 moles, per one mole of the transition metal compound (F).

While it is permissible to prepare the catalyst in situ within the reaction system containing the conjugated diene compound (E) and ethylene by reacting the compound (F) or the complex of the transition metal with the organoaluminum compound (G), it is preferable to used, as the catalyst, a reaction product prepared preliminarily by contacting the compound (F) or the complex of the transition metal with the organoaluminum compound (G).

Thus, the catalyst can be prepared in an inert atmosphere in a solvent, such as decane, which is the same as the reaction medium for preparing the non-conjugated triene or tetraene, by mixing a transition metal compound (F) and a coordinating compound with addition thereto an organoaluminum compound (G) while agitating the mixture at room temperature.

When a compound represented by the following general formula (11) is employed for the conjugated diene compound, a non-conjugated tetraene (a-3) represented by the general formula (2-4) is obtained.

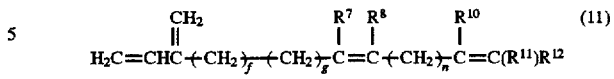

In the general formula (11), the symbols f, g, n and $R^7$-$R^{11}$ are the same as those of the general formula (2-4).

In the reaction of the conjugated diene compound (E) represented by the general formula (11) with ethylene, it is preferable to supply ethylene to the reaction vessel at a pressure of 0.049–9.8 MPa (0.5–100 kgf/cm² gauge), preferably 0.098–4.9 MPa (1–50 kgf/cm² gauge). Other reaction conditions are the same as those in the reaction of the conjugated diene compound (E) represented by the general formula (9-1) with ethylene.

In using the conjugated diene compound (E) represented by the general formula (11), a by-product represented by the following general formula (12) may occasionally be formed. Such a by-product may be removed by distillation or the like, while it is permissible to use the reaction product for the copolymerization without removing such a by-product.

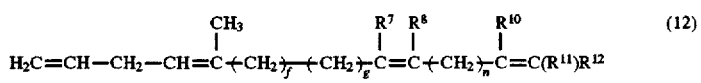

In the general formula (12), the symbols f, g, n and $R^7$-$R^{12}$ are the same as those of the general formula (11).

The unsaturated copolymer based on olefin (A) may have other constituent comonomer component(s) copolymerized therein derived from other comonomer(s) copolymerizable with the comonomers of α-olefin (a-1), aromatic ring-contiaining vinyl monomer (a-2) or non-conjudated triene or tetraene (a-3), within a permissible range not deteriorating the purpose of the invention. For such other comonomer, although there is no special restriction so long as being capable of copolymerization with the constituent comonomers (a-1) to (a-3), there may be incorporated, for example, aliphatic and alicyclic non-conjugated dienes (a-4) and (a-5) having in the molecule one carbon-to-carbon double bond capable of copolymerizing with the constituent comonomers (a-1) to (a-3) and, further, non-conjugated dienes (a-6) having in the molecule two carbon-to-carbon double bonds capable of copolymerizing with the constituent comonomers (a-1) to (a-3).

For the aliphatic non-conjugated diene (a-4), there may be enumerated, for example, 1,4-hexadiene, 1,5-heptadiene, 1,6-octadiene, 1,7-nonadiene, 1,8-decadiene, 1,12-tetradecadiene, 3-methyl-1,4-hexadiene, 4-methyl-1,4-hexadiene, 5-methyl-1,4-hexadiene, 4-ethyl-1,4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1, 5-octadiene, 5-ethyl-1,5-octadiene, 6-ethyl-1,5-octadiene, 6-methyl-1,6-octadiene, 7-methyl-1,6-octadien, 6-ethyl-1,6-octadiene, 6-propyl-1,6-octadiene, 6-butyl-1,6-octadiene, 7-methyl-1,6-octadien, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene and 9-methyl-1,8-undecadiene. Among them, 7-methyl-1,6-octadiene and the like are preferred. They may be incorporated alone or in combination of two or more of them.

For the alicyclic non-conjugated diene (a-5), there may be enumerated, for example, 5-ethylidene-2-norbornene, 5-propylidene-2-norbornene, 5-butylidene-2-norbornene, 2-methyl-2,5-norbornagiene and 2-ethyl-2,5-norbornadiene. Among them, 5-ethylidene-2-norbornene is preferred. They may be incorporated alone or in combination of two or more of them.

For the non-conjugated diene (a-6), there, may be enumerated, for example, 5-alkenyl-2-norbornenes, such as 5-vinyl-2-norbornene and 5-allyl-2-norbornene; alicyclic dienes, such as, 2,5-norbornadiene, dicyclopentadiene, norbornadiene and tetracyclo[4,4,0,1$^{2,5}$, 1$^{7,10}$]deca-3,8-diene; and α, ω-dienes, such as 1,7-octadiene and 1,9-decadiene. Among them, 5-alkenyl-2-norbornenes, dicyclopentadiene, 2,5-norbornadiene, 1,7-octadiene and 1,9-decadiene are preferred, with particular preference to 5-vinyl-2-norbornene. They may be incorporated alone or in combination of two or more of them.

The aliphatic non-conjugated diene (a-4) and/or the alicyclic non-conjugated diene (a-5) may be incorporated in combination with the non-conjugated diene (a-6).

The unsaturated copolymer based on olefin (A) according to the present invention has a molecular structure in which the constituent structural units derived from the α-olefin (a-1), the aromatic ring-containing vinyl monomer (a-2) and the non-conjugated triene or tetraene (a-3) are combined together in a random arrangement. It includes unsaturation bonds inherited from the non-conjugated triene or tetraene (a-3). The main chain of the unsaturated copolymer based on olefin (A) according to the present invention is substantially in a form of a linear structure, in which side chains possessed of, for example, double bonds, originated from the corresponding comonomer are present. The fact that the unsaturated copolymer based on olefin according to the present invention has substantially a liner structure and is substantially devoid of a cross-linked gelled polymeric structure can be confirmed from the fact that it dissolves in various organic solvents completely without substantially leaving any insoluble residue. For example, this can be confirmed by complete dissolution of the unsaturated copolymer according to the present invention in decalin at 135° C. on determining the intrinsic viscosity [η] thereof.

The unsaturated copolymer based on olefin (A) according to the present invention contains in the molecule 30–99.8 mole %, preferably 40–98 mole %, more preferably 50–95 mole %, furthermore preferably 65–95 mole %, in particular 80–95 mole %, of the constituent structural unit (b-1) derived from the α-olefin having 2–20 carbon atoms, 0.1–60 mole %, preferably 1–50 mole %, more preferably 2–40 mole %, furthermore preferably 2–30 mole %, in particular 2–20 mole %, of the constituent structural unit (b-2) derived from the aromatic ring-containing vinyl monomer (a-2) and 0.1–10 mole %, preferably 0.2–7 mole %, more preferably 0.3–5 mole %, furthermore preferably 0.4–5 mole %, in particular 0.5–5 mole %, of the constituent structural unit (b-3) derived from the non-conjugated triene or tetraene (a-3). If the content of the structural unit (b-3) is in the above range, the vulcanization velocity of the resulting rubber composition will be improved, wherein a vulcanization of such a rubber composition will result in a cured rubber product exhibiting superior material properties.

A preferred unsaturated copolymer based on olefin according to the present invention has a mole ratio of the structural unit (b-1) derived from the α-olefin to the structural unit (b-2) derived from the aromatic ring-containing vinyl monomer [(b-1)/(b-2)] in the range from 50/50 to 98/2, preferably from 55/45 to 96/4, more preferably from 60/40 to 94/6. An unsaturated copolymer having the above-mentioned mole ratio in the range given above will bring about a vulcanized blended rubber product exhibiting superior vulcanized properties with excellent low temperature characteristic.

In the unsaturated copolymer based on olefin according to the present invention obtained using a non-conjugated triene or tetraene (a-3) represented by the general formula (2-1) given previously, the structural unit (b-3) has substantially the structure shown in the following general formula (3-1). When the non-conjugated triene or tetraene (a-3) is represented by the general formula (2-2), (2-3), (2-4) or (2-5), the structural unit derived from such a comonomer will have a structure represented by the general formula (3-2), (3-3), (3-4) or (3-5), respectively, as recited below.

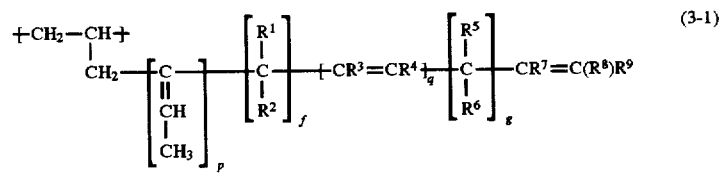

(3-1)

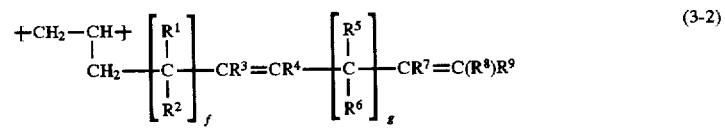

(3-2)

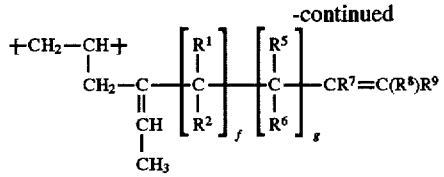
(3-3)

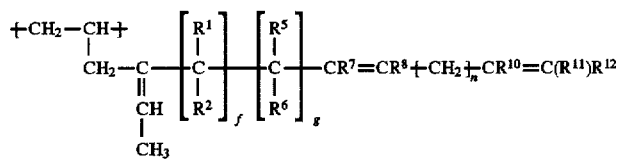
(3-4)

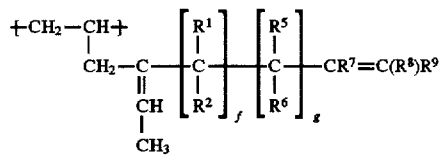
(3-5)

In the general formulae (3-1) to (3-5), the symbols f, g, n and $R^7$–$R^2$ are the same as those of the general formulae (2-1) to (2-5).

It is able to confirm that the structural unit (b-3) derived from the non-conjugated triene or tetraene (a-3) has the structure as shown above by analyzing $^{13}$C-NMR spectra of the unsaturated copolymer based on olefin.

The unsaturated copolymer based on olefin (A) according to the present invention has an intrinsic viscosity [ω] determined in Decalin® (Decahydronaphthalene) at 135° C. in the range of 0.05–10 dl/g, preferably 0.1–7 dl/g, more preferably 0.2–5 dl/g.

The unsaturated copolymer based on olefin (A) according to the present invention is superior in dynamic fatigue resistance (resistance to flexural fatigue), weatherability, fastness to ozone, resistance to thermal aging and low temperature characteristic and is also excellent in chemical reactivity, workability and compatibility as well as co-vulcanizability with aromatic ring-containing polymers, such as styrene-butadiene rubber (SBR) etc.

The unsaturated copolymer based on olefin (A) according to the present invention can be brought into practical use either in the unvulcanized state or as products vulcanized by the technique described afterwards. The material properties will be increased by vulcanization. In vulcanization, a higher velocity of vulcanization is attained, while the scorch time will not be reduced.

The unsaturated copolymer based on olefin (A) according to the present invention can be used especially preferentially for a material for various rubber products and for a modifier of resins.

Rubber products made therefrom include parts in the automobile industry, industrial rubber products, electric insulator, material for architectural and constructional purposes and rubber coated cloths. Concrete examples of application include glass run channel, weather strip, sponge, hoses, grommet, tire side wall, sheath of electric cable and gaskets.

When the unsaturated copolymer based on olefin (A) according to the present invention is added to a resin, such as polypropylene, polyethylene, polybutene or polystyrene, as a resin modifier, the shock resistance and the stress cracking resistance will remarkably be increased.

The unsaturated copolymer based on olefin (A) according to the present invention can be vulcanized alone or co-vulcanized as a blend with other rubber components.

Due to the higher vulcanization velocity of the unsaturated copolymer (A) according to the present invention, the vulcanization can be realized within a shorter time even if the vulcanizing agent is used in a lower amount, or can be achieved at a lower temperature, as compared with conventional unsaturated copolymers based on olefin, so that an efficient production of vulcanized rubber can be attained.

The unsaturated copolymer based on olefin (A) according to the present invention is superior in the co-vulcanizability especially with natural rubber and diene-rubbers, such as, styrene-butadiene rubber, isoprene rubber, butadiene rubber, nitrile rubber and chloroprene rubber. The co-vulcanized product of a blend of the unsaturated copolymer (A) according to the present invention with a diene-rubber is superior in weatherability, fastness to ozone and fastness to thermal aging, in addition to superior mechanical properties, wear resistance, dynamic fatigue resistance and resistance to oils intrinsic to the diene-rubber. For example, a co-vulcanized product of a blend of the unsaturated copolymer based on olefin (A) according to present invention and natural rubber is superior in the strength, weatherability, fastness to ozone and dynamic charactristic. A co-vulcanized product of a blend of the unsaturated copolymer based on olefin (A) according to present invention and nitrile rubber is superior in the weatherability, fastness to ozone and resistance to oils. A co-vulcanized product of a blend of the unsaturated copolymer (A) based on olefin according to the present invention and butadiene rubber is superior in weatherability, fastness to ozone and wear resistance.

Production of Unsaturated Copolymer Based on Olefin (A)

The unsaturated copolymer based on olefin (A) according to the present invention can be produced by co-polymerizing the α-olefin (a-1), an aromatic ring-containing vinyl monomer (a-2) and non-conjugated triene or tetraene (a-3) in the presence of a catalyst. As the catalyst, such one, which is composed of a transition metal compound (H), such as vanadium (V), zirconium (Zr) or titanium (Ti), and an organoaluminum oxy-compound (J) and/or an ionized ionic compound (K), can be employed.

Concrete examples of the catalyst include
1) a catalyst based on titanium, composed of a solid titaniferous catalyst component (h-1) and an organoaluminum compound (j-1);
2) a catalyst based on vanadium, composed of a soluble vanadium compound (h-2) and an organoaluminum compound (j-1); and 3) a catalyst based on metallocene, composed of a metallocene (h-3) of a transition metal selected from the elements of group IVB of the periodic table and an organoaluminum compound (j-2) and/or an ionized ionic compound (k-1).

Among them, the catalyst based on metallocene is preferred. The catalyst based on metallocene has a high catalytic activity and brings about an unsaturated copolymer product based on olefin (A), which has a narrow molecular weight distribution and a narrow structural distribution with high conversion of the aromatic ring-containing vinyl monomer (a-2) and of the non-conjugated triene or tetraene (a-3).

The solid titaniferous catalyst component (h-1) is prepared by bringing a titanium compound, a magnesium compound and an electron donor, as described below, into contact with each other.

As the titanium compound, a compound of trivalent or tetravalent titanium is employed, wherein tetravalent titanium compound is preferred. As the tetravalent titanium compound, for example, tetravalent titanium compounds represented by $Ti(OR)_jX_{4-j}$ (in which R is a hydrocarbon group, X is a halogen atom and $0 \leq j \leq 4$) may be enumerated. Among them, halogen-containing titanium compounds are preferred, wherein preference is given to titanium tetrahalides, especially titanium tetrachloride.

The magnesium compound to be used for preparing the solid titaniferous component (h-1) may be a magnesium compound which may or may not exhibit a reducing property. As the magnesium compound exhibiting a reducing property, those which have magnesium-to-carbon bond(s) and magnesium-to-hydrogen bond(s) may be enumerated. As the magnesium compound which does not exhibit reducing property, those which are derived from the above-mentioned reducible magnesium compounds or those which are derived upon the preparation of the catalyst component may be employed. It is also possible to use a complex, composite compound or a mixture composed of such a magnesium compound and other metal or metal compound. A mixture of two or more of such a magnesium compound may also be employed. As the magnesium compound, those which do not exhibit reducing property are preferred, with preference to halogen-containing ones, especially to magnesium chloride, an alkoxy magnesium chloride and an aryloxy magnesium chloride.

As the electron donor to be employed for preparing the solid titaniferous catalyst component (h-1), esters of organic carboxylic acids and esters of polybasic carboxylic acids may be enumerated.

The solid titaniferous catalyst component (h-1) can be prepared by bringing a titanium compound, a magnesium compound (or metallic magnesium) and an electron donor, as described above, into contact with each other. For preparing the solid titaniferous catalyst component, a known method for preparing a highly active titaniferous catalyst component from a titanium compound, a magnesium compound and an electron donor may be employed. On contacting the above three components, they can be brought into contact in the presence of other reaction reagent, such as a compound of silicium, phosphorus or aluminum.

As the organoaluminum compound (j-1) for building up the catalyst based on titanium, compounds containing at least one Al-to-carbon bond in the molecule may be employed.

Examples of such compounds include organo-aluminum compounds represented by the general formula (13)

$$(R^1)_mAl(OR^2)_nH_pX_q \qquad (13)$$

in which $R^1$ and $R^2$ denote each a hydrocarbon group containing usually 1–15 carbon atoms, preferably 1–4 carbon atoms, which may be identical with or different from each other, X is a halogen atom, $0<m \leq 3$, $0 \leq n<3$, $0 \leq p<3$ and $0 \leq q<3$, with $m+n+p+q=3$; and organoaluminum complex compounds represented by the general formula (14)

$$(M^1)Al(R^1)_4 \qquad (14)$$

in which $M^1$ is Li, Na or K and $R^1$ has the same meaning as that in the general formula (13).

For preparing the catalyst based on titanium, an electron donor may be incorporated on requirement. For such an electron donor, organosilicon compounds as represented by the general formulae (15) and (16) may be employed:

$$R_nSi(OR')_{4-n} \qquad (15)$$

$$SiR^1R^2_m(OR^3)_{3-m} \qquad (16)$$

In the general formula (15), R and R' denote each a hydrocarbon group and n is a number sufficing the condition $0<n<4$.

In the general formula (16), $R^1$ denotes cyclopentyl or an alkyl-containing cyclopentyl, $R^2$ is an alkyl, a cyclopentyl or an alkyl-containing cyclopentyl, $R^3$ is a hydrocarbon group and m is a number sufficing the condition $0 \leq m \leq 2$.

As the alkyl-containing cyclopentyl $R^1$ in the general formula (16), for example, 2-methylcyclopentyl, 3-methylcyclopentyl, 2-ethylcyclopentyl and 2,3-dimethylcyclopentyl may be enumerated.

In the catalyst components for building up the catalyst based on titanium according to the present invention, an α-olefin may be incorporated under a prepolymerization. The prepolymerization may desirably be realized by using the α-olefin in an amount of 0.1–500 g, preferably 0.3–300 g, most preferably 1–100 g per 1 g of the olefin-polymerizing catalyst. The prepolymerization may preferably be effected by mixing the α-olefin and the catalyst component in an inert hydrocarbon solvent to cause the prepolymerization under a mild condition. The α-olefin to be employed in the prepolymerization may or may not be identical with that used for preparing the unsaturated copolymer based on olefin (A).

As the soluble vanadium compound (h-2) for building up the catalyst based on vanadium to be employed according to the present invention, such compounds as represented by the following general formulae (17) and (18) may be enumerated:

$$VO(OR)_aX_b \qquad (17)$$

$$V(OR)_cX_d \qquad (18)$$

In the general formulae (17) and (18), R is a hydrocarbon group, X is a halogen atom and the symbols a, b, c and d represent each a number sufficing the conditions $0 \leq a \leq 3$, $0 \leq b \leq 3$, $2 \leq a+b \leq 3$, $0 \leq c \leq 4$, $0 \leq d \leq 4$ and $3 \leq c+d \leq 4$, respectively.

As the soluble vanadium compound (h-2), an electron donor adduct of a soluble vanadium compound obtained by contacting an electron donor with the soluble vanadium compound may be employed.

As the organoaluminum compound (j-1) for building up the catalyst based on vanadium, those which are the same as the organoaluminum compound (j-1) for building up the catalyst based on titanium mentioned above may be used.

The metallocene (j-3) to be employed for building up the catalyst based on metallocene according to the present invention is that of a transition metal selected from the elements of group IVB of the periodic table. Concrete examples thereof include those represented by the following general formula (19):

$$ML_x \quad (19)$$

in which M is a transition metal, x is the valency of the transition metal M and L denotes a ligand.

Concrete examples of the transition metal represented by M in the general formula (19) include zirconium, titanium and hafnium.

L in the general formula (19) denotes a ligand for coordinating to the transition metal. Among these ligands, at least one ligand L has a skeleton of cyclopentadienyl, which may have substituent group(s).

For the ligand L having a skeleton of cyclopentadienyl, there may be enumerated, for example, cyclopentadienyl group; alkyl- or cycloalkyl-substituted cyclopentadienyl group, such as, methylcyclopentadienyl group, ethylcyclopentadienyl group, n- or t-propylcyclopentadienyl group, n-, i-, sec- or t-butylcyclopentadienyl group, dimethylcyclopentadienyl group, methylpropylcyclopentadienyl group, methylbutylcyclopentadienyl group and methylbenzylcyclopentadienyl group; indenyl group; 4,5,6,7-tetrahydroindenyl group; and fluorenyl group.

The group having the cyclopentadienyl-skeleton mentioned above may have substituent(s) of, for example, a halogen atom or a trialkylsilyl group.

If the compound represented by the general formula (19) has two or more groups having the skeleton of cyclopentadienyl as the ligand L, two of such groups having the skeleton of cyclopentadienyl may be bound together through a bridging group, for example, an alkylene, such as ethylene or propylene, a substituted alkylene, such as isopropylidene or diphenylmethylene, a silylene or a substituted silylene, such as dimethylsilylene, diphenylsylilene or methylphenylsilylene.

For the ligands L other than those having the skeleton of cyclopentadienyl, namely, those which do not possess the skeleton of cyclopentadienyl, there may be enumerated, for example, hydrocarbon groups having 1–12 carbon atoms, alkoxy groups, aryloxy groups, sulfo-containing groups ($—SO_3R^a$ in which $R^a$ denotes an alkyl, a halogen-substituted alkyl, aryl or a halogen- or alkyl-substituted aryl), halogen atoms and hydrogen atom.

For the hydrocarbon groups containing 1–12 carbon atoms, for example, alkyl, cycloalkyl, aryl and aralkyl are enumerated. More concretely, they include alkyl groups, such as, methyl, ethyl, n-propyl, i-propyl, n-butyl, i-butyl, sec-butyl, t-butyl, pentyl, hexyl, octyl, decyl and dodecyl; cycloalkyl groups, such as, cyclopentyl and cyclohexyl; aryl groups, such as, phenyl and tolyl; and aralkyl groups, such as, benzyl and neophyl.

As the alkoxy groups for the ligand L, for example, methoxy, ethoxy and n-propoxy, are enumerated. As the aryloxy groups, for example, phenoxy etc., may be enumerated. As the solfo-containing groups ($—SO_3R^a$), for example, methanesulfonato, p-toluenesulfonato triflo-romethanesulfonato and p-chlorobenzenesulfonato are enumerated. As the halogen atom, for example, fluorine, chlorine, bromine and iodine are enumerated.

More concretely, the metallocene represented by the general formula (19) in which the valency of the transition metal is four is represented by the following general formula (20):

$$R^2_k R^3_l R^4_m R^5_n M \quad (20)$$

in which M is a transition metal defined in the general formula (19), $R^2$ is a group (ligand) having the skeleton of cyclopentadienyl, $R^3$, $R^4$ and $R^5$ represent each, independently of each other, a group (ligand) which may or may not have the skeleton of cyclopentadienyl and k is an integer of at least 1, with k+l+m+n=4.

Below, examples of the metallocene in which M is zirconium and which has at least two ligands having a cyclopentadienyl skeleton are recited:

Bis (cyclopentadienyl ) zirconium monochloride monohydride
Bis(cyclopentadienyl)zirconium dichloride
Bis(1-methyl-3-butylcyclopentadienyl)zirconium bis (trifluoromethanesulfonate)
Bis(1,3-dimethylcyclopentadienyl)zirconium dichloride It is permissible according to the present invention to use a compound in which the above-mentioned 1,3-disubstituted cyclopentadienyl group is replaced by a 1,2-disubstituted cyclopentadienyl group.

Also, it is possible to use, for the metallocene (h-3), a bridged metallocene in which at least two of $R^2$, $R^3$, $R^4$ and $R^5$ in the general formula (20), for example, $R^2$ and $R^3$, are a group (ligand) having a skeleton of cyclopentadienyl, wherein said at least two groups are bound together through a bridging group, such as an alkylene, substituted alkylene, silylene or substituted silylene. In such a case, the groups $R^4$ and $R^5$ are the same, independently of each other, as the ligands L other than that having cyclopentadienyl skeleton as mentioned previously for the general formula (19).

Concrete examples of such bridged metallocenes (h-3) include
ethylene bis(indenyl)dimethylzirconium,
ethylene bis(indenyl)zirconium dichloride,
isopropylidene(cyclopentadienyl-fluorenyl)zirconium dichloride,
diphenylsilylene bis(indenyl)zirconium dichloride and
methylphenylsilylene bis(indenyl)zirconium dichloride.

Also, as the metallocene (h-3), metallocenes disclosed in Japanese Patent Kokai Hei 4-268307 represented by the following general formula (21) may be employed.

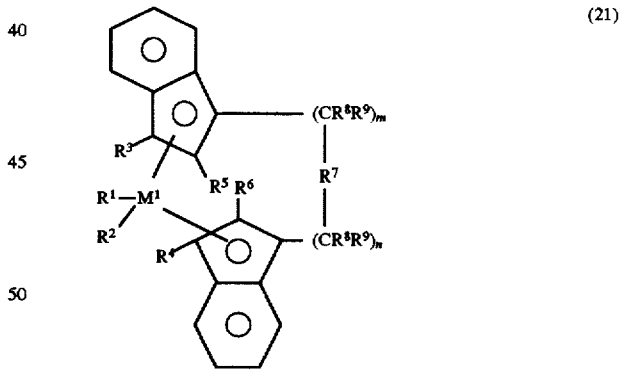

(21)

In the general formula (21), $M^1$ denotes a metal of the group IVB of the periodic table and may concretely be, for example, titanium, zirconium or hafnium.

In the general formula (21), $R^1$ and $R^2$ may each be hydrogen atom, an alkyl having 1–10 carbon atoms, preferably 1–3 carbon atoms, an alkoxy having 1–10 carbon atoms, preferably 1–3 carbon atoms, an aryl group having 6–10 carbon atoms, preferably 6–8 carbon atoms, an aryloxy group having 6–10 carbon atoms, preferably 6–8 carbon atoms, an alkenyl group having 2–10 carbon atoms, preferably 2–4 carbon atoms, an aralkyl group having 7–40 carbon atoms, preferably 7–10 carbon atoms, an alkaryl group having 7–40 carbon atoms, preferably 7–12 carbon atoms, or an aralkenyl group having 8–40 carbon atoms, preferably 8–12 carbon atoms, or, further, a halogen atom, preferably chlorine atom. Here, $R^1$ and $R^2$ may or may not be identical with each other.

In the general formula (21), $R^3$ and $R^4$ may each stand for a halogen atom, preferably fluorine atom, chlorine atom or bromine atom, for an alkyl group which may be substituted by a halogen and which has 1–10 carbon atoms, preferably 1–4 carbon atoms, an aryl group having 6–10, preferably 6–8 carbon atoms, a group of $-N(R^{10})_2$, $-SR^{10}$, $-OSi(R^{10})_3$, $-Si(R^{10})_3$ or $-P(R^{10})_2$. Here, $R^{10}$ is a halogen atom, preferably chlorine atom, an alkyl group having 1–10 carbon atoms, preferably 1–3 carbon atoms, or an aryl group having 6–10 carbon atoms, preferably 6–8 carbon atoms. $R^3$ and $R^4$ may or may not be identical with each other. It is especially preferable that both $R^3$ and $R^4$ are hydrogen atom.

In the general formula (21), $R^5$ and $R^6$ may be the same as $R^3$ and $R^4$ except hydrogen atom. $R^5$ and $R^6$ may or may not be identical with each other, while it is preferable that both are the same. $R^5$ and $R^6$ may each preferably be an alkyl group having 1–4 carbon atoms which may preferably be halogenated, of which concrete examples are methyl, ethyl, propyl, isopropyl, butyl, isobutyl and trifluoromethyl, wherein a particular preference is given to methyl.

In the general formula (21), $R^7$ may stand for:

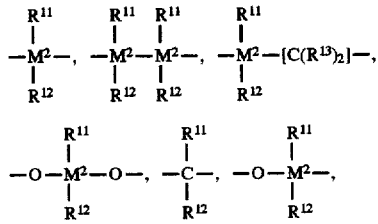

as well as $=BR^{11}$, $=AlR^{11}$, $-Ge-$, $-Sn-$, $-O-$, $-S-$, $=SO$, $=SO_2$, $=NR^{11}$, $=CO$, $=PR^{11}$ or $=P(O)R^{11}$. In the above, $R^{11}$, $R^{12}$ and $R^{13}$ may each stand for hydrogen atom; a halogen atom; an alkyl group having 1–10 carbon atoms, preferably 1–4 carbon atoms, and preferably methyl; a fluoroalkyl group having 1–10 carbon atoms, preferably $-CF_3$; an aryl group having 6–10 carbon atoms, preferably 6–8 carbon atoms; a fluoroaryl group having 6–10 carbon atoms, preferably pentafluorophenyl; an alkoxy group having 1–10 carbon atoms, preferably 1–4 carbon atoms, in particular methoxy; an alkenyl group having 2–10 carbon atoms, preferably 2–4 carbon atoms; an aralkyl group having 7–40 carbon atoms, preferably 7–10 carbon atoms; an aralkenyl group having 8–40 carbon atoms, preferably 8–12 carbon atoms; or an alkaryl group having 7–40 carbon atoms, preferably 7–12 carbon atoms. The pair "$R^{11}$ with $R^{12}$" or "$R^{11}$ with $R^{13}$" may form a ring together with the atoms bound thereto. $R^{11}$, $R^{12}$ and $R^{13}$ may or may not be identical with each other.

$M^2$ may stand for silicium, germanium or tin, preferably silicium or germanium.

In the general formula (21), $R^7$ may preferably stand for $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

In the general formula (21), $R^8$ and $R^9$ may each be the same as $R^{11}$, wherein $R^8$ and $R^9$ may or may not be identical with each other.

In the general formula (21), m and n represent each 0, 1 or 2, preferably 0 or 1, with m+n being 0, 1 or 2, preferably 0 or 1. m and n may or may not be identical with each other.

As the metallocene (h-3) represented by the general formula (21), the following compounds may be exemplified:

rac-ethylene(2-methyl-1-indenyl)-2-zirconium dichloride rac-dimethylsilylene(2-methy-1-indenyl )-2-zirconium dichloride The metallocene (h-3) represented by the general formula (21) can be produced by known methods (Cf., for example, Japanese Patent Kokai Hei 4-268307).

As the metallocene (h-3), one represented by the following general formula (22) may also be used.

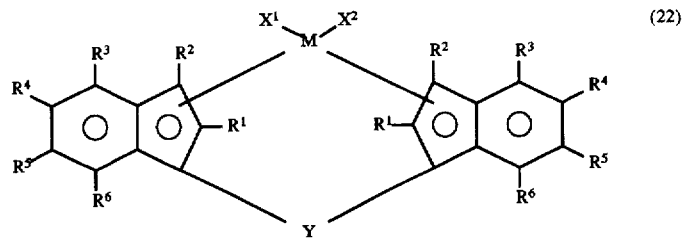

(22)

In the general formula (22), M denotes a transition metal atom of the group IVB of the periodic table, which may concretely be titanium, zirconium or hafnium.

In the general formula (22), $X^1$ and $X^3$ denote each, independently of each other, a group as defined for the ligand L having no cyclopentadienyl skeleton in the general formula (19) and Y is a group as defined for the bridging group binding at least two of the groups (ligand L) having cyclopentadienyl skeleton in the general formula (19).

In the general formula (22), $R^1$ and $R^2$ stand, independently of each other, for hydrogen atom, a halogen atom, a hydrocarbon group having 1–20 carbon atoms, a halogenated hydrocarbon group having 1–20 carbon atoms, a silicium-containing group, a oxygen-containing group, a sulfur-containing group, a nitrogen-containing group or a phosphorus-containing group. Concrete examples of the group for $R^1$ and $R^2$ include:

a halogen atom, such as, fluorine, chlorine, bromine or iodine;

a hydrocarbon group having 1–20 carbon atoms, for example, an alkyl group, such as, methyl, ethyl, propyl, butyl, hexyl, cyclohexyl, octyl, nonyl, dodecyl, eicosyl, norbornyl or adamantyl, an alkenyl group, such as, vinyl, propenyl or cyclohexenyl, an aralkyl group, such as, benzyl, phenylethyl or phenylpropyl, or an aryl group, such as, phenyl, tolyl, dimethylphenyl, trimethylphenyl, ethylphenyl, propylphenyl, biphenyl, naphthyl, methyl-naphthyl anthracenyl or phenantoryl;

a halogenated hydrocarbon group having 1–20 carbon atoms of those in which the above-recited hydrocarbon groups are halogen-substituted;

a silyl group, for example, a mono-hydrocarbon-substituted silyl, such as, methylsilyl or phenylsilyl, di-hydrocarbon-substituted silyl, such as, dimethylsilyl or diphenylsilyl, tri-hydrocarbon-substituted silyl, such as, trimethylsilyl, triethylsilyl, tripropylsilyl, tricyclohexylsilyl, triphenylsilyl, dimethylphenylsilyl. methyldiphenylsilyl, tritolylsilyl or trinaphthylsilyl, a silyl ether group of a hydrocarbon-substituted silyl, such as, trimethylsilyl ether group;

a silicium-substituted hydrocarbon group, for example, a silisium-substituted alkyl, such as, trimethylsilylmethyl, or a silicium-substituted aryl such as, trimethylsilylphenyl;

an oxygen-containing group for example, hydroxy, an alkoxy group, such as, methoxy, ethoxyl, propoxy or butoxy, an aryloxy group, such as, phenoxy, methylphenoxy, dimethylphenoxy or naphthoxy, or an aralkoxy group, such as, phenylmethoxy or diphenylethoxy;

a sulfur-containing group, for example, a group of those in which the oxygen atom in the above-recited oxygen-containing groups is replaced by sulfur;

a nitrogen-containing group, for example, amino, an alkylamino, such as, methylamino, dimethylamino, diethylamino, dipropylamino, dibutylamino or dicyclohexylamino, an aryl or alkylarylamino, such as, phenylamino, diphenylamino, ditolylamino, dinaphthylamino or methylphenylamino; and a phosphorus-containing group, for example, a phosphino, such as, dimethylphosphino or diphenylphosphino.

Among the above-recited groups for $R^1$, hydrocarbon groups are preferred, with particular preference being given to an alkyl group having 1–3 carbon atoms, such as, methyl, ethyl or propyl. $R^2$ may preferably stand for hydrogen atom or at hydrocarbon group, wherein a particular preference is given to hydrogen atom and alkyl groups having, 1–3 carbon atoms, such as, methyl, ethyl and propyl.

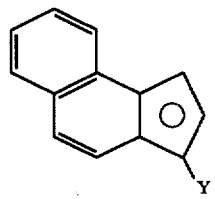 (23)

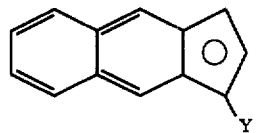 (24)

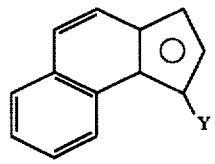 (25)

in which Y has the same meaning as that in the general formula (22).

According to the present invention, transition metal compounds (metallocenes) represented by the following general formula (26) may, also be used:

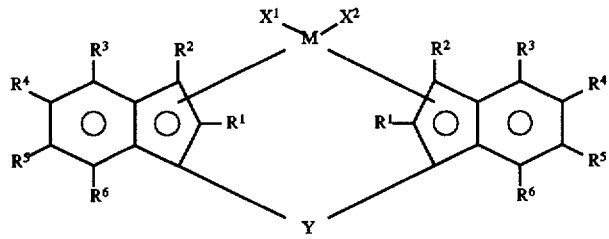 (26)

In the general formula (22), $R^3$, $R^4$, $R^5$ and $R^6$ denote, independent of each other, hydrogen atom, a haloger atom, a hydrocarbon group having 1–20 carbon atoms or a halogenated hydrocarbon group having 1–20 carbon atoms. Among them, hydrogen atom, hydrocarbon groups and halogenated hydrocarbon an group are preferred. Among the pairs $R^3$ with $R^4$, $R^4$ with $R^5$ and $R^6$ with $R^5$ at least one pair may form a monocyclic aromatic ring together with the carbon atoms bound thereto. If two or more hydrocarbon groups or halogenated hydrocarbon groups are present in the other pairs than that forming the aromatic ring, they may form a ring by combining together. It is preferable that $R^2$ is hydrogen atom, so long as it is not an aromatic substituent group.

For $R^3$, $R^4$, $R^5$ and $R^6$ in the general formula (22), as the-halogen atom, hydrocarbon group having 1–20 carbon atoms and halogenated hydrocarbon group having 1–20 carbon atoms, the same as those recited for $R^1$ and $R^2$ may be exemplified.

the general formula (22), as the ligands coordinating to the metal M, which contain the monocyclic aroamtic ring formed by at least one pair among the pairs of $R^3$ with $R^4$, $R^4$ with $R^5$ and $R^5$ with $R^6$, those which are represented by the following general formulae (23) to (25) may be exemplified:

in which M, $R^1$, $R^2$, $R^3$, $R^4$, $R^5$ and $R^6$ are the same as those in the general formula (22).

In the general formula 26), it is preferable that, among $R^3$, $R^4$, $R^5$ and $R^6$, two groups including $R^2$ are each an alkyl group, wherein preference is given to that $R^3$ and $R^5$ or $R^3$ and $R^6$ stand each for an alkyl group. These alkyl groups may preferably be secondary or tertiary alkyl groups. Further, these alkyl groups may be substituted by halogen atom(s) or silicium-containing group(s), wherein, as the halogen atom and as the silicium-containing group, those which are exemplified previously for $R^1$ and $R^2$ may be enumerated.

It is preferable, that the groups for $R^3$, $R^4$, $R^5$ and $R^6$ in the general formula (26) other than the alkyl groups mentioned above are hydrogen atom. As the hydrocarbon group habing 1–20 carbon atoms, a chain-formed alkyl group or a cyclic alkyl group, such as, methyl, ethyl, n-propyl, i-propyl, n-butyl, i-butyl, sec-butyl, tert-butyl, pentyl, hexyl, cyclohexyl, heptyl, octyl, nonyl, dodecyl, eicosyl, norbornyl or adamantyl; or an aralkyl group, such as, benzyl, phenylethyl, phenylpropyl or tolylmethyl, wherein they may include double bond(s) and/or triple bond(s).

It is permissible that two groups selected among $R^3$, $R^4$, $R^5$ and $R^6$ in the general formula (26) may form a monocyclic or polycyclic ring other than aromatic ring, by combining together.

As the halogen atom, those enumerated for $R^1$ and $R^2$ are enumerated.

As the groups for $X^1$, $X^2$ and Y, those which are enumerated in the general formula (22) are enumerated.

Concrete examples of the metallocenes (h-3), represented by the general formula (26) are given below.

rac-dimethylsilylene-bis(4,7-dimethyl-1-indenyl)-zirconium dichloride rac-dimethylsilylene-bis(2,4,7-trimethyl-1-indenyl)-zirconium dichloride rac-dimethylsilylene-bis(2,4,6-trimethyl-1-indenyl)-zirconium dichloride According to the present invention, it is also possible to employ transition metal compounds in which the zirconium in the compounds given above is replaced by titanium or hafnium.

The transition metal compounds as given above may usually be employed as a racemate, while it is possible to use R- or S-compound.

For the metallocenes (h-3) represented by the general formula (26), such compounds as given below also be employed.

$R^1$ may preferably be a hydrocarbon group, wherein a particular preferance is given to an alkyl group having 1–4 carbon atoms, such as, methyl, ethyl propyl or butyl.

$X^1$ and $X^2$ may each preferably be a halogen, atom or a hydrocarbon group hating 1–20 carbon atoms.

$R^3$ denotes an aryl group having 6–16 carbon atoms, wherein concrete examples therefor include phenyl, α-naphthyl, β-naphthyl, anthracenyl, phenanthryl, pyrenyl, acenaphthyl, phenalenyl (perinaphthenyl) and aceanthrylenyl. Among them, phenyl and naphthyl are preferred. These aryl groups may be substituted by halogen atom(s), hydrocarbon group(s) having 1–20 carbon atoms or halogenated hydrocarbon group(s) having 1–20 carbon atoms, as those defined for $R^1$.

Concrete examples of the transition metal compounds (metallocenes) are given below:

rac-dimethylsilylene-bis(4-phenyl-1-indenyl) -zirconium dichloride rac-dimethylsilylene-bis(2-methyl-4-phenyl-1-indenyl)-zirconium dichloride rac-dimethylsilylene-bis[2-methyl-4-(α-naphthyl)-1-indenyl]zirconium dichloride rac-dimethylsilylene-bis[2-methyl-4-(β-naphthyl-1-indenyl]zirconium dichloride rac-dimethylsilylene-bis[2-methyl-4-(1-anthracenyl)-1-indenyl]zirconium dichloride It is also possible to use transition metal compounds in which the zirconium in the compounds given above is replaced by titanium or hafnium.

According to the present invention, the compounds represented by the following general formula (27) may also be used as the metallocenes (h-3):

$$L^aMX_2 \quad (27)$$

In which M is a metal of the group IV or of the Lanthanide series in the periodic table, $L^a$ denotes a derivative from a non-localized π-bound group which imparts a restrictive geometrical configuration to the active sites of the metal M and X denotes hydrogen atom, a halogen atom, a hydrocarbon group having 20 or less carbon atoms, silicium atom(s) or germanium atom(s), a silyl group or a germyl group.

Among the compounds represented by the general formula (27), those which are represented by the following general formula (28) are preferred:

in which M denotes titanium, zirconium or hafnium, X has the same meaning as that defined for the general formula (27), Cp represents a substituted cyclopentadienyl group bound to the metal M by π-bond and having a substituent group Z, Z stands for oxygen, sulfur, boron or an element in the group IVA of the periodic table (for example, silicium, germanium or tin), Y denotes a ligand containing nitrogen, phosphorus, oxygen or sulfur, wherein Z and Y together may form a condensed ring.

For the compounds represented by the general formula (28), there may be exemplified [dimethyl-(t-butylamido)(tetramethyl-$\eta^5$-cyclopentadienyl)silane]-titanium dichloride and [(t-butylamido)(tetramethyl-$\eta^6$-cyclopentadienyl)-1,2-ethanediyl]titanium dichloride.

Those compounds in which the titanium in the metallocenes given above is replaced by zirconium or hafnium may also be employed.

As the metallocenes (h-3) represented by the general formula (27) or (28), those in which the central metal atom is zirconium and at least two ligands having cyclopentadienyl skeleton are included may preferably be employed. For the metallocenes (VI) mentioned above, the central metal atom is preferably titanium.

According to the present invention, the metallocenes (h-3) may be employed alone or in combination of two or more of them. It is possible to use the metallocenes (h-3) under dilution in a solvent such as a hydrocarbon or a halogenated hydrocarbon. It is also possible to use the metallocene (h-3) in a state held in contact with a granular carrier compound.

For the carrier compound supporting the metallocene (h-3), inorganic compounds, such as, $SiO_2$, $Al_2O_3$, $B_2O_3$, MgO, $ZrO_2$, CaO, $TiO_2$, ZnO, $SnO_2$, $B_3O$ and ThO, and resins of, for example, polyethylene, polypropylene, poly-1-butene, poly-4-methyl-1-pentene and styrenedivinylbenzene copolymer, may be employed. These carrier compounds may be used alone or in combination of two or more of them.

Now, the description is directed to the organoaluminum oxy-compounds (j-2) and to ionized ionic compounds (k-1).

The organoaluminum oxy-compounds (j-2) to be employed according to the present invention may be aluminoxanes known per se or may be those which are insoluble in benzene.

The known aluminoxanes mentioned above may concretely be represented by the following general formula (29) or (30):

in which R represents a hydrocarbon group, such as, methyl, ethyl, propyl or butyl, preferably methyl or ethyl, with a particular preference to methyl, m is an integer of 2 or higher, preferably 5–40.

In the general formula (29) or (30), the aluminoxane may be composed of mixed alkyloxyalumunum units constituted of an alkyloxyaluminum unit represented by the formula $OAl(R^1)$ and an alkyloxy-aluminum unit represented by the formula $OAl(R^2)$, wherein $R^1$ and $R^2$ may each stand for those defined for $R^1$ and $R^2$ may or may not be identical with each other.

The organoaluminum oxy-compound (j-2) employed according to the present invention may contain a small amount of other organometallic component(s) than organoaluminum.

As the ionized ionic compound (k-1), which may sometimes be called "ionic ionized compound" or simply "ionic compound", there may be exemplified Lewis acids, ionic compounds, boranes and carboranes.

As the Lewis acids, those which are represented by $BR_3$, wherein R stands for fluorine or a phenyl group which may have substituent group(s), such as, fluorine, methyl or trifluoromethyl, may be employed. Concrete examples of such a Lewis acid include trifluoroboron, triphenylboron, tris(4-fluorophenyl)boron, tris(3,5-di-fluorophenyl)boron, tris(4-fluoromethylphenyl)boron, tris(pentafluorophenyl) boron, tris(p-tolyl)boron, tris-(o-tolyl)boron and tris(3,5-dimethylphenyl)boron.

As the ionic compounds mentioned above, there may be enumerated for example, trialkyl-substituted ammonium salts, N,N-dialkylanilinium salts, dialkyl-ammonium salts and triarylphosphonium salts. As the trialkyl-substituted ammonium salt for the ionic compound, there may be exemplified triethylammonium tetra(phenyl)boron, tripropylammonium tetra(phenyl)boron and tri(n-butyl) ammonium tetra(phenyl)boron. As the dialkylammonium salt for the ionic compound, there may be exemplified di(1-propyl)ammonium tetra(pentafluorophenyl)boron and dicyclohexylammonium tetra-(phenyl)boron.

As the ionic compounds mentioned above, there may be exemplified triphenylcarbenium tetrakis(pentafluorophenyl) borate, N,N-dimethylanilinium tetrakis-(pentafluorophenyl) borate and ferrocenium tetra(pentafluorophenyl) borate.

As the boranes mentioned above, there may be exemplified salts of metal borane anions, such as, decaborane(14); bis[tri(n-butyl)ammonium] nonaborate, bis[tri(n-butyl) ammonium] decaborate and bis[tri-(n-butyl)ammonium] bis (dodecahydride-dodecaborate) nickelate(III).

As the carboranes mentioned above, there may be exemplified salts of metal carborane anions, such as, 4-carbanonaborane(14), 1,3-dicarbanonaborane(13), bis-[tri (n-butyl)ammonium] bis(undecahydride-7-carbaundecaborate] nickelate(IV).

The ionized ionic alone or in compound (k-1) may be used alone or in combination of two or more of them. The organoalminum oxy-compound (j-2) and the ionized ionic compound (k-1) may be used in a form held on the carrier compound mentioned previously.

On preparing the catalyst based on metallocene, the organoaluminum compounds described above can be used together with the organoaluminum oxy-compound (j-2) or the ionized ionic compound (k-1).

According to the present invention, an α-olefin (a-1), an aromatic ring-containing vinyl monomer (a-2) and a non-conjugated triene or tetraene (a-3) are co-polymerized, usually in a liquid phase, in the presence of a catalyst prepared from the transition metal compound, the organoaluminum compound and/or the ionized ionic compound as described above. Here, a hydrocarbon solvent is used usually, while it is permissible to use an α-olefin as the solvent.

The copolymerization of the α-olefin (a-1), aromatic ring-containing vinyl monomer (a-2) and non-conjugated triene or tetraene (a-3) may be effected either in a batch-wise or continuous way. On carrying out the copolymerization in a batch-wise way, the catalyst may be used at a concentration as given below:

For the catalyst based on titanium composed of the solid titaniferous component (h-1) and the organoaluminum compound (j-1), the solid titaniferous component (h-1) may be used usually in an amount of, as calculated based on titanium atom, about 0.001 to about 1.0 mmol, preferably about 0.005 to 0.5 mmol, per liter of the copolymerization mixture. The organoaluminum compound may be used usually in an amount of, as calculated based on the metal atom in the compound (j-1), about 10–500 moles, preferably 20–200 moles, per mole of the titanium in the solid titaniferous component (h-1). In case an electron donor is used, it may be used usually in an amount of about 0.001 to 10 moles, preferably 0.01 to 2 moles, especially preferably 0.05 to 1 mole, per mole of the metal atom in the organoaluminum compound (j-1).

For the catalyst based on vanadium composed of the soluble vanadium compound (h-2) and the organoaluminum compound (j-1), the concentration of the soluble vanadium compound within the copolymerization system may usually be in the range from 0.01 to 5 mmol, preferably from 0.05 to 3 mmol, per liter of the polymerization volume. The soluble vanadium compound may preferably be supplied to the copolymerization system at a concentration of 10 times or less, preferably 1–7 times, more preferably 1–5 times the existing concentration of the soluble vanadium compound in the copolymerization system. The organoaluminum compound (j-1) may be supplied to the copolymerization system in a mole ratio of aluminum to vanadium (Al/V) in the copolymerization system of 2 or higher, preferably in the range of 2–50, more preferably in the range of 3–20.

The soluble vanadium compound (h-2) and the organoaluminum compound (j-1) may be supplied to the copolymerization system usually under dilution in a liquid mixture of the α-olefin (a-1) and the non-conjugated triene or tetraene (a-3). Here, it is preferable to supply the organoaluminum compound (j-1) to the copolymerization system at a concentration adjusted to any voluntary concentration below, for example, 50 times the existing concentration thereof in the copolymerization system, while the soluble vanadium compound (h-2) is supplied thereto preferably under dilution at a concentration as given previously.

For the catalyst, based on metallocene composed of the metallocene (h-3) and the organoaluminum oxy-compound (j-2) or the ionized ionic compound (k-1), the concentration of the metallocene (h-3) in the copolymerization system may ususally be in the range of 0.00005–0.1 mmol, preferably in the range of 0.0001–0.05 mmol, per liter of the polymerization volume. The organoaluminum oxy-compound (j-2) may be supplied to the copolymerization system in a mole ratio of aluminum to the transition metal in the metallocene (Al/transition metal) of 1–10,000, preferably 10–5,000.

For the ionized ionic compound (k-1), it is supplied to the copolymerization system in a mole ratio of the ionized ionic compound to the metallocene [ionic compound (k-1)/ metallocene (h-3)] in the range of 0.5–20, preferably 1–10.

In case of incorporation of the organoaluminum compound (j-1), it is used usually in such an amount that its concentration will be at about 0–5 mmol per liter of the polymerization volume, preferably about 0–2 mmol per liter of the polymerization volume.

The copolymerization of the above mentioned comonomers (a-1) to (a-3) in the presence of the catalyst based on titanium mentioned above according to the present invention may be realized usually under the condition of a temperature in the range from −20° C. to +150° C., preferably from 0° to 120° C., more preferably from 0° to 100° C., and a pressure in the range over 0 up to 7.8 MPa (80 kgf/cm² gauge), preferably over 0 up to 4.9 MPa (50 kgf/cm² gauge).

For copolymerizing the comonomers (a-1) to (a-3) in the presence of the catalyst based on vanadium mentioned above according to the present invention, the copolymerization may be effected under the condition of a temperature in the range from −50° C. to +100° C., preferably from −30° C. to +80° C., more preferably from −20° C. to +60° C., and a pressure in the range over 0 up to 4.9 MPa (50 kgf/cm² gaude), preferably over 0 up to 2.0 MPa (20 kgf/cm² gauge).

For copolymerizing the comonomers (a-1) to (a-3) in the presence of the catalyst based on metallocene mentioned above according to the present invention, the copolymerization may be effected under the condition of a temperature in the range from −20° C. to +150° C., preferably from 0° to 120° C., more preferably from 0° to 100° C., and apressure in the range over 0 up to 7.8 MPa (80 kgf/cm² guage), preferably in the range over 0 up to 4.9 MPa (50 kgf/cm² gauge).

According to the present invention, the α-olefin (a-1), the aromatic ring-containing vinyl monomer (a-2) and the non-conjugated triene or tetraene (a-3) may be supplied to the copolymerization system each in such an amount that the unsaturated copolymer based on olefin (A) having the specific composition identified above will be obtained. On the copolymerization, a molecular weight regulator, such as hydrogen, can be employed.

By copolymerizing the α-olefin (a-1), the aromatic ring-containing vinyl monomer (a-2) and the non-conjugated triene or tetraene (a-3) as described above, the unsaturated copolymer based on olefin (A) is obtained in a liquid polymerization mixture containing the copolymer. This liquid copolymerization product is subjected to an after treatment in a usual way to obtain an unsaturated copolymer based on olefin (A).

The unsaturated copolymer based on olefin (A) obtained as above is superior in the dynamic fatigue resistance (flexural fatigue resistance), weather-ability, fastness to ozone, fastness to thermal aging and low temperature charactristic, together with superior performances in the chemical reactivity, in the processibility and compatibility and co-vulcanizability with aromatic ring-containing polymers, such as, styrene-butadiene rubber (SBR) etc., so that it can be used for the material of various rubber products and for other applications, such as modifiers of resins and so on.

Graft Modified Product of the Unsaturated Copolymer Based on Olefin (A)

The unsaturated copolymer based on olefin (A) according to the present invention can be used under modification by grafting thereto with a polar monomeric compound. The graft modified unsaturated copolymer based on olefin (A), which may be called also a graft modified copolymer based on olefin (A), can be obtained by reacting the unsaturated copolymer based on olefin (A) with the polar monomeric compound with or without employing a radical initiator.

As the polar monomeric compound, there may be employed, for example, hydroxyl group-containing ethylenically unsaturated compounds, amino group-containing ethylenically unsaturated compounds, epoxy group-containing ethylenically unsaturated compounds, aromatic vinyl compounds, unsaturated carboxylic acids and their derivatives, vinyl eaters and vinyl chloride.

As the hydroxyl group-containing ethylenically unsaturated compound, there may be exemplified (meth)-acrylic acid esters, such as, hydroxyethyl (meth)-acrylate, 2-hydroxypropyl (meth)acrylate, 3-hydroxy-propyl (meth) acrylate, 2-hydroxy-3-phenoxypropyl (meth)-acrylate, 3-chloro-2-hydroxypropyl (meth)acrylate, glycerin mono (meth)acrylate, pentaerythritol mono(meth)-acrylate, trimethylolpropane mono(meth)acrylate, tetra-methylolethane mono(meth)acrylate, butanediolmono(meth)-acrylate, polyethyleneglycol mono(meth)acrylate and 2-(6-hydroxyhexanoyloxy) ethylacrylate; as well as 10-undecen-1-ol, 1-octen-3-ol, 2-methanolnorbornene, hydroxystyrene, hydroxyethyl vinyl ether, hydroxybutyl vinyl ether, N-methylol acrylamide, 2-(meth)acryloyloxy-ethyl acid phosphate, glycerin monoallyl ether, allyl alcohol, allyloxyethanol, 2-butene-1,4-diol and glycrin monoalcohol.

The amino group-containing ethylenically unsaturated compound is a compound containing ethylenic double bond (s) and amino group(s). For such compounds, monomeric compounds having at least one of the amino groups or substituted amino groups represented by the following general formula (31) may be enumerated.

(31)

in which $R^1$ denotes hydrogen atom, methyl or ethyl and $R^2$ denotes hydrogen atom, an alkyl having 1–12 carbon atoms, preferably 1–8 carbon atoms, or a cycloalkyl having 6–12 carbon atoms, preferably 6–8 carbon atoms. Here, the alkyl and the cycloalkyl may contain substituent group(s).

As the amino group-containing ethylenically unsaturated compound, there may be exemplified concretely derivatives based on alkyl esters, such as alkyl esters of acrylic or methacrylic acid, for example, aminoethyl (meth)acrylate, propylaminoethyl (meth)acrylate, dimethylaminoethyl methacrylate, aminopropyl (meth)acrylate, phenylaminoethyl methacrylate and cyclohexylaminoethyl methacrylate; derivatives based on vinylamine, such as, N-vinyldiethylamine and N-acetyl-vinylamine; derivatives based on allylamine, such as, allylamine, methacrylamine, N-methylacrylamine, N,N-dimethylacrylamine and N,N-dimethylaminopropylacrylamine; derivatives based on acrylamide, such as, acryalmide and N-methylacrylamide; aminostyrenes, such as, p-aminostyrene etc.; and 6-aminohexylsuccinimide and 2-aminoethylsuccinimide.

The epoxy group-containing ethylenically unsaturated compound is a monomeric compound containing polymerizable unsaturation bond(s) and at least one epoxy group in the molecule. As the epoxy group-containing ethylenically unsaturated compound, there may be exemplified concretely glycidyl acrylate, glycidyl methacrylate and the like; mono- and diglycidyl esters of dicarboxylic acid (wherein the alkyl group for the monoglycidyl ester has 1–12 carbon atoms), such as, mono- and diglycidyl esters of maleic acid, mono- and diglycidyl esters of fumaric acid, mono- and diglycidyl esters of crotonic acid, mono- and diglycidyl esters of tetrahydrophthalic acid, mono- and diglycidyl esters of itaconic acid, mono- and diglycidyl esters of butenetricarboxylic acid, mono- and diglyxidyl esters of citraconic acid, mono- and diglycidyl esters of endo-cis-bicyclo[2.2.1]hept-5-ene-2,3-dicarboxylic acid (Nadic acid TM), mono- and diglycidyl esters of endo-cis-bicyclo[2.2.1]hept-5-ene-2-methyl-2,3-dicarboxylic acid (methyl Nadic acid TM) and mono- and diglycidyl esters of allylsuccinic acid; as well as alkyl glycidyl esters of p-styrene carboxylic acid, allyl glycidyl ether, 2-methylallyl glycidyl ether, styrene p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monoxide.

As the aromatic vinyl compound, compounds represented by the following general formula (32) may be exemplified:

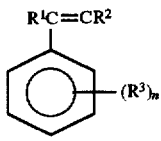

$$R^1C=CR^2 \quad (32)$$

wherein $R^1$ and $R^2$ denote, independently of each other, hydrogen atom or an alkyl having 1–3 carbon atom, for example, methyl, ethyl, propyl or isopropyl, $R^5$ denotes a halogen atom or a hydrocarbon group having 1–3 carbon atoms, for example, methyl, ethyl, propyl or isopropyl and chlorine, bromine or iodine, and n is an integer of usually 0–5, preferably 1–5.

Concrete examples of the aromatic vinyl compound include styrene, α-methylstyrene, o-methylstyrene, p-methylstyrene, m-methylstyrene, p-chlorostyrene, m-chlorostyrene and p-chloromethylstyrene. Heterocyclic aromatic vinyl compounds may also be employed, for example, 4-vinylpyridine, 2-vinylpyridine, 5-ethyl-2-vinylpyridine, 2-methyl-5-vinylpyridine, 2-isopropenylpyridine, 2-vinylquinoline, 3-vinylisoquinoline, N-vinylcarbazole and N-vinylpyrrolidone.

As the unsaturated carboxylic acid, there may be exemplified unsaturated carboxylic acids, such as, acrylic acid, methacrylic acid, maleic acid, fumaric acid, tetrahydrophthalic acid, itaconic acid, citraconic acid, crotonic acid, isocrotonic acid, norbornene dicarboxylic acid, bicyclo[2.2.1]hept-2-ene-5,6-dicarboxylic acid, and anhydrides of these acids as well as derivatives of these acids, such as acid halides, amides, imides and esters. Concrete examples include malenyl chloride, malenyl imide, maleic anhydride, itaconic anhydride, citraconic anhydride, tetrahydrophthalic anhydride, bicyclo[2.2.1]hept-2-ene-5,6-dicarboxylic acid anhydride, dimethyl maleate, monomethyl maleate, diethyl maleate, diethyl fumarate, dimethyl itaconate, dimethyl citraconate, dimethyl tetrahydrophthalate, dimethyl bicyclo[2.2.1]hept-2-ene-5,6-dicarboxylate, hydroxyethyl (meth)acrylate, hydroxypropyl (meth)acrylate, glycidyl (meth) acrylate, aminoethyl methacrylate and aminopropyl methacrylate. Among them, (meth)acrylic acid, maleic anhydride, hydroxyethyl (meth)acrylate, glycidyl methacrylate and aminopropyl methacrylate are preferred.

Examples of the vinyl esters include vinyl acetate, vinyl propionate, vinyl n-butyrate, vinyl isobutyrate, vinyl pivalate, vinyl caproate, vinyl versatate, vinyl laurate, vinyl stearate, vinyl benzoate, vinyl p-t-butylbezoate, vinyl salicylate and vinyl cyclohexane carboxylate.

The polar monomeric compound to be used for the modification may be used in an amount of usually 0.1–100 parts by weight, preferably 0.5–80 parts by weight, per 100 parts by weight of the unsaturated copolymer based on olefin (A).

As the radical initiator to be used for the modification, organic peroxides and azo compounds may be employed.

Concrete examples of the organic peroxide include dicumylperoxide, di-t-butylperoxide, 2,5-dimethyl-2,5-bis(t-butylperoxy)hexane, 2,5-dimethyl- 2,5-bis(t-butylperoxy)hexin-3, 1,3-bis(t-butylperoxy-isopropyl)benzene, 1,1-bis(t-butylperoxy)valerate, benzoyl peroxide, t-butylperoxy benzoate, acetyl peroxide, isobutyryl peroxide, octanoyl peroxide, decanoyl peroxide, lauroyl peroxide, 3,5,5-trimethyl-hexanoyl peroxide, 2,4-dichlorobenzoyl peroxide and m-toluyl peroxide. As the azo compound, theremay be exemplified azoisobutyronitrile and dimethylazoisobutyronitrile.

Such a radical initiator may preferably be used in general in an amount of 0.001–10 parts by weight per 100 parts by weight of the unsaturated copolymer based on olefin (A).

While the radical initiator may be employed as such by mixing with the unsaturated copolymer based on olefin (A) and the polar monomeric compound, it is possible also to use the radical initiator as a solution by dissolving it in a small amount of an organic solvent. As the organic solvent to be employed, every organic solvent capable of dissolving the radical initiator can be used without any restriction. As the organic solvent therefor, aromatic hydrocarbons, such as, benzene., toluene, xylene; aliphatic hydrocarbons, such as, pentane, hexane, heptane, octane, nonane or decane; alicyclic hydrocarbons, such as, cyclohexane, methylcyclohexane and decahydronaphthalene; chlorinated hydrocarbons, such as, chlorobenzene, dichlorobenzene, trichlorobenzene, methylene chloride, chloroform, carbon tetrachloride and tetrachloroethylene; alcohols, such as, methanol, ethanol, n-propanol, iso-propanol, n-butanol, sec-butanol, and tert-butanol; ketones, such as, acetone, methyl ethyl ketone and methyl isobutyl ketone; esters, such as, ethyl acetate and dimethyl phthalate; and ethers, such as, dimethyl ether, diethyl ether, di-n-amyl ether, tetrahydrofuran and dioxyanisole.

On graft-modifying the unsaturated copolymer based on olefin (A), a reducing material may also be used. Such a reducing material has a function of increasing the grafted amount in the resulting graft-modified unsaturated copolymer based on olefin (A).

As the reducing material, for example, iron(II) ion, chromium ion, cobalt ion, nickel ion, palladium ion, sulfites, hydroxylamine and hydrazine may be exemplified, in addition to compounds containing the groups —SH, —SO$_3$H, —NHNH$_2$ and —COCH(OH)—.

Concrete examples of the reducing material include ferrous chloride, potassium bichromate, cobalt chloride, cobalt naphthenate, palladium chloride, ethanolamine, diethanolamine, N,N-dimethylanilin, hydrazine, ethyl mercaptane, benzenesulfonic acid and p-toluenesulfonic acid.

The reducing material mentioned above may be used usually in an amount of 0.001–5 parts by weight, preferably 0.1–3 parts by weight, per 100 parts by weight of the unsaturated copolymer based on olefin (A).

The graft-modification of the unsaturated copolymer based on olefin (A) can be elected by known methods, for example, by dissolving the unsaturated copolymer based on olefin (A) in an organic solvent, adding then thereto the polar monomeric compound and the radical initiator and subjecting the resulting mixture to reaction at a temperature of 70°–200° C., preferably 80°–190° C. for a duration of 0.5–15 hours, preferably 1–10 hours.

As the organic solvent to be used in the graft-modification of the unsaturated copolymer based on olefin (A), every organic solvent capable of dissolving the unsaturated copolymer based on olefin (A) can be used without any restriction.

For the organic solvent therefor, aromatic hydrocarbons, such as, benzene, toluene and xylene, and aliphatic hydrocarbons, such as, pentane, hexane and heptane, may be employed.

It is also possible to produce the graft-modified unsaturated copolymer based on olefin (A) by reacting the unsaturated copolymer based on olefin (A) with the polar monomeric compound on an extruding machine without using any solvent. The reaction may be carried out usually at a temperature above the melting point of the unsaturated copolymer based on olefin (A), for example, at a temperature in the range from 120° C. to 250° C. The reaction duration at such a temperature may usually be in the range from 0.5 to 10 minutes.

The grafted amount of the grafting groups derived from the polar monomeric compound in the resulting graft-modified unsaturated copolymer based on olefin (A) may usually be in the range from 0.1 to 50% by weight, preferably in the range from 0.2 to 30% by weight.

The modified unsaturated copolymer based on olefin (A) obtained in this manner is superior in the adhesion onto metals and polar resins. It is possible to improve the shock resistance and the low temperature shock resistance of a polar resin by blending the modified unsaturated copolymer based on olefin (A) with the polar resin.

Molded products obtained by molding the modified unsaturated copolymer based on olefin (A) are superior in the susceptibility to printing and coating thereon. It is possible to obtain polyolefin resin composition in which the dispersion of the filler is improved, by blending the modified unsaturated copolymer based on olefin (A) with a polyolefin together with a filler, such as glass fiber or an inorganic material. In this manner, resin compositions in which the advantages due to compounding with a filler is retained, can be obtained, while attaining an improved mechanical strength.

Vulcanizable Rubber Composition

The rubber composition according to the present invention contains the unsaturated copolymer based on olefin (A) according to the present invention together with at least one of the additives among a reinforcing filler (B), a softening agent (C) and a vulcanizing agent (D). Thus, the rubber composition according to the present invention is a vulcanizable mixture (in the following, sometimes referred to as "vulcanizable rubber composition"), which may be brought into practical use in the unvalcanize state as such, though more superior properties may be attained when used as vulcanized product. The vulcanization may be effected, for example, by a method of heating with employment of the vulcanizing agent (D) or by a method of irradiating an electron beam without employing the vulcanizing agent (D).

Reinforcing Filler (B)

As the reinforcing filler (B), carbon black products, such as SRF, GPF, FEF, MAF, HAF, ISAF, SAF, FT and MT; surface treated carbon black products in which the above-mentioned carbon black is subjected to a surface treatment using a silane coupling agent; inorganic fillers, such as, silica, activated calcium carbonate, light calcium carbonate, heavy calcium carbonate, fine powdery talc, talc, fine powdery silicic acid and clays, may be employed.

The rubber composition according to the present invention contains reinforcing filler (B) in an amount of 300 parts by weight or less, preferably 10–300 parts by weight, more preferably 10–200 parts by weight, per 100 parts by weight of the unsaturated copolymer based on olefin (A).

Using the rubber composition containing the reinforcing filler (B) in such an amount, a vulcanized rubber product in which the mechanical properties, such as, tensile strength, tear strength and wear resistance, are improved can be obtained. It is also possible to increase the hardness without deteriorating other material properties of the vulcanized rubber, together with attainment of reduction of the production cost.

Softening Agent (c)

As the softening agent (C), conventional softening agent to be compounded to rubber products may widely be utilized. Concrete examples therefor include softening agents based on peroleum oil, such as, process oils, lubricating oils, paraffin, liquid paraffin, petroleum asphalt and vaseline; softening agents based on coal tar, such as, coal tar and coal tar pitch; softening agents based on fatty oils, such as, castor oil, linsed oil, rape-seed oil, palm oil; waxes, such as, tall oil, factice, bees wax, carnauba wax and lanolin; fatty acids and fatty acid salts, such as, ricinoleic acid, palmitic acid, barium stearate, calcium stearate and zinc laurate; and synthetic high-polymeric substances, such as, petroleum resin, atactic polypropylene and cumarone-indene resin. Among them, softening agents based on petroleum oil are preferred, with particular preference to process oils.

The rubber composition according to the present invention contains the softening agent (C) in an amount of 200 parts by weight or less, preferably 10–200 parts by weight, more preferably 10–150 parts by weight, especially preferably 10–100 parts by weight, per 100 parts by weight of the unsaturated copolymer based on olefin (A).

Vulcanizing Agent (D)

For vulcanizing the rubber composition according to the present invention by heating, compounds constituting the vulcanizing system, such as, vulcanizing agent (D), vulcanization accelerator and vulcanization assistant, can be admixed to the rubber composition.

As the vulcanizing agent (D), sulfur, compounds based on sulfur and organic peroxides may be used.

The form of sulfur is not specifically limited and, for example, powdery sulfur, precipitated sulfur, colloidal sulfur, surface-treated sulfur and insoluble sulfur may be employed.

As the compound based on sulfur mentioned above, there may be exemplified concretely sulfur chloride, sulfur dichloride, highpolymeric polysulfides, morpholine disulfide, alkylphenol disulfide, tetramethylthiuram disulfide and selenium dimethyl-dithiocarbamate.

As the organic peroxide mentioned above, there may be exemplified concretely alkyl peroxides, such as, dicumyl peroxide, di-t-butyl peroxide, di-t-butyl peroxy-3,3,5-trimethylcyclohexane, t-butylcumyl peroxide, di-t-amyl peroxide, 2,5-dimethyl-2,5-di(t-butylperoxy)-hexine-3, 2,5-dimethyl-2,5-di(benzoylperoxy)hexane, 2,5-dimethyl-2,5-di (t-butylperoxy)hexane, α, α'-bis(t-butylperoxy-m-isopropyl) benzene and t-butyl hydroperoxide; peroxyesters, such as, t-butylperoxy acetate, t-butylperoxy isobutyrate, t-butylperoxy pivalate, t-butylperoxy maleate, t-butylperoxy neodecanoate, t-butylperoxy benzoate and di-t-butylperoxy phthalate; and ketone peroxides, such as, dicyclohexanone peroxide etc. They can be used in a combination of two or more of them.

Among them, organic peroxides having a 1 minute half life temperature of 130°–200° C. are preferred, for example, dicumyl peroxide, di-t-butyl peroxide, di-t-butylperoxy-3, 3,5-trimethylcyclohexane, t-butyl-cumyl peroxide, di-t-amyl peroxide and t-butyl hydroperoxide.

According to the present invention, among the above vulcanizing agent (D), preference is given to sulfur and sulfur compounds, especially to sulfur, since a rubber composition exhibiting superior characteristic can be obtained therewith.

For the vulcanizing agent (D) of sulfur or a sulfur compound, it can be used in an amount of 0.1–10 parts by weight, preferably 0.5–5 parts by weight, per 100 parts by weight of the unsaturated copolymer based on olefin (A).

For the vulcanizing agent of an organic peroxide, it can be used in an amount of 0.0003–0.05 mole, preferably 0.001–0.03 mole, per 100 grams of the unsaturated copolymer based on olefin (A).

Vulcanization Accelerator

On using sulfur or a sulfur compound as the vulcanizing agent (D), it is preferable to use concurrently a vulcanization accelerator.

As the vulcanization accelerator, there may be exemplified concretely compounds based on sulfenamide, such as, N-cyclohexyl-2-benzothiazole sulfenamide (CBS), N-oxydiethylene-2-benzothazole sulfenamide and N,N-diisopropyl-2-benzothiazole sulfenamide; compounds based on thiazole, such as, 2-mercaptobenzothiazole (MBT), 2-(2, 4-dinitrophenyl)mercaptobenzothiazole, 2-(2,6-diethyl-4-morpholinothio)benzothiazole and di-benzothiazyl disulfide; guanidine compounds, such as, diphenylguanidine, triphenylguanidine, diorthonitrileguanidine, orthonitrile biguanide and diphenylguanidine phthalate; compounds based on aldehydeamine or aldehyde-ammonia, such as, reaction products of acetaldehyde with aniline, condensation products of butyl aldehyde with aniline, hexamethylenetetramine and acetaldehyde-ammonia; compounds based on imidazoline, such as, 2-mercaptoimidazoline and the like; compounds based on thiourea, such as, thiocarbanilide, diethylthiourea, dibutylthiourea trimethylthiourea and diorthotolylthiourea; compounds based on thiuram, such as, tetramethylthiuram monosulfide, tetramethylthiuram disulfide (TMTD), tetraethylthiuram disulfide, tetrabutylthiuram disulfide, pentamethylenethiuram tetrasulfide and dipentamethylenethiuram tetrasulfide (DPTT); compounds based on dithioacid salts, such as, zinc dimethyldithiocarbamate, zinc diethyldithiocarbamate, zinc di-n-butyldithiocarbamate, zinc ethylphenylthiocarbamate, zinc butylphenyldithiocarbamate, sodium dimethyldithiocarbamate, selenium dimethyldithiocarbamate and tellurium dimethyldithiocarbamate; compounds based on xanthate, such as zinc dibutyl-xantogenate; and zinc white.

The vulcanization accelerator may preferably be used in an amount of 0.1–20 parts by weight, preferably 0.2–10 parts by weight, per 100 parts by weight of the unsaturated copolyme based on olefin (A).

Vulcanization Assistant

For the vulcanizing agent (D) of the organic peroxide, it is preferable to use concurrently a vulcanization assistant in an amount of 0.5–2 moles per mole of the organic peroxide, preferably in a nearly equivalent amount therewith.

As the vulcanization assistant, there may be exemplified concretely sulfur, compounds based on quinone dioxime, such as, p-quinone dioxime etc., in addition to polyfunctional monomers, for example, compounds based on (meth) acrylate, such as, trimethylol propane triacrylate, polyethyleneglycol dimethacrylate etc.; compounds based on allyl, such as diallyl phthalate and triallyl cyanurate; compounds based on maleimide, such as m-phenylene bismaleimide etc.; and divinyl benzene.

Other Components

The rubber composition according to the present invention may contain other component(s) than those described above. For example, antioxidant (stabilizer), processing assistant, compounds constituting the foaming system, such as, foaming agent and foaming assistants, plasticizer, coloring agents, other rubber additives and various chemicals may beemployed. The kinds and amounts of such other components may voluntarily be selected according to each specific application.

Antioxidant

By incorporating an antioxidant in the rubber composition according to the present invention, the life of the product can be extended. Concrete examples of the antioxydant include stabilizers based on aromatic secondary amine, such as, phenylnaphthylamine, 4,4'- ($\alpha$, $\alpha$-dimethylbenzyl) diphenylamine and N,N'-di-2-naphthyl-p-phenylenediamine; stabilizers based on phenol, such as, 2,6-di-t-butyl-4-methylphenole and tetrakis|methylene-3-(3',5'-di-t-butyl-4'-hydroxyphenyl)propionate] methane; stabilizers based on thioether, such as, bis[2-methyl-4-(3-n-alkylthiopropionyloxy)-5-t-butylphenyl] sulfide and the like; stabilizers based on benzimidazole, such as 2-mercaptobenzimidazole etc.; stabilizers based on dithiocarbamate, such as, nickel dibutyldithiocarbamate etc.; and stabilizers based on quinoline, such as a polymer of 2,2,4-trimethyl-1,2-dihydroquinoline. They can also be used in a combination of two or more of them.

The antioxidant may be used in an amount of 5 parts by weight or less, preferably 3 parts by weight or less, per 100 parts by weight of the unsaturated copolymer based on olefin (A).

Processing Assistant

For the processing assistant, those which have found applications generally as processing assistant in rubbers can be used widely. Concrete examples include acids, such as, ricinoleic acid, stearic acid, palmitic acid and lauric acid; salts of these higher fatty acids, such as, barium stearate, zinc stearate and calcium stearate; and esters.

The processing assistant may be used in an amount of 10 parts by weight or less, preferably 5 parts by weight or less, per 100 parts by weight of the unsaturated copolymer based on olefin (A).

Foaming Agent

The rubber composition according to the present invention may be molded under foaming, if it contains compounds constituting a foaming system, such as, foaming agent and foaming assistant.

As the foaming agent, those which have found applications generally for foaming rubbers can be used widely. Concrete examples therefor include inorganic foaming agents, such as, sodium bicabonate, sodium carbonate, ammonium bicarbonate, ammonium carbonate and ammonium nitrite; nitroso compounds, such as, N,N'-dimethyl-N, N'-dinitrosoterephthalamide and N,N'-dinitrosopentamethylenetetramine; azo compounds, such as, azodicarbonamide, azobisisobutyronitrile, azocyclohexylnitrile, azodiaminobenzene and barium azodicarboxylate; sulfonylhydrazide compounds, such as, benzenesulfonylhydrazide, toluenesulfonylhydrazide, p,p'-oxybis-(benzenesulfonylhydrazide) and diphenylsulfon-3, 3'-disulfonylhydrazide; and azide compounds, such as, calcium azide, 4,4-diphenyldisulfonyl azide and p-toluenesulfonyl azide. Among them, nitroso compounds, azo compounds and Azide compounds are preferred.

The foaming agent may be used in an amount of 0.5–30 parts by weight, preferably 1–20 parts by weight, per 100 parts by weight of the unsaturated copolymer based on olefin (A). Using a rubber composition having a content of the foaming agent in the above-mentioned range, a foamed product having an apparent density of 0.03–0.8 g/cm$^3$ can be produced.

A foaming assistant may also be used together with the foaming agent. By a concurrent use of a foaming assistant may bring about advantageous effects of decreasing the decomposition temperature of the foaming agent, acceleration of decomposition of the foaming agent and homogenization of the foam sizes. As the foaming assistant, for example, organic acids, such as, salicilic acid, phthalic acid, stearic acid and oxalic acid, as well as urea and its derivatives may be enumerated.

The foaming assistant may be used in an amount of 0.01–10 parts by weight, preferably 0.1–5 parts by weight, per 100 parts by weight of the unsaturated copolymer based on olefin (A).

Other Rubber Components

In the rubber composition according to the present invention, other rubber component(S) known per se can be included within the range not deteriorating the purpose of the invention.

For such other rubber component(s), there may be enumerated, for example, natural rubber (NR), rubbers based on isoprene, such as isoprene rubber (IR) etc., rubbers based on conjugated diene, such as, butadiene rubber (BR), srtyrene-butadiene rubber (SBR), acrilonitrile-butadiene rubber (NBR) and chloroprene rubber (CR).

It is also possible to incorporate other known copolymer rubber based on ethylene-α-olefin and, for example, an ethylene-propylene random copolymer (EPR) and an ethylene-α-olefin-polyene copolymer, such as EPDM, may be employed.

The vulcanizable rubber composition according to the present invention may desirably contain the unsaturated copolymer based on olefin (A) in an amount of 20% by weight or more, preferably 25% by weight or more, based on the total weight of the rubber composition. When the content of the unsaturated copolymer based on olefin (A) is in this range, better material properties of the rubber product will be revealed.

The vulcanizable rubber composition according to the present invention can be prepared from the unsaturated copolymer based on olefin (A) and the other components mentioned above by a commonly employed method for preparing rubber compounds. For example, unsaturated copolymer based on olefin (A) and other components to be compounded are kneaded on an internal mixer, such as Bumbury mixer, kneader and intermix, at a temperature of 80°–170° C. for 3–10 minutes, and, after admixing thereto, if necessary, a vulcanizing agent (D), a vulcanization accelerator and a vulcanization assistant, the resulting compound is further kneaded on a roller, such as an open roll, or on a kneader at a roller temperature of 40°–80° C. for 5–30 minutes, before it is subdividedly discharged out. In this manner, a rubber composition (compounded rubber) in a form of usually of a ribbon or sheet can be obtained. If the kneading temperature in the internal mixer is lower, it is possible to knead the rubber composition together with the vulcanizing agent (D), vulcanization accelerator and foaming agent simultaneously.

Vulcanized Rubber

For producing a vulcanized product (vulcanized rubber) from the rubber composition according to the present invention, usually the unvulcanized rubber composition is first processed by preforming it into a contemplated shape by voluntary techniques using a molding apparatus, such as extrusion molding machine, calender roll, press, injection molding machine or transfer molding machine. Vulcanization of the so-preformed green product is realized by heating it, either during the preforming or after having been transfered to a vulcanizing vessel, or by irradiating it by an electron beam.

The heating for the vulcanization may preferably be effected in a heating vessel by hot air, glass beads fluidizing bed, UHF (ultra high frequency radio wave), steam or LCM (hot molten salt vessel) at a temperature of 150°–270° C. for 1–30 minutes.

The electron beam irradiation for vulcanization without using vulcanizing agent may preferably be effected with an electron beam having an energy of 0.1–10 MeV, preferably 0.3–2 MeV so as to provide an absorbed dose of 0.5–35 Mrad, preferably 0.5–10 Mrad.

The molding with vulcanization may be realized with or without using a metal mold. In case of without using metal mold, the rubber composition is usually molded with vulcanization in continuous mode.

The rubber products, molded and vulcanized as above, can serve for various applications, including parts for automobile industry, such as weather strips, door glass run channel, window frame, radiator hose, brake parts, wiper blade, brake cap, ceiling member, air bag cover, instrument panel, trims, controller knob and seer belt cover; industrial rubber products, such as rubber rollers, belts, packings and hoses; electric insulators for anode cap, grommet and cables; materials for archtectural and constructional uses, such as gaskets for buildings and land cover sheet; and others including rubber coated cloth, electroconductive rubber, high hardness rubber and skin sheet.

The foamed vulcanization products obtained by heat-foaming a rubber composition containing a foaming agent can be used for heat insulation, cushioning and sealing.

In summary, the unsaturated copolymer based on olefin according to the present invention is a random copolymer of constituent comonomers of α-olefin (a-1), an aromatic ring-containing vinyl monomer (a-2) and a chain-formed non-conjugated triene or tetraene having one vinyl group in the molecule (a-3) and contains each specific proportion of the corresponding structural units which are derived respectively from these comonomers. It brings about by vulcanization a product which is supeior in the resistance to dynamic fatige (flexural fatigue resistance), weatherability, fastness to ozone, stability in thermal aging and low temperature characteristic together with superior performances in the chemical reactivity, processibility and compatibility and co-vulcanizability with aromatic ring-containing polymers, such as styrene-butadiene rubber (SBR) etc., so that it can serve for material of various rubber products and many other applications such as modifier of resin products.

According to the present invention, a method for producing the unsaturated copolymer based on olefin is proposed, which comprises subjecting the α-olefin (a-1), the aromatic ring-containing vinyl monomer (a-2) and the chain-formed non-conjugated triene or tetraene having one vinyl group in the molecule (a-3) to a copolymerization in the presence of a catalyst formed from a transition metal compound and an organoaluminum compound and/or an ionized ionic compound, whereby the unsaturated copolymer based on olefin can be produced efficiently. In particular, when a catalyst based on metallocene is used for the catalyst, the aromatic ring-containing vinyl monomer (a-2) and the non-conjugated triene or tetraene (a-3) can be transferred into the copolymer at a high conversion, with simultaneous attainment of very narrow molecular weight distribution of the unsaturated copolymer based on olefin in an easy manner.

The rubber composition comrising the unsaturated copolymer based on olefin and at least one of the additives among a reinforcing filler (B), a softening agent (C) and a vulcanizing agent (D) can afford to bring about a vulcanized product which is superior in the resistance to dynamic fatigue (flexural fatigue resistance), weatherability, fastness to ozone, stability in thermal aging and low temperature characteristic together with superior performances in the chemical reactivity, processibility and compatibility and co-vulcanizability with aromatic ring-containing polymers, such as styrene-butadiene rubber (SBR) etc.

THE BEST MODE FOR EMBODYING THE INVENTION

Below, the present invention is described more concretely by way of Examples, wherein the gist of the invention does never restricted by such Examples.

Reference Example 1

<Synthesis of 6,10-Dimethyl-1,5,9-Undecatriene (DMUT)>
6,10-dimethyl-1,5,9-undecatriene (DMUT) represented by the following general formula (33) corresponding to the general formula (2-1) in which p=0, q=1, f=1 and g=2 was produced in the manner as given below. Here, the total number of the hydrogen atom directly bound to all the carbon atoms adjoining to every carbon-to-carbon double bond in this compound is calculated to be 17.

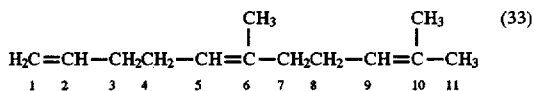

In a 1-liter three-neck flask equipped with a stirrer, a Dimroth condenser, a dropping funnel and a thermometer, 25.5 grams (1.05 gram atom) of magnesium metal chips, 200 ml of anhydrous diethyl ether and 200 mg of 1,2-dibromoethane were charged under nitrogen atmosphere, whereto a solution of 127 g (1.05 moles) of allyl bromide in anhydrous diethyl ether (200 ml) was dropped by a small amount. This was done with agitation.

After a heat generation of the contents of the flask has started and the formation of allyl magnesium bromide (Grignard reagent) has begun, 400 ml of anhydrous diethyl ether were further added to the flask and the remainder of the solution of allyl bromide in anhydrous diethyl ether was dropped into the flask over a period of 5 hours while maintaining the flask internal temperature at 5° C. or lower in ice-water bath. After the dropping of the allyl bromide solution was over, the agitation was continued for further 0.5 hour to obtain a solution of allyl magnesium bromide.

The insoluble matter remaining in the resulting allyl magnesium bromide solution was removed by decantation and the solution was transferred to a 2-liter three neck flask under nitrogen atmosphere.

To the three neck flask containing the allyl magnesium bromide, a solution of 150 g (0.69 mole) of geranyl bromide in 200 ml of anhydrous diethyl ether was supplied by dropping it over a period of 2 hours while maintaining the internal temperature at 5° C. by cooling the flask in a ice water bath. After the dropping of the geranyl bromide solution was over, the reaction mixture was stirred at room temperature for further 8 hours.

To the resulting reaction mixture, saturated aqueous solution of ammonium chloride was introduced by dropping thereinto gradually while cooling the reaction mixture in ice bath. Then, diethyl ether and water were added thereto and the mixture was stood to cause phase separation into organic and aqueous phases.

The organic phase was washed with saturated aqueous solution of sodium bicarbonate and with saturated aqueous solution of table salt, whereupon it was dried on anhydrous magnesium sulfate. From the resulting dried organic phase, solvent was distilled off and the residue was subjected to distillation under reduced pressure, whereby 104 grams of the objective compound, 6,10-dimethyl-1,5,9-undecatriene (DMUT), were obtained (yield 85%, based on geranyl bromide).

The appearance and material properties of the resulting 6,10-dimethyl-1,5,9-undecatriene (DMUT) are given below:

1) Appearance: colorless, oily 2) Boiling point: 58°–60° C./266 Pa (2 mmHg) 3) MS spectrum: 178 (M$^+$: molecular ion peak) 4) $^1$H NMR spectrum (CDCl$_3$ solvent): δ 1.64 (6H, singlet) 1.70 (3H, singlet) 2.1 (8H, multiplet) 5.0 (4H, multiplet) 5.8 (1H, multiplet) 5) IR absorption spectrum (neat, cm$^{-1}$): 3075, 2970, 2920, 2850, 1640, 1440, 1380, 1105, 995, 905

Reference Example 2

<Synthesis of 4-Ethylidene-8-Methyl-1,7-Nonadiene (EMN)>
4-ethylidene-8-methyl-1,7-nonadiene (EMN) represented by the following general formula (34) corresponding to the general formula (2-1) in which p=1, q=0, f=1 and g=1 was produced in the manner as given below. Here, the total number of the hydrogen atom directly bound to all the carbon atoms adjoining to every carbon-to-carbon double bond in this compound is calculated to be 15.

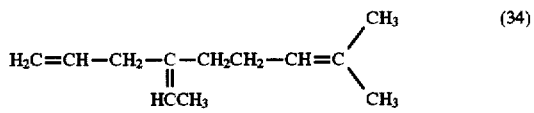

Preparation of Catalyst

In a 50 ml flask with a stirrer rotor placed therein, 43 mg (0.33 mmol) of anhydrous cobalt(II) chloride, 263 mg (0.66 mmol) of 1,2-bis(diphenyl-phosphino)ethane and 23 ml of anhydrous decane were charged under argon atmosphere and the mixture was stirred at 25° C. for 2 hours. Thereto were added then 17 ml of a solution of triethylaluminum/ toluene of a concentration of 1 mole per liter (triethylaluminum 17 mmol) at 25° C. and the mixture was stirred for further 2 hours, whereby a catalyst solution was prepared.

In a 300 ml stainless steel (SUS316) autoclave, 100 grams (734 mmol) of 7-methyl-3-methylene-1,6-octadiene (β-myrcene) and whole amount of the above catalyst solution were charged under argon atmosphere and the autoclave was sealed. To the autoclave was connected an ethylene bomb directly and ethylene was pressed thereinto up to an autoclave inner pressure of 3.4 MPa (35 kgf/cm$^2$ gauge). The autoclave was heated at 95° C. while replenishing ethylene intermittently in total of 5 times for compensating the consumption of ethylene by the reaction and the reaction was continued for 15 hours.

After the reaction, the autoclave was cooled and opened. The reaction mixture obtained was poured into 100 ml of water to cause phase separation into aqueous and organic phases. From the separated organic phase, low boiling fraction and impurities were removed on a evaporator. Then, the so-obtained product was subjected to 20-staged rectification under reduced pressure, whereby the objective compound EMN was obtained in an amount of 83 grams (yield 69%). Here, 16 grams of 5,9-dimethyl-1,4,8-decatriene were formed as a by-product (yield 13%).

The result of analysis of the so-obtained 4-ethylidene-8-methyl-1,7-nonadiene (EMN) are recited below:

1) Boiling point: 103°–105° C./4000 Pa (30 mmHg) 2) GC-MS (gas chromatography-mass spectrometry): m/z 164 (M$^+$ molecular ion peak) 149, 123, 95, 69, 41, 27 3) IR absorption spectrum (neat, cm$^{-1}$): 3080, 2975, 2925, 2850, 1670, 1640, 1440, 1380, 1235, 1110, 995, 910, 830 4) $^1$H NMR spectrum (solvent: CDCl$_3$): δ 1.59 (3H, doublet, J=7 Hz) 1.60 (3H, singlet) 1.68 (3H, singlet) 2.00 (2H, multiplet) 2.06 (2H, multiplet) 2.80 (2H, doublet, J=7 Hz) 4.9–5.2 (3H, multiplet) 5.30 (1H, quartet, J=7 Hz) 5.75 (1H, multiplet)

Reference Example 3

<Synthesis of 5,9-Dimethyl-1,4,8-Decatriene (DMDT)>5,9-Dimethyl-1,4,8-Decatriene (DMDT) represented by the following general formula (35) corresponding to the general formula (2-1) in which p =0, q =1, f =0 and g=2 was produced in the manner as given below. Here, the total number of the hydrogen atom directly bound to all the carbon atoms adjoining to every carbon-to-carbon double bond in this compound is calculated to be 15.

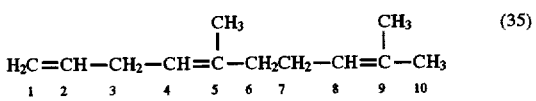

In a 1-liter three-neck flask equipped with a stirrer, a Dimroth condenser, a dropping funnel and a thermometer, 500 ml (0.435 mole) of a solution of vinyl magnesium bromide in anhydrous tetrahydrofuran of a concentration of 0.87 mole/liter were charged under a nitrogen atmosphere and the contents of the flask was cooled in an ice bath. Then, 100 ml of a solution of 75 grams (0.346 mole) of geranyl bromide in anhydrous tetrahydrofuran were dropped into the flask over a period of 30 minutes while stirring the contents of the flask and the stirring was continued for further 8 hours at room temperature.

To the resulting reaction mixture, saturated aqueous solution of ammonium chloride was introduced by dropping thereinto gradually while cooling the reaction mixture in ice bath. Then, diethyl ether and water were added thereto and the mixture was stood to cause phase separation into organic and aqueous phases.

The isolated organic phase was washed with saturated aqueous solution of sodium bicarbonate and with saturated aqueous solution of table salt, whereupon it was dried on anhydrous magnesium sulfate. From the resulting dried organic phase, solvent was distilled off and the residue was subjected to distillation under reduced pressure, whereby 21.9 grams of the objective compound, 5,9-dimethyl-1,4,8-decatriene (DMDT), were obtained (yield 39%, based on geranyl bromide).

The appearance and material properties of the resulting 5,9-dimethyl-1,4,8-decatrienene (DMDT) are given below:

1) Appearance: colorless, oily 2) Boiling point: 56°–58° C./266 Pa (2 mmHg) 3) MS spectrum: 164 (M⁺) 4) ¹H NMR spectrum (CDCl₃ solvent): δ 6 1.64 (6H, singlet) 1.70 (3H, singlet) 2.04 (4H, singlet) 2.76 (2H, multiplet) 5.0 (4H, multiplet) 5.8 (1H, multiplet) 5) IR spectrum (neat): 3075, 2970, 2920, 2850, 1640, 1440, 1380, 1105, 995, 905

EXAMPLE 1

<Preparation of Catalyst Solution based on Metallocene>

In a sufficiently nitrogen-replaced glass flask, 40.5 mg of [dimethyl(t-butylamido)(tetramethyl-cyclopentadienyl) silane]titanium dichloride were charged and thereto were added 55 ml of a toluene solution of a methyl aluminoxane (obtained by drying a commercial methyl aluminoxane of the firm Witco to dryness and re-dissolving in toluene; Al 1.1 mol/l), whereby a catalyst solution based on metallocene was obtained.

<Polymerization>

In a 1 liter glass autoclave sufficiently replaced by nitrogen, 400 ml of toluene, 100 ml of styrene and 2 ml of a mixture (which is called hereinafter "EMN") containing predominantly 4-ethylidene-8-methyl-1,7-nonadiene obtained in Reference Example 2 were charged and the temperature of the system inside was elevated to 40° C. Subsequently, the polymerization was started by adding thereto 30 ml (0.06 mmol as Ti) of the solution of the catalyst based on metallocene while introducing ethylene thereto at a rate of 100 liters per hour. Thereafter, only ethylene was supplied to the autoclave continuously to proceed the polymerization under normal pressure at 40° C. for 1 hour. The polymerization was terminated by adding a small amount of ethanol into the reaction system and the unreacted ethylene was purged out. The resulting polymer solution was introduced into a large excess of a mixed solution of hydrochloric acid/methanol to precipitate the polymer. The polymer was recovered by filtration and was dried, after addition of a stabilizer (10 mg of Irganox 1010 of Ciba Geigy and 10 mg of Mark 329K of Asahi Denka Kogyo K.K.), at 80° C. overnight under a reduced pressure.

7.8 grams of a copolymer of ethylene-styrene-EMN having an intrinsic viscosity [η] of dl/g were obtained, which contained 65.6 mole % of the structural unit derived from ethylene, 32.8 mole % of the structural unit derived from styrene and 1.6 mole % of the structural unit derived from EMN.

EXAMPLE 2

The procedures of Example 1 were followed except that the amount of toluene and of styrene were changed to 480 ml and 20 ml, respectively. 11.7 grams of a copolymer of ethylene-styrene-EMN having an intrinsic viscosity [η] of 1.5 dl/g were obtained, which contained 91.9 mole % of the structural unit derived from ethylene, 6.7 mole % of the structural unit derived from styrene and 1.4 mole % of the structural unit derived from EMN.

EXAMPLE 3

The procedures of Example 1 were followed except that the amounts of toluene, styrene and EMN were changed to 450 ml, 50 ml and 3 ml, respectively. 10.3 grams of a copolymer of ethylene/styrene/EMN having an intrinsic viscosity [η] of 1.1 dl/g were obtained, which contained 80.4 mole % of the structural unit derived from ethylene, 17.8 mole % of the structural unit derived from styrene and 1.8 mole % of the structural unit derived from EMN.

EXAMPLE 4

<Preparation of Solid Titaniferous Catalyst Component (h-1)>

95,2 of anhydrous magnesium chloride, 442 ml of decane and 390.6 of 2-ethylhexyl alcohol were heated to effect a reaction at 130° C. for 2 hours, whereby a homogeneous solution was formed. To the solution were then added 21.3 grams of phthalic anhydride and the solution was stirred at 130° C. for 1 hour to cause the phthalic anhydride to be dissolved therein homogeneously. The resulting homogeneous solution was cooled to room temperature and 75 ml of the solution were dropped into 200 ml of titanium tetrachloride held at −20° C. over a period of 1 hour entirely. After the dropping, the temperature of the resulting mixed liquid was elevated to 110° C. over a period of 4 hours and, when it reached 110° C., 5.22 g of diisobutyl phthalate were added thereto and the mixture was maintained under agitation at the same temperature for further 2 hours. After the two hours reaction was over, the solids in the reaction mixture were collected by hot filtration. The solids obtained were re-suspended in 275 ml of titanium tetrachloride and the reaction was repeated by heating at 110° C. for 2 hours. After the reaction, filtration of reaction mixture was effected again to collect the solids therein, which were washed sufficiently with decane and hexane at 110° C. until no free titanium compound was detected in the filtrate. The resulting titaniferous component (h-1) for the catalyst obtained as above was stored as a slurry in decane, from which a portion was taken out and dried for examining the catalyst composition. The composition of the so-obtained solid titaniferous catalyst component (h-1) was found to be 2.5% by weight of titanium, 65% by weight of chlorine, 19% by weight of magnsium and 13.5% by weight of diisobutyl phthalate.

<Polymerization>

In a 1 liter glass autoclave sufficiently replaced by nitrogen, 400 ml of decane, 100 ml of 1-octene, 20 ml of 4-phenyl-1-butene and 5 ml of in 5,9-dimethyl-1,4,8-decatriene (DMDT) obtained Reference Example 3 were charged and the temperature of the system inside was elevated to 50° C. Subsequently, the polymerization was started by adding thereto 2 mmol triisobutylaluminum, 0.6 mmol of trimethylmethoxysilane and 0.02 mmol (converted as Ti) of the above-mentioned solid titaniferous component (h-1) while supplying thereto hydrogen at a rate of 0.8 liter per hour and nitrogen at a rate of 50 liters per hour. The polymerization was terminated by adding a small amount of ethanol into the reaction system and the unreacted 1-octene was purged out. The resulting polymer solution was introduced into a large excess of a mixed solution of hydrochloric acid/methanol to precipitate the polymer. The polymer was recovered by filtration and was dried, after addition of a stabilizer (10 mg of Irganox 1010 of Ciba Geigy and 10 mg of Mark 329K of Asahi Denka Kogyo K.K.), at 130° C. overnight under a reduced pressure.

12.8 grams of a copolymer of 1-octene/4-phenyl-1-butene/DMDT having an intrinsic viscosity [η] of 4.7 dl/g were obtained, which contained 73.9 mole % of the structural unit derived from 1-octene, 23.2 mole % of the structural unit derived from 4-phenyl-1-butene and 2.9 mole % of the structural unit derived from DMDT.

EXAMPLE 5

In a 1.5 liter stainless steel autoclave sufficiently replaced by nitrogen, 360 ml of toluene, 120 ml of styrene and 8 ml of EMN were charged and the temperature of the system inside was elevated to 40° C. Subsequently, the polymerization was started by adding thereto 9 ml (0.018 mmol as Ti) of the solution of catalyst based on metallocene prepared in Example 1 and introducing ethylene thereto so as to reach an ethylene pressure of 10 kgf/cm². Thereafter, only ethylene was supplied to the autoclave continuously to proceed the polymerization so as to maintain the ethylene pressure of 10 kgf/cm² at 40° C. for 30 minutes. Hereafter, the procedures of Example 1 were pursued.

10 grams of a copolymer of ethylene/styrene/EMN having an intrinsic viscosity [η] of 2.4 dl/g were obtained, which contained 83.1 mole % of the structural unit derived from ethylene, 15.1 mole % of the structural unit derived from styrene and 1.8 mole % of the structural unit derived from EMN. The experimental results are summarized in Table 1.

EXAMPLE 6

The procedures of polymerization in Example 5 were followed except that the amounts of toluene, styrene and EMN were changed to 380 ml, 100 ml and 6.5 ml, respectively, while introducing propylene and ethylene thereto so as to reach a propylene pressure of 2.2 kgf/cm² and an ethylene pressure of 6 kgf/cm². 18 grams of a copolymer of ethylene/propylene/styrene/EMN having an intrinsic viscosity [η] of 2.2 dl/g were obtained, which contained 71.2 mole % of the structural unit derived from ethylene, 15.0 mole % of the structural unit derived from propylene, 12.3 mole % of the structural unit derived from styrene and 1.5 mole % of the structural unit derived from EMN. The experimental results are summarized in Table 1.

EXAMPLE 7

The procedures of polymerization in Example 5 were followed except that toluene, styrene, 1-octene and EMN were used in amounts of 375 ml, 80 ml, 25 ml and 6 ml, respectively, while introducing ethylene thereto so as to reach an ethylene pressure of 7 kgf/cm² at a reaction temperature of 60° C. A copolymer of ethylene/1-octene/styrene/EMN having an intrinsic viscosity [η] of 1.7 dl/g was obtained in an amount of 20 grams, which contained 80.8 mole % of the structural unit derived from ethylene, 8.2 mole % of the structural unit derived from 1-octene, 9.6 mole % of the structural unit derived from styrene and 1.4 mole % of the structural unit derived from EMN. The experimental results are summarized in Table 1.

Comparative Example 1

The procedures of polymerization in Example 5 were repeated except that ethylidenenorbornene (ENB) was used in the place of EMN and the amounts of toluene, styrene and ENB were 360 ml, 120 ml and 17 ml, respectively, while introducing ethylene thereto so as to reach an ethylene pressure of 6 kgf/cm² at a reaction temperature of 60° C. A copolymer of ethylene/styrene/ENB having an intrinsic viscosity [η] of 2.5 dl/g was obtained in an amount of 23 grams, which contained 81.3 mole % of the structural unit derived from ethylene, 15.0 mole % of the structural unit derived from styrene and 3.7 mole % of the structural unit derived from ENB. The experimental results are summarized in Table 1.

TABLE 1

| Component | | Example 5 | Example 6 | Example 7 | C.Example 1 |
|---|---|---|---|---|---|
| Ethylene | (mol %) | 83.1 | 71.2 | 80.8 | 81.3 |
| Propylene | (mol %) | — | 15.0 | — | — |
| Octene | (mol %) | — | — | 8.2 | — |
| Styrene | (mol %) | 15.1 | 12.3 | 9.6 | 15.0 |
| Triene EMN | (mol %) | 1.8 | 1.5 | 1.4 | — |
| Diene ENB | (mol %) | — | — | — | 3.7 |
| Iodine v. *) | | 22 | 18 | 16 | 22 |
| [η] | (dl/g) | 2.4 | 2.2 | 1.7 | 2.5 |

Note: *) Iodine value in gram iodine/100 g polymer

EXAMPLE 8 TO 11

Comparative Example 2

Using the copolymer ruber given in Table 1 above and the copolymer rubber of Example 4, Compounds as given in Table 2 below were prepared on a 6-inch open roll adjusted to 50°/60° C. and 16/18 rpm for the fore roll/aft roll.

TABLE 2

| | Example 8 | Example 9 | Example 10 | Example 11 | Compar. Example 2 |
|---|---|---|---|---|---|
| Rubber of Example 4 | 100 | — | — | — | — |
| Rubber of Example 5 | — | 100 | — | — | — |
| Rubber of Example 6 | — | — | 100 | — | — |
| Rubber of Example 7 | — | — | — | 100 | — |
| Rubber of Comp. Ex. 1 | — | — | — | — | 100 |
| Stearic acid | 1 | 1 | 1 | 1 | 1 |
| Zinc white | 5 | 5 | 5 | 5 | 5 |
| FEF Carbon ¹ | 50 | 80 | 80 | 80 | 80 |

TABLE 2-continued

|  | Example | | | | Compar. Example |
|---|---|---|---|---|---|
|  | 8 | 9 | 10 | 11 | 2 |
| Naphthenic Oil | — | 50 | 50 | 50 | 50 |
| Sulfur | 0.5 | 1.5 | 1.5 | 1.5 | 1.5 |
| Vulcan. acc. MBT [2] | 0.5 | 0.5 | 0.5 | 0.5 | 0.5 |
| Vulcan. acc. DMTT [3] | 0.3 | 1.0 | 1.0 | 1.0 | 1.0 |

Note: [1] Asahi Carbon #60 ( ®, of Asahi K.K.)
[2] Vulcanization accelerator, ® of Sanshin Kagaku K.K.
[3] Vulcanization accelerator, ® of Sanshin Kagaku K.K Using the rubber compound as give in table 2 above, 90% vulcanization time was determined by Curelastometer (made of the firm JSR) at 160° C. Vulcanized test sheets were prepared on a press heated at 160° C. by heat-pressing each rubber compound for testing tensile strength, hardness, aging and flexural property as explained below. The results are summarized in Table 3 below.

Tests were carried out in accordance with the standard method of JIS K 6301. Thus, in the tensile test, tesile strength $T_B$ and elongation $E_B$ were determined and, in the hardness test, JIS A hardness H, was determined.

In the aging test, heated aging at 120° C. during 70 hours was examined, wherein the degrees of retention of material properties, namely, the tensile strength retention degree $AR(T_B)$ and elongation retention degree $AR(E_B)$ after the test relative to the value before the test were observed.

In the bending test, resistance to propagation of cracks was observed on De Mattia Testing Machine. Thus, number of repeats of bending until the crack had grown to a length of 15 mm was observed.

TABLE 3

|  | Example | | | | Compar. Example |
|---|---|---|---|---|---|
|  | 8 | 9 | 10 | 11 | 2 |
| Vulcan. vel. t 90 min. | 4.9 | 5.0 | 5.5 | 4.1 | 12.3 |
| Normal Properties | | | | | |
| $T_B$ (MPa) | 11 | 10 | 10 | 9 | 11 |
| $E_B$ (%) | 450 | 450 | 430 | 550 | 480 |
| $H_S$ (JIS A) | 79 | 72 | 75 | 69 | 79 |
| Stability in heated Aging *) | | | | | |
| $AR(T_B)$ (%) | 102 | 103 | 105 | 90 | 108 |
| $AR(E_B)$ (%) | 68 | 65 | 62 | 60 | 45 |
| Fastness to flex. fatig. (repeats) | >10⁵ | >10⁶ | >10⁵ | >10⁶ | >10⁵ |

Note: *) The closer the values for $AR(T_B)$ and $AR(E_B)$ to 100%, the better the fastness to fatigue.

From Table 3, it is seen that the sheet in the inventive Examples exhibit higher vulcanization velocity and superior stability in heated aging.

EXAMPLES 12 AND 13

Comparative Example 3

Three rubber compounds as given in Table 4 below were prepared for evaluating the co-vulcanizability with styrene/butylene copolymer rubber (SBR). Using each of these rubber compounds, vulcanized test sheets were prepared by heat pressing the compound for 30 minutes on a press heated at 150° C. Tensile test was carried out for each of these vulcanized sheets, the results of which was assumed to be a measure of the co-vulcanizability. The copolymers of Example 6 and Comparative Example 1 were also tested in the same manner. The results are summarized in Table 5 below.

TABLE 4

(Parts by weight)

|  | Basal Compos. 1 | Evaluative Compos. | Basal Compos. 2 |
|---|---|---|---|
| SBR 1502 [1] | 100 | 50 | — |
| Copolymer for evaluat. [2] | — | 50 | 100 |
| Stearic acid | 1 | 1 | 1 |
| Zinc white | 5 | 5 | 5 |
| FEF Carbon | 40 | 40 | 40 |
| Sulfur | 1.5 | 1.5 | 1.5 |
| Diphenylguanidine | 2.5 | 2.5 | 2.5 |

Note: [1] A styrene/butadiene copolymer rubber (Zetpol 1502, ® of Nippon Zeon Co.).
[2] The copolymer rubber of Example 5 or 6 or of Comparative Example 1.

TABLE 5

|  | Example | | Comparat. Example |
|---|---|---|---|
|  | 12 | 13 | 3 |
| Copolymer assessed | Example 5 | Example 6 | Comp. Example 1 |
| Co-vulcanizability*) | 101 | 99 | 87 |

Note: *) The value calculated according to the equation given below. The larger the value, the better will be the co-vulcanizability. Thus, if the value is higher than 100, it means that the strength of the tested composition is higher than the addition average for the strength values for the two basal compositions and, if this value is lower than 100, it means that the strength of the tested composition is lower than the addition average for the two basal ones.

$$\text{Co-vulcanizability} = 100 \times \frac{(2\times \text{Strength of tested Composition})}{(\text{Strength of Basal 1}) + (\text{Strength of Basal 2})}$$

From Table 5, it is seen that the composition of inventive Examples are superior in co-vulcanizability as compared with that of Comparative Examples.

We claim:

1. An unsaturated copolymer based on olefin, which comprises a random copolymer of constituent comonomers of (a-1) an α-olefin having 2–20 carbon atoms, (a-2) a vinyl monomer having an aromatic ring, as represented by formula (1) given below and (a-3) a chain-formed non-conjugated triene or tetraene having one vinyl group in the molecule, said copolymer comprising constituent structural units of (b-1) 30–99.8 mole % of a structural unit derived from said α-olefin (a-1), (b-2) 0.1–60 mole % of a structural unit derived from said vinyl monomer (a-2) and (b-3) 0.1–10 mole % of a structural unit derived from said non-conjugated triene or tetraene (a-3)

and having an intrinsic viscosity [η] determined in Decalin® (Decahydronaphthalene) at 135° C. in the range from 0.05 to 10 dl/g:

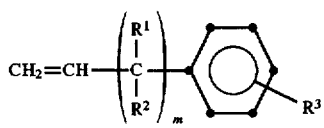
(1)

wherein m is an integer of 0–5 and $R^1$, $R^2$ and $R^3$ may be identical with or different from each other and denote each hydrogen atom or an alkyl group having 1–8 carbon atoms.

2. An unsaturated copolymer based on olefin according to claim 1, wherein the constituent comonomer (a-3) is a non-conjugated triene or tetraene, in which one hydrocarbon chain group and two hydrogen atoms are bound to the carbon atom adjacent the vinyl group.

3. An unsaturated copolymer based on olefin according to claim 2, wherein the constituent comonomer (a-3) is a compound represented by formula (2-1) given below and the constituent structural unit (b-3) is represented by formula (3-1) given below:

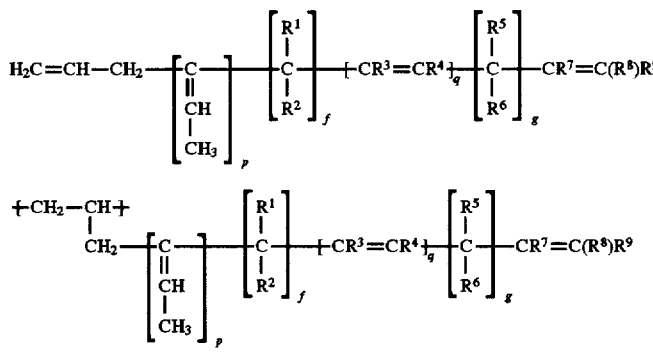
(2-1)

(3-1)

wherein, in the above formula (2-1), p and q denote each 0 or 1 but not both 0 simultaneously, f denotes an integer of 0–5 with the proviso that f is not 0 when both p and q are 1, g denotes an integer of 1–6, $R^1$, $R^2$, $R^3$, $R^4$, $R^5$, $R^6$ and $R^7$ represent each hydrogen atom or an alkyl group having 1–5 carbon atoms, $R^8$ denotes an alkyl group having 1–5 carbon atoms and $R^9$ denotes hydrogen atom, an alkyl group having 1–5 carbon atoms or a group represented by —$(CH_2)_n$—$CR^{10}$=$C(R^{11})R^{12}$ in which n is an integer of 1–5, $R^{10}$ and $R^{11}$ denote each hydrogen atom or an alkyl group having 1–5 carbon atoms and $R^{12}$ denotes an alkyl group having 1–5 carbon atoms, with the proviso that $R^9$ stands for hydrogen atom or an alkyl group having 1–5 carbon atoms when both p and q are 1, and in the above formula (3-1), p, q, f, g and $R^1$–$R^9$ have the same meanings as above.

4. An unsaturated copolymer based on olefin according to claim 3, wherein the constituent comonomer (a-3) is a compound represented by formula (2-2) given below and the structural unit (b-3) is represented by the general formula (3-2) given below:

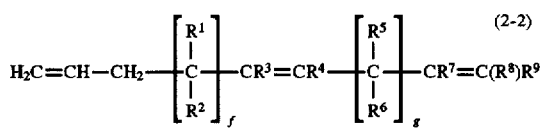
(2-2)

-continued

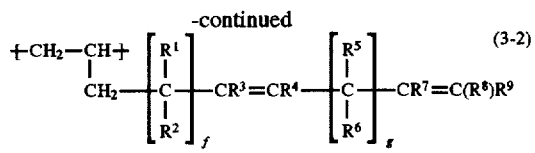
(3-2)

wherein, in the above formula (2-2), f denotes an integer of 0–5, g denotes an integer of 1–6, $R^1$, $R^2$, $R^3$, $R^4$, $R^5$, $R^6$ and $R^7$ represent each hydrogen atom or an alkyl group having 1–5 carbon atoms, $R^8$ denotes an alkyl group having 1–5 carbon atoms and $R^9$ denotes hydrogen atom, an alkyl group having 1–5 carbon atoms or a group represented by —$(CH_2)_n$—$CR^{10}$=$C(R^{11})R^{12}$ in which n is an integer of 1–5, $R^{10}$ and $R^{11}$ denote each hydrogen atom or an alkyl group having 1–5 carbon atoms and $R^{12}$ denotes an alkyl group having 1–5 carbon atoms and, in the above general formula (3-1), f, g and $R^1$–$R^9$ have the same meanings as those given for the general formula (2-2).

5. An unsaturated copolymer based on olefin according to claim 3, wherein the constituent comonomer (a-3) is a compound represented by formula (2-3) given below and the structural unit (b-3) is represented by formula (3-3) given below:

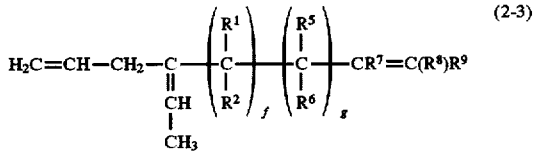
(2-3)

(3-3)

wherein, in the above formula (2-3), f denotes an integer of 0–5, g denotes an integer of 1–6, $R^1$, $R^2$, $R^5$, $R^6$ and $R^7$ represent each hydrogen atom or an alkyl group having 1–5 carbon atoms, $R^8$ denotes an alkyl group having 1–5 carbon atoms and $R^9$ denotes hydrogen atom, an alkyl group having 1–5 carbon atoms or a group represented by —$(CH_2)_n$—$CR^{10}$=$C(R^{11})R^{12}$ in which n is an integer of 1–5, $R^{10}$ and $R^{11}$ denote each hydrogen atom or an alkyl group having 1–5 carbon atoms and $R^{12}$ denotes an alkyl group having 1–5 carbon atoms and, in the above formula (3-3), f, g, $R^1$, $R^2$ and $R^5$–$R^9$ have the same meanings as those given for the general formula (2-3).

6. An unsaturated copolymer based on olefin according to claim 5, wherein the constituent comonomer (a-3) is a non-conjugated tetraene represented by formula (2-4) given below and the structural unit (b-3) is represented by formula (3-4) given below:

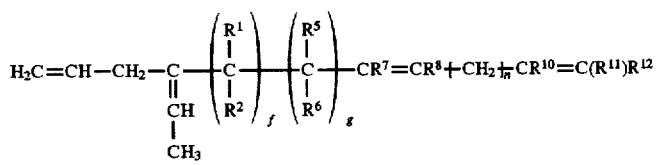

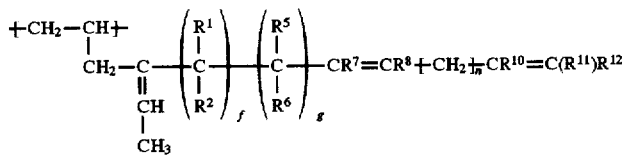

wherein, in the above formula (2-4), f denotes an integer of 0–5, g denotes an integer of 1–6, $R^1$, $R^2$, $R^5$, $R^6$ and $R^7$ represent each hydrogen atom or an alkyl group having 1–5 carbon atoms, $R^8$ denotes an alkyl group having 1–5 carbon atoms, n is an integer of 1–5, $R^{10}$ and $R^{11}$ denote each hydrogen atom or an alkyl group having 1–5 carbon atoms and $R^{12}$ denotes an alkyl group having 1–5 carbon atoms and, in the above formula (3-4), f, g, $R^1$, $R^2$, $R^5$–$R^8$, n and $R^{10}$–$R^{12}$ have the same meanings as those given for the formula (2-4).

7. An unsaturated copolymer based on olefin according to claim 5, wherein the constituent comonomer (a-3) is a non-conjugated triene represented by the formula (2-5) given below and the structural unit (b-3) is represented by the formula (3-5) given below:

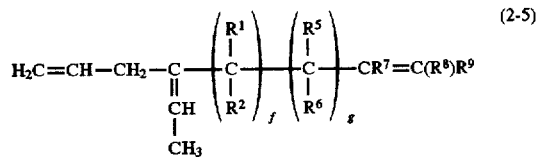

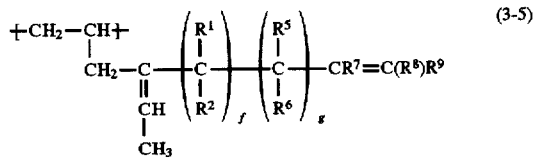

wherein, in the above formula (2-5), f denotes an integer of 0–5, g denotes an integer of 1–6, $R^1$, $R^2$, $R^5$, $R^6$ and $R^7$ represent each hydrogen atom or an alkyl group having 1–5 carbon atoms, $R^8$ denotes an alkyl group having 1–5 carbon atoms and $R^9$ denotes hydrogen atom or an alkyl group having 1–5 carbon atoms and, in the above formula (3-5), f, g, $R^1$, $R^2$ and $R^5$–$R^9$ have the same meanings as those given for the formula (2-5).

8. A method for producing an unsaturated copolymer based on olefin, comprising subjecting (a-1) an α-olefin having 2–20 carbon atoms, (a-2) a vinyl monomer having an aromatic ring, as represented by formula (1) given below and (a-3) a chain-formed non-conjugated triene or tetraene having one vinyl group in the molecule to a copolymerization in the presence of a catalyst formed from a transition metal compound, an organic aluminum compound and/or an ionized ionic compound to form a random copolymer comprising constituent structural units of (b-1) 30–99.8 mole % of a structural unit derived from said α-olefin (a-1), (b-2) 0.1–60 mole % of a structural unit derived from said vinyl monomer (a-2) and (b-3) 0.1–10 mole % of a structural unit derived from said non-conjugated triene or tetraene (a-3)

and having an intrinsic viscosity [η] determined in Decalin® (Decahydronaphthalene) at 135° C. in the range from 0.05 to 10 dl/g:

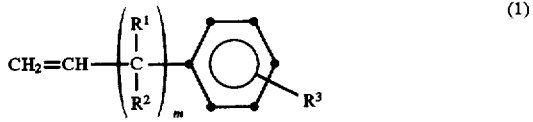

wherein m is an integer of 0–5 and $R^1$, $R^2$ and $R^3$ may be identical with or different from each other and denote each hydrogen atom or an alkyl group having 1–8 carbon atoms.

9. A method according to claim 8, wherein the constituent comonomer (a-3) is a non-conjugated triene or tetraene, in which one hydrocarbon chain group and two hydrogen atoms are bound to the carbon atom adjacent the vinyl group, and the structural unit (b-3) derived from the non-conjugated triene or tetraene has a structure, in which one hydrocarbon chain group and two hydrogen atoms are bound to the carbon atom adjacent the vinyl group.

10. A method according to claim 9, wherein the constituent comonomer (a-3) is a compound represented by formula (2-1) given below and the constituent structural unit (b-3) is represented by formula (3-1) given below:

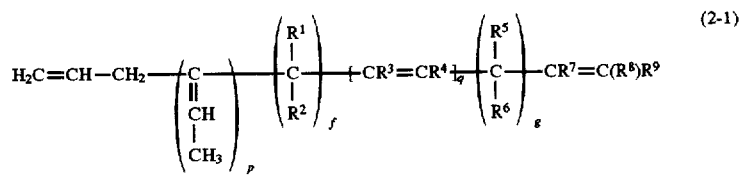

-continued

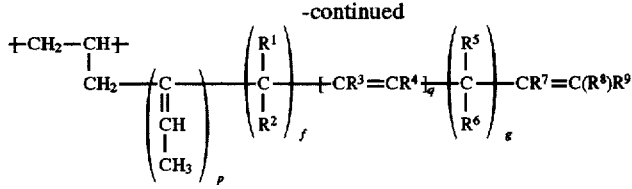
(3-1)

wherein, in the above formula (2-1), p and q denote each 0 or 1 but not both 0 simultaneously, f denotes an integer of 0–5 with the proviso that f is not 0 when both p and q are 1, g denotes an integer of 1–6, $R^1$, $R^2$ $R^3$ $R^4$ $R^5$ $R^6$ and $R^7$ represent each hydrogen atom or an alkyl group having 1–5 carbon atoms, $R^8$ denotes an alkyl group having 1–5 carbon atoms and $R^9$ denotes hydrogen atom, an alkyl group having 1–5 carbon atoms or a group represented by —$(CH_2)_n$—$CR^{10}$=$C(R^{11})R^{12}$ in which n is an integer of 1–5, R and $R^{11}$ denote each hydrogen atom or an alkyl group having 1–5 carbon atoms and $R^{12}$ denotes an alkyl group having 1–5 carbon atoms, with the proviso that $R^9$ stands for hydrogen atom or an alkyl group having 1–5 carbon atoms when both p and q are 1, and in the above formula (3-1), p, q, f, g and $R^1$-$R^9$ have the same meanings as above.

11. A method according to claim 9, wherein the constituent comonomer (a-3) is a compound represented by formula (2-2) given below and the constituent structural unit (b-3) is represented by formula (3-2) given below:

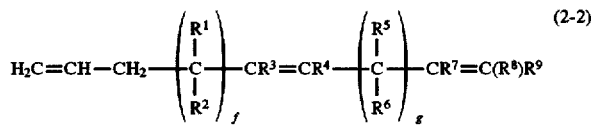
(2-2)

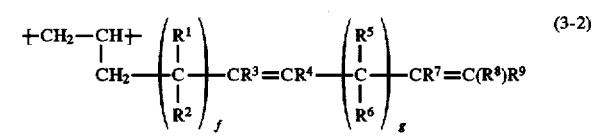
(3-2)

wherein, in the above formula (2-2), f denotes an integer of 0–5, g denotes an integer of 1–6, $R^1$, $R^2$, $R^3$, $R^4$, $R^5$, $R^6$ and $R^7$ represent each hydrogen atom or an alkyl group having 1–5 carbon atoms, $R^6$ denotes an alkyl group having 1–5 carbon atoms and $R^9$ denotes hydrogen atom, an alkyl group having 1–5 carbon atoms or a group represented by —$(CH_2)_n$—$CR^{10}$=$C(R^{11})R^{12}$ in which n is an integer of 1–5, $R^{10}$ and $R^{11}$ denote each hydrogen atom or an alkyl group having 1–5 carbon atoms and $R^{12}$ denotes an alkyl group having 1–5 carbon atoms and, in the above formula (3-1), f, g and $R^1$-$R^9$ have the same meanings as those given for formula (2-2).

12. A method according to claim 9, wherein the constituent comonomer (a-3) is a compound represented by formula (2-3) given below and the constituent structural unit (b-3) is represented by formula (3-3) given below:

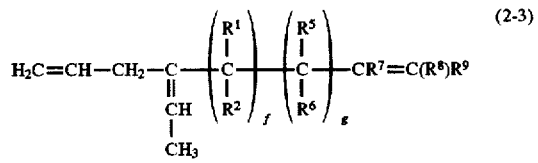
(2-3)

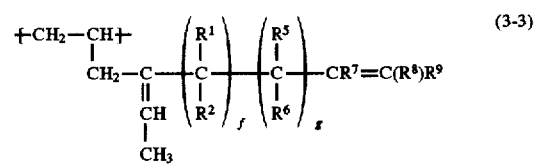
(3-3)

wherein, in the above formula (2-3), f denotes an integer of 0–5, g denotes an integer of 1–6, $R^1$, $R^2$, $R^5$, $R^6$ and $R^7$ represent each hydrogen atom or an alkyl group having 1–5 carbon atoms, $R^8$ denotes an alkyl group having 1–5 carbon atoms and $R^9$ denotes hydrogen atom, an alkyl group having 1–5 carbon atoms or a group represented by —$(CH_2)_n$—$CR^{10}$=$C(R^{11})R^{12}$, in which n is an integer of 1–5, $R^{10}$ and $R^{11}$ denote each hydrogen atom or an alkyl group having 1–5 carbon atoms and $R^{12}$ denotes an alkyl group having 1–5 carbon atoms and, in the above formula (3-3), f, g, $R^1$, $R^2$ and $R^5$-$R^9$ have the same meanings as those given for formula (2-3).

13. A method according to claim 9, wherein the constituent comonomer (a-3) is a non-conjugated tetraene represented by formula (2-4) given below and the constituent structural unit (b-3) is represented by formula (3-4) given below:

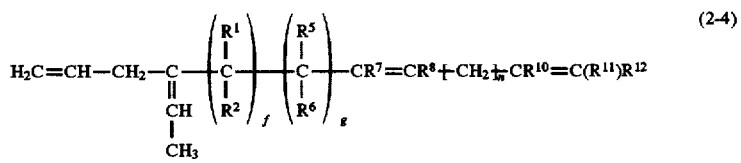
(2-4)

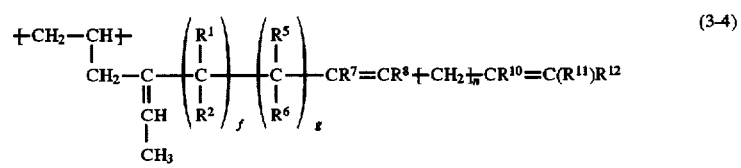
(3-4)

wherein, in the above formula (2-3), f denotes an integer of 0–5, g denotes an integer of 1–6, $R^1$, $R^2$, $R^5$, $R^6$ and $R^7$ represent each hydrogen atom or an alkyl group having 1–5 carbon atoms, $R^8$ denotes an alkyl group having 1–5 carbon atoms, n is an integer of 1–5, $R^{10}$ and $R^{11}$ denote each hydrogen atom or an alkyl group having 1–5 carbon atoms and $R^{12}$ denotes an alkyl group having 1–5 carbon atoms and, in the above formula (3-4), f, g, $R^1$, $R^2$, $R^5$–$R^8$, n and $R^{10}$–$R^{12}$ have the same meanings as those given for formula (2-4).

14. A method according to claim 9, wherein the constituent comonomer (a-3) is a non-conjugated triene represented by formula (2-5) given below and the constituent structural unit (b-3) is represented by formula (3-5) given below:

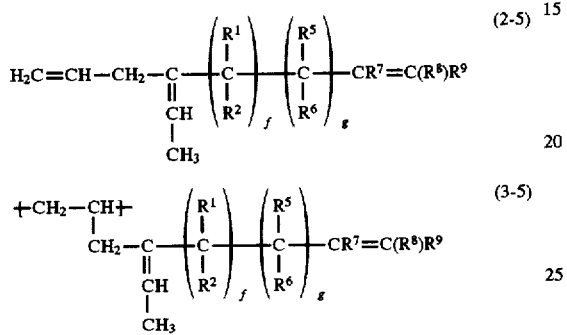

wherein, in the above formula (2-5), f denotes an integer of 0–5, g denotes an integer of 1–6, $R^1$, $R^2$, $R^5$, $R^6$ and $R^7$ represent each hydrogen atom or an alkyl group having 1–5 carbon atoms, $R^8$ denotes an alkyl group having 1–5 carbon atoms and $R^9$ denotes hydrogen atom or an alkyl group having 1–5 carbon atoms and, in the above formula (3-5), f, g, $R^1$, $R^2$ and $R^5$–$R^9$ have the same meanings as those given for formula (2-5).

15. A rubber composition comprising
(A) an unsaturated copolymer based on olefin, which comprises a random copolymer of constituent comonomers of
(a-1) an α-olefin having 2–20 carbon atoms,
(a-2) a vinyl monomer having an aromatic ring, as represented by formula (1) given below and
(a-3) a chain-formed non-conjugated triene or tetraene having one vinyl group in the molecule,

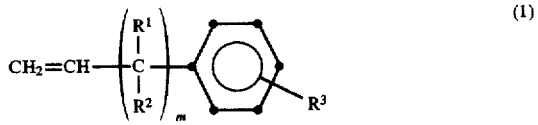

wherein m is an integer of 0–5 and $R^1$, $R^2$ and $R^3$ may be identical with or different from each other and denote each hydrogen atom or an alkyl group having 1–8 carbon atoms;

said copolymer comprising constituent structural units of
(b-1) 30–99.8 mole % of a structural unit derived from said α-olefin (a-1),
(b-2) 0.1–60 mole % of a structural unit derived from said vinyl monomer (a-2) and
(b-3) 0.1–10 mole % of a structural unit derived from said non-conjugated triene or tetraene (a-3)

and having an intrinsic viscosity [η] determined in Decalin® at 135° C. in the range from 0.05 to 10 dl/g; and at least one of the additives among (B) a reinforcing filler in an amount of, on the weight basis, at most 300 parts per 100 parts of the unsaturated copolymer based on olefin (A), (C) a softening agent in an amount of, on the weight basis;, at most 200 parts per 100 parts of the unsaturated copolymer based on olefin (A) and (D) a vulcanizing agent in an amount of, on the weight basis, 0.05–15 parts per 100 parts of the unsaturated copolymer based on olefin (A).

* * * * *

UNITED STATES PATENT AND TRADEMARK OFFICE
CERTIFICATE OF CORRECTION

PATENT NO. : 5,744,566
DATED : April 28, 1998
INVENTOR(S) : Toshiyuki Tsutsui and Masaaki Kawasaki It is certified that error appears in the above-identified patent and that said Letters Patent is hereby corrected as shown below:

<u>Title page,</u>
Item [54], please replace Title "UNSATURATED COPOLYMER BASED ON OLEFIN AND PRODUCITON AND USE THEREOF" with -- UNSATURATED COPOLYMER BASED ON OLEFIN AND PRODUCTION AND USE THEREOF --.

Signed and Sealed this

Twenty-eighth Day of January, 2003

JAMES E. ROGAN
*Director of the United States Patent and Trademark Office*